United States Patent
Baek et al.

(10) Patent No.: US 11,445,403 B2
(45) Date of Patent: Sep. 13, 2022

(54) METHOD FOR PROCESSING DATA IN CONSIDERATION OF TCP/IP

(71) Applicant: Samsung Electronics Co., Ltd., Suwon-si (KR)

(72) Inventors: Sangkyu Baek, Yongin-si (KR); Youngjoong Mok, Suwon-si (KR); Rayeon Ahn, Seoul (KR); Hyunjeong Kang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 103 days.

(21) Appl. No.: 16/499,837

(22) PCT Filed: Mar. 30, 2018

(86) PCT No.: PCT/KR2018/003792
§ 371 (c)(1),
(2) Date: Sep. 30, 2019

(87) PCT Pub. No.: WO2018/182366
PCT Pub. Date: Oct. 4, 2018

(65) Prior Publication Data
US 2020/0059817 A1    Feb. 20, 2020

(30) Foreign Application Priority Data

Mar. 30, 2017 (KR) .................. 10-2017-0041146
May 4, 2017 (KR) .................. 10-2017-0057051

(51) Int. Cl.
*H04W 4/00*      (2018.01)
*H04W 28/02*    (2009.01)
*H04W 28/04*    (2009.01)

(52) U.S. Cl.
CPC ... *H04W 28/0273* (2013.01); *H04W 28/0252* (2013.01); *H04W 28/0268* (2013.01); *H04W 28/04* (2013.01)

(58) Field of Classification Search
CPC ......... H04W 28/0273; H04W 28/0252; H04W 28/0268; H04W 28/04
(Continued)

(56) References Cited

U.S. PATENT DOCUMENTS

2008/0002622 A1 * 1/2008 Auterinen ............. H04W 36/26
                                                                370/331
2010/0062774 A1 * 3/2010 Motegi ................. H04W 36/02
                                                                455/437
(Continued)

FOREIGN PATENT DOCUMENTS

KR    10-2015-0117893 A    10/2015
WO    WO-2014180005 A1 *  11/2014 ........ H04W 36/0033

OTHER PUBLICATIONS

Huawei ("Qos flow to DRB Mapping", R2-1701205, Huawei, Athens, Greece, Feb. 13-17, 2017) (Year: 2017).*
(Continued)

*Primary Examiner* — Maharishi V Khirodhar

(57) ABSTRACT

The present disclosure relates to a communication method and system for converging a 5th-Generation (5G) communication system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method for processing a packet by a transmission device in a wireless communication system according to an embodiment of the present invention comprises the steps of: checking whether a data radio bearer (DRB) mapped to a quality (Continued)

of service (QoS) flow changes from a first DRB to a second DRB; and when the DRB changes from the first DRB to the second DRB, transmitting, to a reception device, information on a last packet transmitted through the first DRB in the QoS flow.

15 Claims, 76 Drawing Sheets

(58) Field of Classification Search
USPC .......................................................... 370/229
See application file for complete search history.

(56) References Cited

U.S. PATENT DOCUMENTS

| | | | |
|---|---|---|---|
| 2011/0286387 A1* | 11/2011 | Sane | H04L 1/1867 370/328 |
| 2013/0121242 A1 | 5/2013 | Pani et al. | |
| 2014/0220974 A1 | 8/2014 | Hsu | |
| 2014/0286254 A1* | 9/2014 | Agiwal | H04W 56/00 370/329 |
| 2015/0304896 A1* | 10/2015 | Turtinen | H04W 76/14 370/331 |
| 2016/0050653 A1 | 2/2016 | Rastogi | |
| 2017/0041842 A1 | 2/2017 | Yoon et al. | |
| 2020/0029241 A1* | 1/2020 | Maeder | H04L 67/141 |

OTHER PUBLICATIONS

CATT ( Reconfiguration of Flow ID to DRB Mapping, R2-1700968, Athens, Greece, Feb. 13-17, 2017) (Year: 2017).*
Nokia, Alcatel-Lucent Shanghai Bell (Title: QoS flow relocation,R2-1700814,Athens, Greece, Feb. 13-17, 2017) (Year: 2017).*
ITRI (3GPP TSG-RAN WG2 Meeting #97, R2-1701346, Athens, Greece, Feb. 13-17, 2017) (Year: 2017).*
ISA/KR, International Search Report and Written Opinion of the International Searching Authority, International Application No. PCT/KR2018/003792, dated Jul. 5, 2018, 11 pages.
CATT, "Reconfiguration of Flow ID to DRB Mapping," R2-1700968, 3GPP TSG-RAN WG2 Meeting #97, Athens, Greece, Feb. 13-17, 2017, 3 pages.
Huawei, et al., "QoS Flow to DRB Mapping," R2-1701205, Revision of R2-1700088, 3GPP TSG-RAN2 Meeting #97, Athens, Greece, Feb. 13-17, 2017, 6 pages.

* cited by examiner

FIG. 20

| D/C | CI | NCP | SN |
|---|---|---|---|
| SN |||||
| SN |||||

FIG. 21

| RQ | CI | NCP | R | R |
|---|---|---|---|---|
| QoS Flow ID |||||

FIG. 70

| QoS Flow ID | Service Type | Latency | Max Data Rate (DL) | Max Data Rate (UL) | Min Data Rate (DL) | Min Data Rate (UL) | Reliability | Priority | ARP |
|---|---|---|---|---|---|---|---|---|---|
| 1 | eMBB | ~100 ms | 1 Gbps | 1 Gbps | 100 Mbps | 100 Mbps | Low | 1 | 1 |
| 2 | eMBB | ~10 ms | 10 Gbps | 1 Gbps | 1 Gbps | 100 Mbps | Medium | 2 | 1 |
| 3 | URLLC | ~10 ms | 10 Mbps | 10 Mbps | 10 Mbps | 10 Mbps | High | 1 | 1 |
| 4 | eMBB | ~1 s | 2 Gbps | 100 Mbps | 100 Mbps | 50 Mbps | Medium | 4 | 3 |
| ... | ... | ... | ... | ... | ... | ... | ... | ... | ... |

FIG. 71

| DRB ID | Qos Flow ID |
|---|---|
| 1 | 1 |
|  | 2 |
| 2 | 3 |
| ... | ... |

FIG. 72

| QCI | Resource Type | Priority | Packet Delay | Packet Loss Rate | Example |
|---|---|---|---|---|---|
| 1 | GBR | 1 | 100 ms | $10^{-2}$ | Voice Call |
| ... | ... | ... | ... | ... | ... |
| 9 | Non-GBR | 9 | 300 ms | $10^{-6}$ | Video |

FIG. 73

| QoS Flow ID | QCI | ARP | APN-AMBR (DL) | APN-AMBR (UL) |
|---|---|---|---|---|
| 1 | 1 | 1 | 10 Gbps | 10 Gbps |
| ... | ... | ... | ... | ... |
| n | ... | 15 | 1 Mbps | 1 Mbps |

FIG. 74

| DRB ID | QCI | ARP | APN-AMBR (DL) | APN-AMBR (UL) |
|--------|-----|-----|---------------|---------------|
| 1 | 1 | 1 | 10 Mbps | 10 Mbps |
| ... | ... | ... | ... | ... |
| n | ... | 15 | 1 Mbps | 1 Mbps |

METHOD FOR PROCESSING DATA IN CONSIDERATION OF TCP/IP

CROSS-REFERENCE TO RELATED APPLICATIONS

This application is a 371 National Stage of International Application No. PCT/KR2018/003792, filed Mar. 30, 2018, which claims priority to Korean Patent Application No. 10-2017-0041146, filed Mar. 30, 2017, and Korean Patent Application No. 10-2017-0057051, filed May 4, 2017, the disclosures of which are herein incorporated by reference in their entirety.

BACKGROUND

1. Field

The disclosure relates to layer 2 (data link layer) overhead reduction in data communication between a transmitter and a receiver.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described. Big Data processing technology may also be considered to be as an example of convergence between the 5G technology and the IoT technology.

Meanwhile, the recent development of LTE and LTE-Advanced has led to the need of a method and apparatus for reducing layer 2 (data link layer) overhead in communication between a transmitter and a receiver.

SUMMARY

The disclosure proposes a method for reducing layer 2 (data link layer) overhead amount in communication between a transmitter and a receiver. Disclosed embodiments aim to reduce radio channel occupancy time for transmitting a large amount of TCP ACKs The disclosure also aims to provide a packet transmission method that is capable of improving a service continuity by solving a packet out-of-order and packet loss problem caused by change of a mapping rule between a QoS flow and a DRB that may occur in supporting various QoS services.

The disclosure also proposes a method for guaranteeing QoS for a terminal performing a handover between systems with different QoS definitions. In particular, the disclosure aims to provide a method for guaranteeing LTE QoS for a UE performing a handover from a New Radio (NR or 5G) system to an LTE (4G) system and NR QoS for a UE performing a handover from the LTE system the NR system.

According to an embodiment of the disclosure, a packet processing method of a transmitting device in a wireless communication system includes determining whether a quality of service (QoS) flow mapping is switched from a first data radio bearer (DRB) to a second DRB and transmitting information on a last packet transmitted on the first DRB to a receiving device in the QoS flow based on switching from the first DRB to the second DRB.

Preferably, the packet processing method of the transmitting device further includes transmitting information on a first packet transmitted on the second DRB in the QoS flow to the receiving device.

Preferably, the packet processing method of the transmitting device further includes starting a timer and transmitting a packet related to the QoS flow to the receiving device on the second DRB upon expiry of the timer.

Preferably, the packet processing method of the transmitting device further includes receiving a message requesting for re-transmission of at least one packet transmitted on the first DRB from the receiver.

Preferably, the packet processing method of the transmitting device further includes receiving an acknowledgement (ack) message corresponding to the last packet from the receiving device and transmitting a packet related to the QoS flow to the receiving device on the second DRB after receiving the ack message.

According to an embodiment of the disclosure, a packet processing method of a receiving device in a wireless communication system includes determining whether a quality of service (QoS) flow mapping is switched from a first data radio bearer (DRB) to a second DRB and receiving information on a last packet transmitted on the first DRB in the QoS flow from a transmitting device based on switching from the first DRB to the second DRB.

Preferably, the packet processing method of the receiving device further includes receiving information on a first packet transmitted on the second DRB in the QoS flow from the transmitting device Preferably, the packet processing method of the receiving device further includes receiving a packet related to the QoS flow on the second DRB from the transmitting device upon expiry of a timer running in the transmitting device.

Preferably, the packet processing method of the receiving device further includes transmitting a message requesting for retransmission of at least one packet transmitted on the first DRB to the transmitting device.

Preferably, the packet processing method of the receiving device further includes transmitting an acknowledgement (ack) message corresponding to the last packet to the transmitting device and receiving a packet related to the QoS flow from the transmitting device on the second DRB.

According to an embodiment of the disclosure, a transmitting device for processing packets in a wireless communication system includes a transceiver and a controller connected to the transceiver and configured to control to determine whether a quality of service (QoS) flow mapping is switched from a first data radio bearer (DRB) to a second DRB and transmit information on a last packet being transmitted on the first DRB to a receiving device in the QoS flow based on switching from the first DRB to the second DRB.

According to an embodiment of the disclosure, a receiving device for processing packets in a wireless communication system includes a transceiver and a controller connected to the transceiver and configured to control to determine whether a quality of service (QoS) flow mapping is switched from a first data radio bearer (DRB) to a second. DRB and receive information on a last packet being transmitted on the first DRB in the QoS flow from a transmitting device based on switching from the first DRB to the second DRB.

The disclosed embodiments are advantageous in terms of concatenating IP packets in layer 2 (data layer). The disclosed embodiments may selectively transmit TCP ACK packets over a radio link without compromising the data rate.

The disclosed embodiments are also advantageous in terms of overcoming a data out-of-order and packet loss problem arising in data communication between a terminal and a base station that support various QoSs. The disclosed embodiments are advantageous in terms of guaranteeing qualities and continuities of various services supported by a mobile communication system.

The disclosed embodiments are also advantageous in terms of guaranteeing service quality for a terminal performing a handover by guaranteeing a QoS continuity for the terminal. The disclosed embodiments are advantageous in terms of guaranteeing service continuity for a terminal between systems with heterogeneous QoS mechanisms.

BRIEF DESCRIPTION OF THE DRAWINGS

FIG. 20 is a diagram illustrating an exemplary format of a PDCP header (L2 Header) including a concatenation indicator (CI) and a number of concatenated packets according to the first embodiment of the disclosure;

FIG. 21 is a diagram illustrating an exemplary format of a QoS sublayer header including a concatenation indicator (CI) and a Number of Concatenated Packets according to the first embodiment of the disclosure;

FIG. 70 is a table of conditions that may be considered for determining a QoS Flow ID according to the third embodiment of the disclosure;

FIG. 71 is a table of mapping DRB (Data Radio Bearer) Ds and QoS Flow IDs in an NR system according to the third embodiment of the disclosure;

FIG. 72 is a table of QoSs defined in an LTE system according to the third embodiment of the disclosure;

FIG. 73 is a table for explaining a method for deriving LTE system QoS parameters (QCI, ARP, and APN-AMBR (DL/UL) for establishing a bearer) corresponding to an NR system QoS Flow ID according to the third embodiment of the disclosure;

FIG. 74 is a table for explaining QoS mapping and another exemplary method for deriving LTE system QoS parameters (QCI, ARP, and APN-AMBR (DL/UL) for establishing a bearer) corresponding to an NR system QoS parameter ID according to the third embodiment of the disclosure;

DETAILED DESCRIPTION

Figure 1:
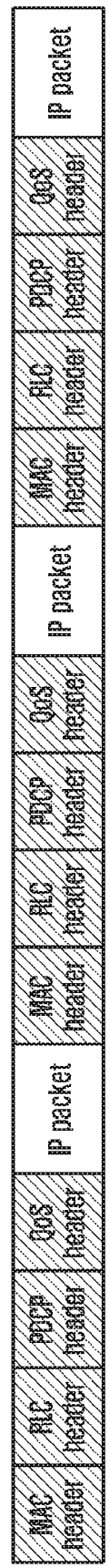
FIG. 1 is a diagram illustrating a 3GPP NR (New RAT) layer 2 data format.

Exemplary embodiments of the disclosure are described in detail with reference to the accompanying drawings. Detailed descriptions of well-known functions and structures incorporated herein may be omitted to avoid obscuring the subject matter of the disclosure. Further, the following terms are defined in consideration of the functionality in the disclosure, and they may vary according to the intention of a user or an operator, usage, etc. Therefore, the definition should be made on the basis of the overall content of the present specification.

Advantages and features of the disclosure and methods of accomplishing the same may be understood more readily by reference to the following detailed descriptions of exemplary embodiments and the accompanying drawings. The disclosure may, however, be embodied in many different forms and should not be construed as being limited to the exemplary embodiments set forth herein; rather, these exemplary embodiments are provided so that this disclosure will be thorough and complete and will fully convey the concept of the disclosure to those skilled in the art, and the disclosure will only be defined by the appended claims. Like reference numerals refer to like elements throughout the specification.

Embodiment 1

FIG. 1 is a diagram illustrating a 3GPP NR (New RAT) layer 2 data format. In a transmitter, a data packet generated from an upper layer on or above a network layer, a so called IP packet, is passed down to layer 2 on which sublayer protocol-specific headers are generated.

The layer 2 of 3GPP NR is split into four sublayers: sublayer responsible for QoS management, PDCP sublayer, RLC sublayer, and MAC sublayer. Each sublayer generates a header, which may be omitted. In an embodiment, the QoS sublayer, PDCP sublayer, RLC sublayer, and MAC sublayer each generate a header in order as shown in FIG. 1. In the embodiment of FIG. 1, the headers are added to each of three IP packets; in this case, if the size of an IP packet is small, a ratio of the layer 2 headers to IP packets increases, resulting in degradation of transmission efficiency. Particularly in a small packet-intensive environment, the transmission efficiency is likely to deteriorate further.

Figure 2:
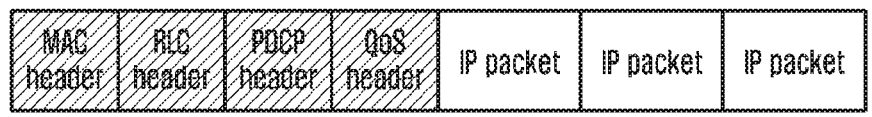
FIG. 2 is a diagram illustrating a principle of IP packet concatenation (IP concatenation) according to a first embodiment of the disclosure.

FIG. 2 is a diagram illustrating a principle of IP packet concatenation (IP concatenation) according to a first embodiment of the disclosure. Unlink the embodiment of FIG. 1, where the individual layer 2 headers are generated per IP packet, the embodiment of FIG. 2 is characterized in that the layer 2 headers are generated per group of multiple concatenated IP packets. In this case, there is a need of information and a procedure for notifying a receiver that the IP packets are concatenated.

Figure 3:
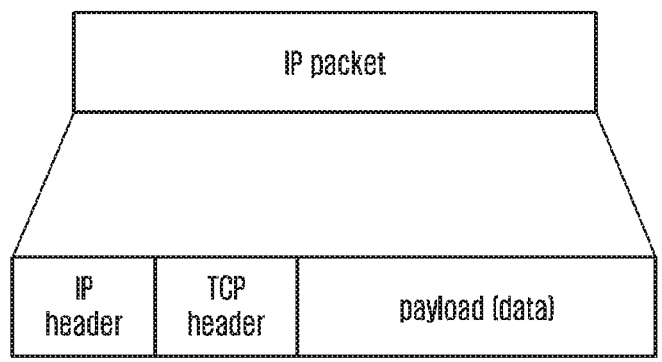
FIG. 3 is a diagram illustrating a configuration of a normal IP packet.

FIG. 3 is a diagram illustrating a configuration of a normal IP packet. Typically, an IP packet includes an IP header, a TCP header, and a payload carrying data. In the case where the TCP is not used for end-to-end (E2D) for an End-to-End (E2E) scheme, other transport protocols such as UDP may be used. This concept of an IP packet is typically used in communication systems and computer systems as well as in the disclosure.

Figure 4:
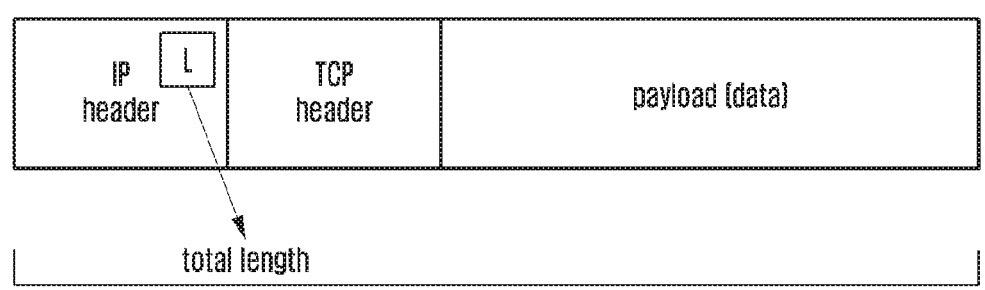
FIG. 4 is a diagram illustrating an IP packet including an IP header with a length field indicating a total length of the IP packet.

FIG. 4 is a diagram illustrating an IP packet including an IP header with a length field indicating a total length of the IP packet. The IP header may include a version field, a DSCP field, a Tim-To-Live field, a Header Checksum field, and a total length field. The IP header may further include other fields, and per-field lengths may vary according to the version of the IP (Internet Protocol). The total length field included in the IP header indicates the total length of the IP header and the remaining part (TCP header and payload in the embodiment of FIG. 4) of the IP packet in bytes. By reading the total length field, it is possible to acquire the total size of the IP packet.

Figure 5:
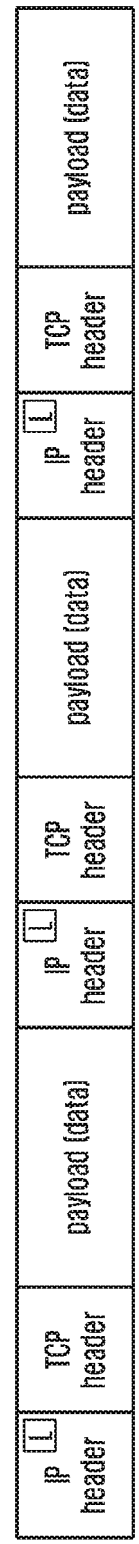
FIG. 5 is a diagram illustrating an outcome of an IP concatenation operation of a transmitter utilizing an IP layer according to the first embodiment of the disclosure.

FIG. 5 is a diagram illustrating an outcome of an IP concatenation operation of a transmitter utilizing an IP layer according to the first embodiment of the disclosure. If IP concatenation is performed in Layer 2 of the transmitter (hereinafter referred to as transmitter, when there is no specific representation), the transmitter may perform an operation of concatenating IP packets to be transmitted as in the embodiment of FIG. 5. In this case, each IP header has to include a total length field (L in the drawing). The transmitter may regard the IP concatenated packet as a service data unit (SDU) to perform layer 2 processing thereon. The concatenated IP data may first be recognized as SDU by the QoS sublayer or the PDCP sublayer.

Figure 6:
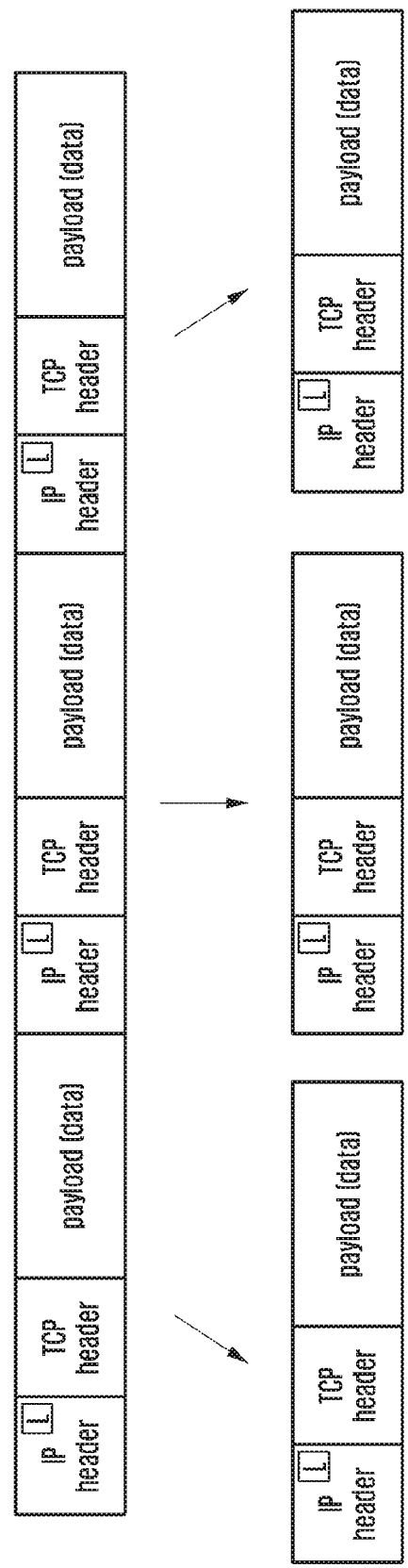
FIG. 6 is a diagram illustrating an outcome of an IP concatenation operation of a receiver utilizing an IP layer according to the first embodiment of the disclosure.

FIG. 6 is a diagram illustrating an outcome of an IP concatenation operation of a receiver utilizing an IP layer according to the first embodiment of the disclosure.

If the IP concatenation is performed in the Layer 2 of the transmitter, the IP packets in which the IP concatenation has been performed should be separated in the Layer 2 of the transmitter corresponding to Layer 2 of the receiver. First, the receiver receives an SDU as concatenated IP packets. The receiver decodes the total length field (L in drawing) of the IP header of the first packet to determine whether the IP concatenation is applied, i.e., whether the packet is IP-concatenated, based on acquired information. If a value indicated by the total length field matches the length of the remaining part of the SDU, this means that the IP concatenation has not been performed. If not, this means that the IP concatenation has been performed and there is a new IP header following a point inferred by the total length field; thus, the receiver performs total length field decoding again. If a value indicated by the total length field matches the length of the remaining part of the SDU, this means that the IP concatenation has not been performed. If not, this means that the IP concatenation has been performed and there is a new IP header following a point inferred by the total length field; thus, the receiver performs total length field decoding again. In the embodiment of FIG. 6, the receiver de-concatenates three IP-concatenated IP packets to recover three IP packets.

Here, an indicator indicating whether the IP concatenation has been applied or a field indicating a number of concatenated IP packets may be included in a predetermined layer 2 header. In this case, the receiver needs to decode the total length field of the IP header only when it knows that the IP concatenation has been applied, which leads to reduction of data processing.

Figure 7:
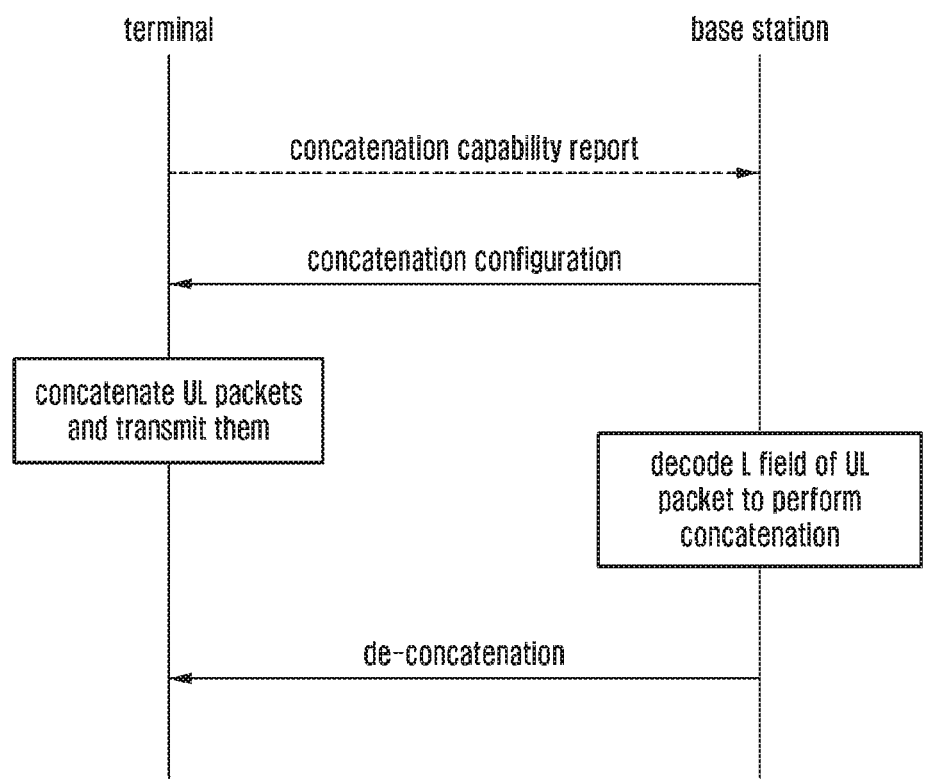
FIG. 7 is a signal flow diagram illustrating a message exchange and data processing procedure for IP concatenation between a terminal and a base station according to the first embodiment of the disclosure.

FIG. 7 is a signal flow diagram illustrating a message exchange and data processing procedure for IP concatenation between a terminal and a base station according to the first embodiment of the disclosure.

The IP concatenation may be performed only when the terminal has an IP concatenation capability. The terminal may transmit its IP concatenation capability information to the base station, and the base station may indicate use of IP concatenation to the terminal based on this information. The terminal's IP concatenation capability information may be included in a UE Capability Report message being transmitted by the terminal.

The base station may indicate use of IP concatenation to the UE using a concatenation configuration message. The concatenation configuration message may be transmitted in the form of a field of another message such as RRC Connection Setup message and RRC Connection Reconfiguration message or as a separate message. After receiving this message, the terminal may perform IP concatenation on uplink IP packets and transmit them. The IP concatenation may be configured to be performed always or subject to a predetermined condition. The base station may decode the total length field (L field) of received uplink packets to recover individual IP packets IP-concatenated in an SDU.

The base station may indicate release of IP concatenation to the terminal using a concatenation release message. The concatenation release message may be transmitted in the form of a field of another message such as RRC Connection Reconfiguration message or as a separate message. After receiving this message, the terminal may stop IP concatenation of uplink IP packets, and the base station does not need to decode the total length field (L field) of the received uplink packets anymore.

In an alternative embodiment, the terminal may transmit a concatenation release confirmation message to the base station in response to the concatenation release message from the base station. The concatenation release confirmation message may be carried in an RRC Connection Reconfiguration Complete message by way of example. After transmitting e concatenation release confirmation message, the terminal stops performing IP concatenation on uplink IP packets, and the base station does not need to decode the total length field (L field) of the received uplink packets.

Figure 8:
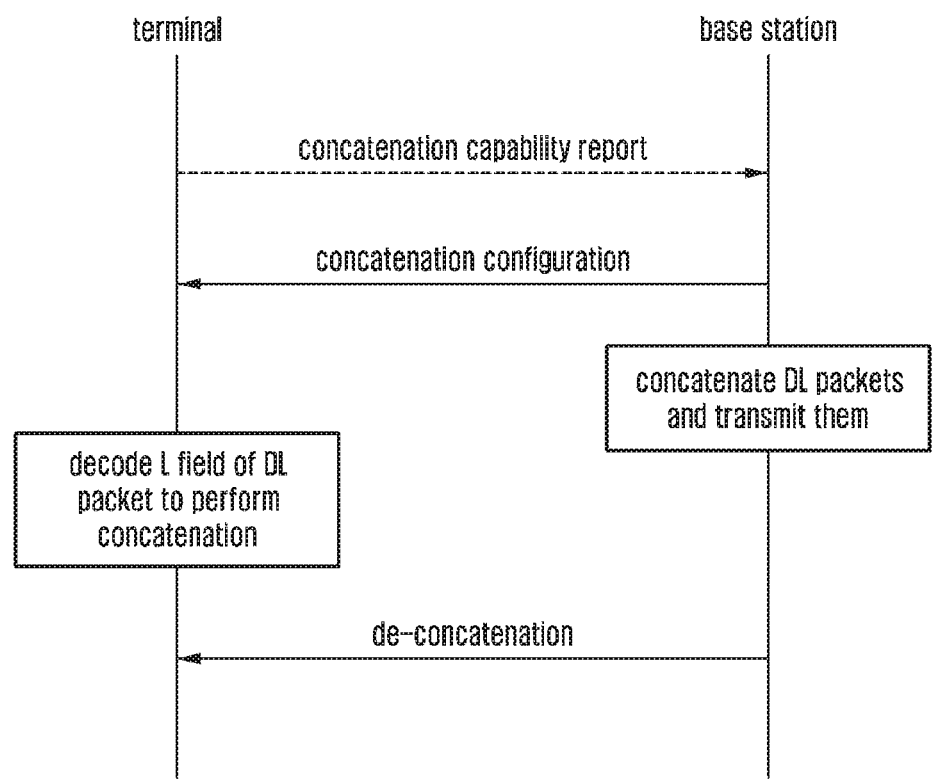
FIG. 8 is a signal flow diagram illustrating another message exchange and data processing procedure for IP concatenation between an terminal and a base station according to the first embodiment of the disclosure.

FIG. 8 is a signal flow diagram illustrating another message exchange and data processing procedure for IP concatenation between a terminal and a base station according to the first embodiment of the disclosure.

The IP concatenation may be performed only when the terminal has an IP concatenation capability. The terminal may transmit its IP concatenation capability information to the base station, and the base station may indicate use of IP concatenation to the terminal based on this information. The terminal's IP concatenation capability information may be included in a UE Capability Report message being transmitted by the terminal.

The base station may indicate use of IP concatenation to the terminal using a concatenation configuration message. The concatenation configuration message may be transmitted in the form of a field of another message such as RRC Connection Setup message and RRC Connection Reconfiguration message or as a separate message. After receiving this message, the base station may perform IP concatenation on downlink IP packets and transmit it. The IP concatenation may be configured to be performed always or subject to a predetermined condition. The terminal may decode the total length field (L field) of received downlink packets to recover individual IP packets IP-concatenated in an SDU.

The base station may indicate release of IP concatenation to the terminal using a concatenation release message. The concatenation release message may be transmitted in the form of a field of another message such as RRC Connection Reconfiguration message or as a separate message. After receiving this message, the base station may stop IP concatenation of downlink IP packets, and the terminal does not need to decode the total length field (L field) of the received downlink packets anymore.

In an alternative embodiment, the terminal may transmit a concatenation release confirmation message to the base station in response to the concatenation release message from the base station. The concatenation release confirmation message may be carried in an RRC Connection Reconfiguration Complete message by way of example. After receiving the concatenation release confirmation message, the base station stops performing IP concatenation on downlink IP packets; after transmitting the concatenation release confirmation message, the terminal does not need to decode the total length field (L field) of the received downlink packets.

Figure 9:
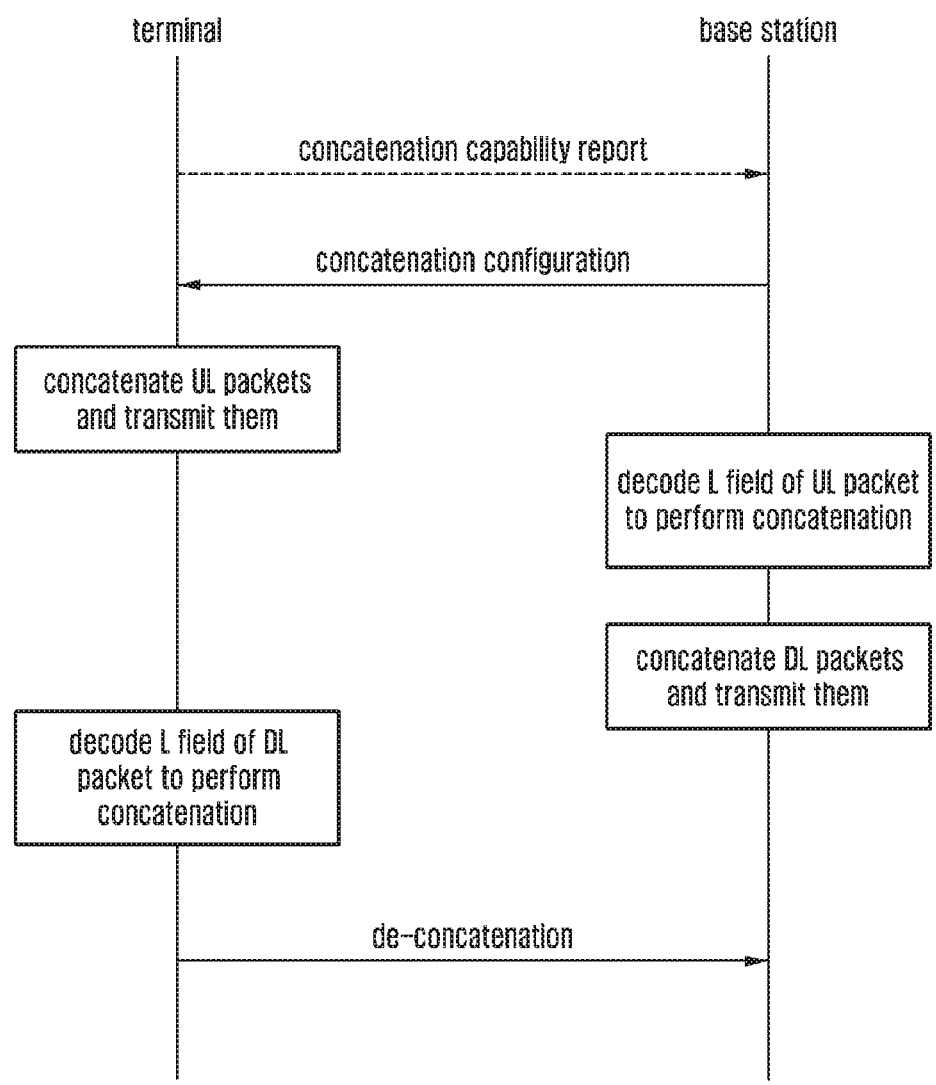
FIG. 9 is a signal flow diagram illustrating another message exchange and data processing procedure for IP concatenation between a terminal and a base station according to the first embodiment of the disclosure.

FIG. 9 is a signal flow diagram illustrating another message exchange and data processing procedure for IP concatenation between a terminal and a base station according to the first embodiment of the disclosure.

The IP concatenation may be performed only when the terminal has an IP concatenation capability. The terminal may transmit its IP concatenation capability information to the base station, and the base station may indicate use of IP concatenation to the terminal based on this information. The terminal's IP concatenation capability information may be included in a UE Capability Report message being transmitted by the terminal.

The base station may indicate use of IP concatenation to the terminal using a concatenation configuration message. The concatenation configuration message may be transmitted in the form of a field of another message such as RRC Connection Setup message and RRC Connection Reconfiguration message or as a separate message. After receiving this message, the terminal may perform IP concatenation on uplink IP packets and transmit them. The base station may decode the total length field field) of received uplink packets to recover individual IP packets IP-concatenated in an SDU. After receiving the IP-concatenated uplink message, the base station may perform IP concatenation on downlink IP packets and transmit them. The terminal may decode the total length field (L field) of received downlink packets to recover individual IP packets IP-concatenated in an SDU. The IP concatenation may be configured to be performed always or subject to a predetermined condition.

The base station may indicate release of IP concatenation to the terminal using a concatenation release message. The concatenation release message may be transmitted in the form of a field of another message such as RRC Connection Reconfiguration message or as a separate message. After receiving this message, the terminal stops IP concatenation of uplink IP packets, and the base station does not need to decode the total length field (L field) of the received uplink packets anymore. After transmitting this message, the base station may stop IP concatenation of downlink IP packets, and the terminal does not need to decode the total length field (L field) of the received downlink packets anymore.

In an alternative embodiment, the terminal may transmit a concatenation release confirmation message to the base station in response to the concatenation release message from the base station. The concatenation release confirmation message may be carried in an RRC Connection Reconfiguration Complete message by way of example. After receiving the concatenation release confirmation message, the base station stops performing IP concatenation on downlink IP packets; after transmitting the concatenation release confirmation message, the terminal does not need to decode the total length field (L field) of the received downlink packets. After transmitting the concatenation release confirmation message, the terminal stops performing IP concatenation on uplink packets; after receiving the concatenation release confirmation message, the base station does not need to decode the total length field (L field) of the received uplink packets.

Figure 10:
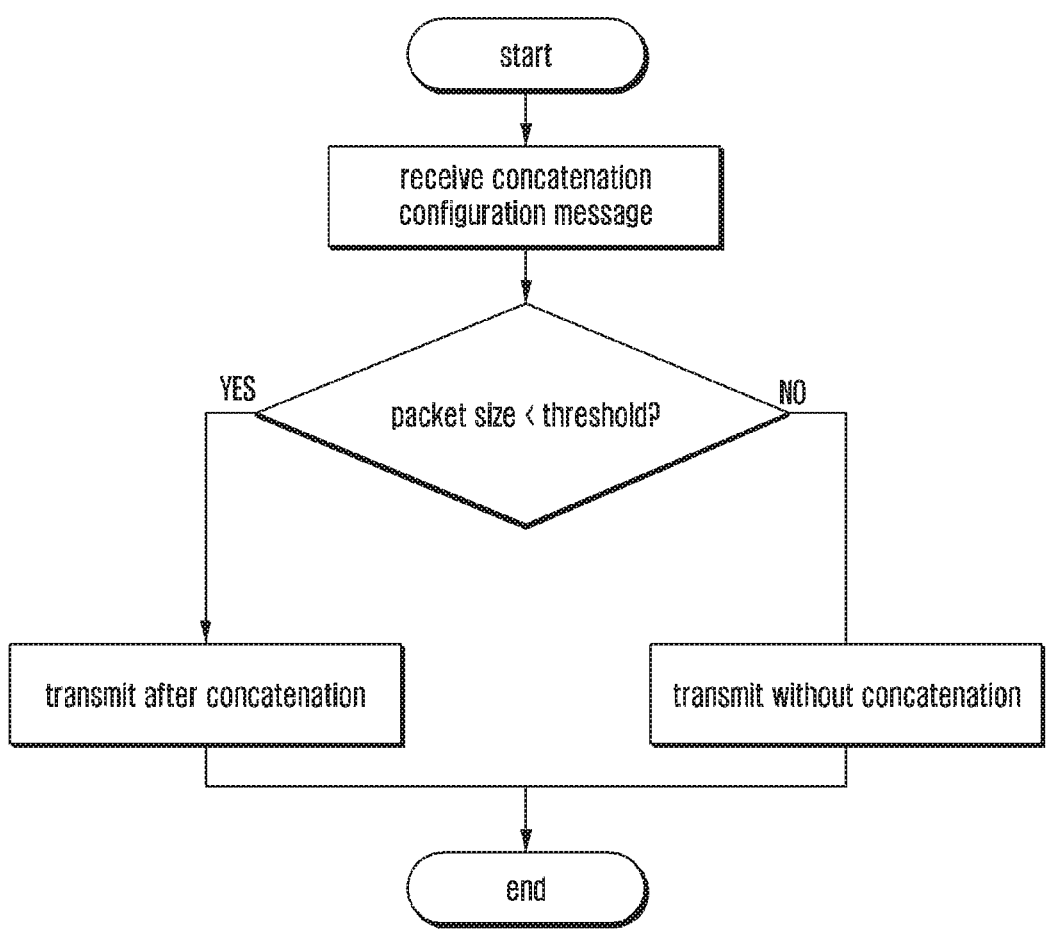
FIG. 10 is a flowchart illustrating an exemplary IP concatenation procedure according to the first embodiment of the procedure.

FIG. 10 is a flowchart illustrating an exemplary IP concatenation procedure according to the first embodiment of the procedure. In the embodiment of FIG. 10, a terminal performs IP concatenation only when a packet size is less than a predetermined threshold after receiving a concatenation configuration message. This threshold value may be preconfigured or indicated in the concatenation configuration message or the like transmitted from a base station to the terminal.

In an alternative embodiment, the IP concatenation may be performed if the packet size is less than a threshold "a" and a size of the concatenated packets (SDU) is less than a threshold "b". In another embodiment, the IP concatenation may be performed on IP packets generated before a predetermined time after starting concatenation if the packet size is less than a threshold "c" and the size of the concatenated packets (SDU) is less than a threshold "d".

In an alternative embodiment, the IP concatenation may be performed if the size of the concatenated packets (SDU) is less than a threshold "e". Here, the thresholds a, b, c, d, and e may be preconfigured or indicated in a concatenation configuration message or the like transmitted from a base station to the terminal.

Besides, various other IP concatenation conditions may be configured as follows.

Perform IP concatenation only when a packet size is equal to or less than a predetermined threshold value Perform IP concatenation only when a total size of IP-concatenated packets (SDU) is equal to or less than a predetermined threshold value Perform IP concatenation only on packets arriving before a predetermined time after arrival of a packet to be transmitted Perform IP concatenation only on a predetermined number of IP packets Perform IP concatenation only on packets with a preconfigured QoS Flow ID Perform IP concatenation only on packets on a preconfigured DRB Each or a combination of two or more conditions may be used for the IP concatenation.

Figure 11:
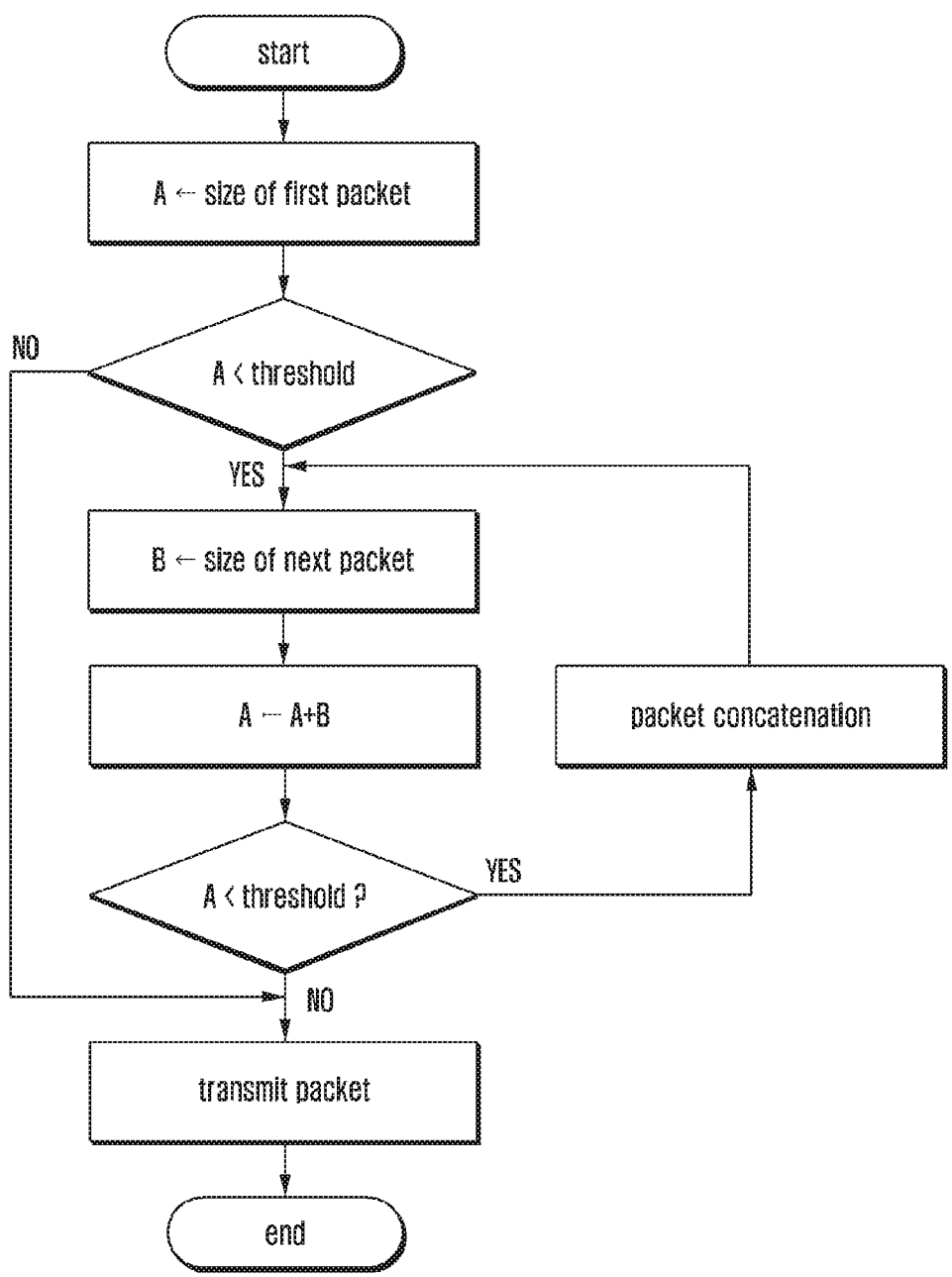
FIG. 11 is a flowchart illustrating another exemplary IP concatenation procedure according to the first embodiment of the disclosure.

FIG. 11 is a flowchart illustrating another exemplary IP concatenation procedure according to the first embodiment of the disclosure. In the embodiment of FIG. 11, the IP concatenation is performed when the total size of the concatenated packets (SDU) is less than a threshold. In this embodiment, variables A and B are used for determining whether to perform IP concatenation for packet transmission.

First, a size of a first IP packet that is not IP-concatenated is updated with the variable A. If A is less than a packet size threshold, it is determined to perform the IP concatenation. If not, the corresponding packet is handled as a single SDU so as to be transmitted with no IP concatenation. In order to determine whether to perform IP concatenation, the size of the next IP packet is updated with the variable B. After updating the variable A with the sum of A and B, if A is greater than the packet size threshold, the corresponding packet is concatenated. If not, the corresponding packet is handled as a single SDU in the current state. Updating a size of the next IP packet with the variable B after concatenating the packet, the previous operation may be performed repetitively until the variable A becomes equal to or greater than the packet size threshold. This threshold may be a preconfigured value or a value indicated in a concatenation configuration message or the like transmitted from the base station to the terminal.

Figure 12:
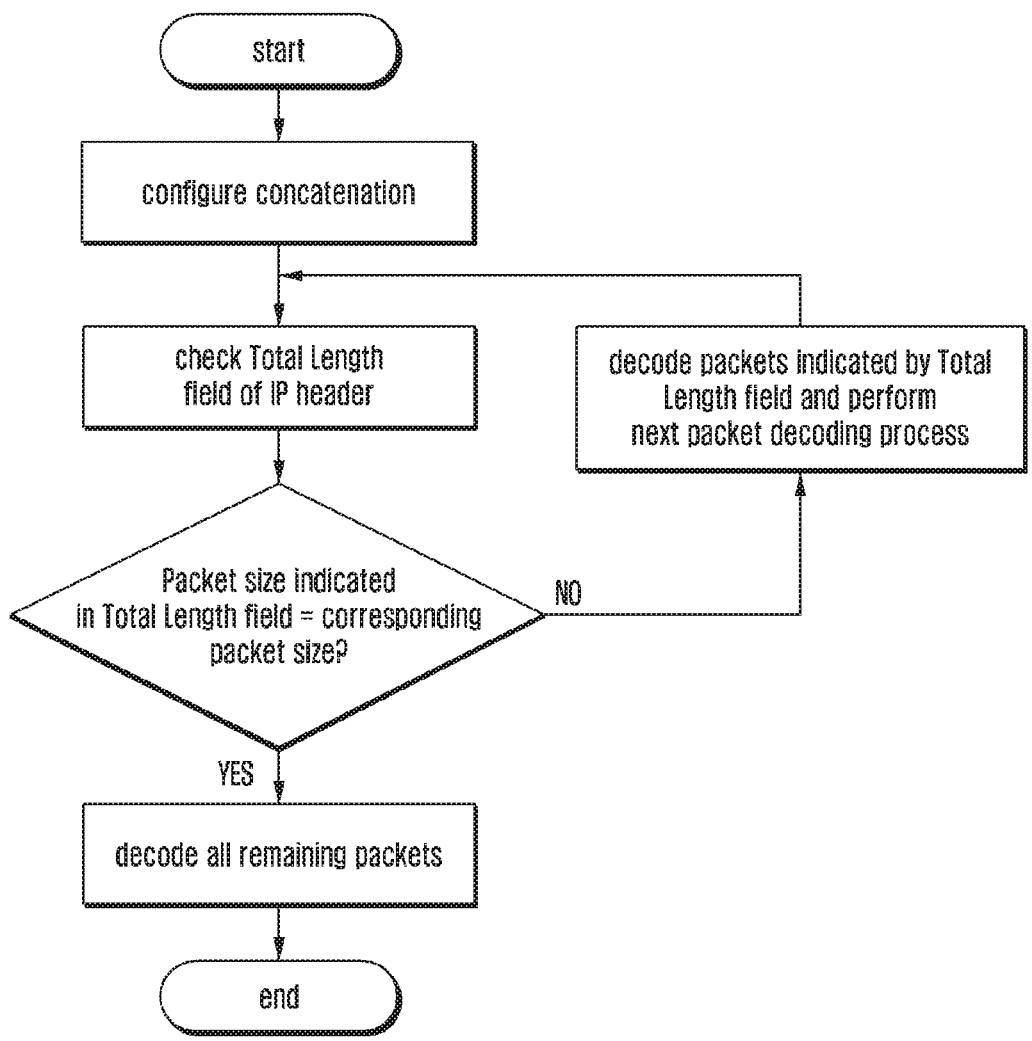
FIG. 12 is a flowchart illustrating an exemplary IP-concatenated packet de-concatenation procedure of a receiver according to the first embodiment of the disclosure.

FIG. 12 is a flowchart illustrating an exemplary IP-concatenated packet de-concatenation procedure of a receiver according to the first embodiment of the disclosure. This procedure assumes that IP concatenation is configured. The IP concatenation may be configured with the concatenation configuration message described with reference to FIGS. 7 to 9.

After receiving an SDU of concatenated IP packets, the receiver may decode a total length field of the IP header to determine whether the packets are ID-concatenated based on the decoded information. It may be possible to determine whether the value of the total length field does not match the packet size (length of remaining part of the SDU). If they match, this means that the packet is not IP-concatenated such that the remaining packets are decoded and transmitted to the upper layer. If they do not match, the receiver cuts at the point indicated by the total length field to recover a single IP packet, determines that a new IP header follows the corresponding point, and performs the total length decoding again. This process may be repetitively performed until the value of the total length field matches the size of the corresponding packet (length of remaining part of the SDU).

Figure 13:
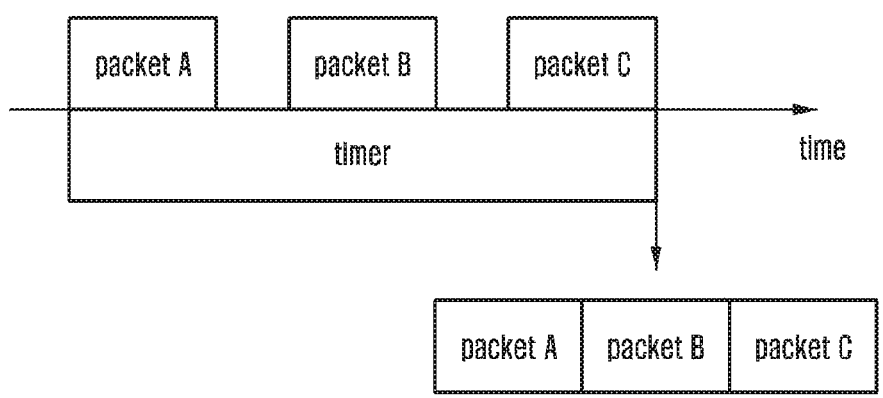
FIG. 13 is a diagram illustrating another exemplary IP concatenation procedure of a terminal according to the first embodiment of the disclosure.

FIG. 13 is a diagram illustrating another exemplary IP concatenation procedure of a terminal according to the first embodiment of the disclosure. In the embodiment of FIG. 13, it is assumed that IP packets A, B, and C arrive at layer 2 in order. Here, it is assumed that the packets A, B, and C may be IP-concatenated because of their small sizes or according to a predetermined condition. In the embodiment of FIG. 13, IP concatenation is performed only on the packets (packets B and C) arriving at layer 2 in a time after the arrival of the first IP packet (packet A), the time being indicated by a predetermined time value. The predetermined time may be a preconfigured value or a value transmitted from the base station to the terminal. The predetermined time may be indicated by a timer.

Figure 14:
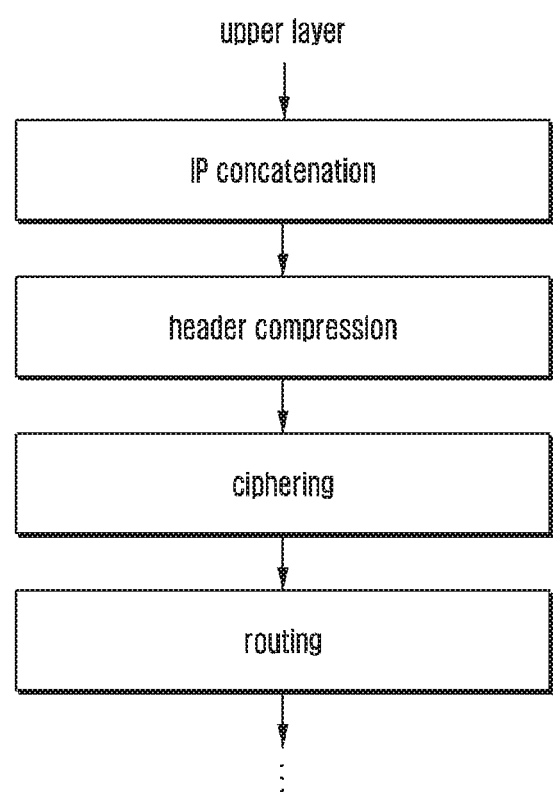
FIG. 14 is a flowchart illustrating an order of operations for layer 2 protocol IP concatenation in a transmitter according to the first embodiment of the disclosure.

FIG. 14 is a flowchart illustrating an order of operations for layer 2 protocol IP concatenation in a transmitter according to the first embodiment of the disclosure.

The IP concatenation may start at a time point when an IP packet arrives from an upper layer and ends before header compression starts in a normal packet processing procedure. Afterward, ciphering and routing processes may be performed. Although data processing in other transmitters are not shown in FIG. 14, the embodiment of FIG. 14 is characterized in that the IP concatenation is performed before the IP header.

Figure 15:
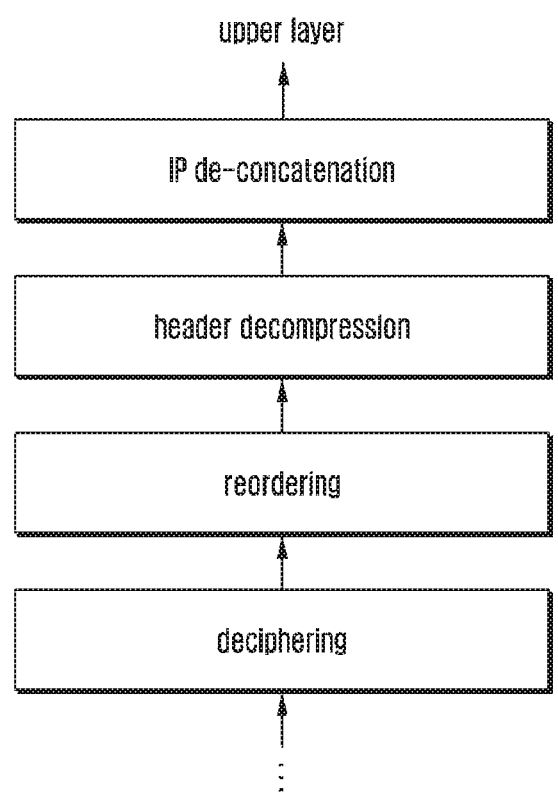
FIG. 15 is a flowchart illustrating an order of operations for layer 2 protocol IP-concatenated packet de-concatenation (IP Reassembly) in a transmitter according to the first embodiment of the disclosure.

FIG. 15 is a flowchart illustrating an order of operations for layer 2 protocol IP-concatenated packet de-concatenation (IP Reassembly) in a transmitter according to the first embodiment of the disclosure.

De-concatenation of the IP-concatenated packets may start immediately before an IP packet is transmitted to the upper layer, i.e., after header decompression starts in a normal packet processing procedure. Previously, reordering and deciphering processes may be performed. Although data processing in other transmitters are not shown in FIG. 15, the embodiment of FIG. 15 is characterized in that the IP-concatenated packet de-concatenation is performed immediately before the IP packet is transmitted to the upper layer.

Figure 16:
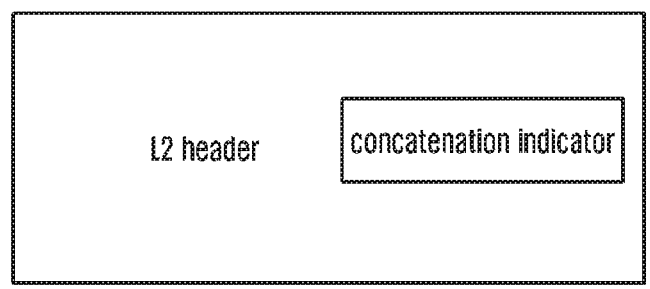
FIG. 16 is a diagram illustrating an exemplary layer 2 (L2) header including a concatenation indicator according to the first embodiment of the disclosure.

FIG. 16 is a diagram illustrating an exemplary layer 2 (L2) header including a concatenation indicator according to the first embodiment of the disclosure. In the case where IP concatenation is performed, a receiver has to decode a total length field of an IP header, which increases processing of the receiver. Such a processing overhead may be mitigated with a concatenation indicator.

The concatenation indicator may be a 1-bit indicator indicating whether the data (SDU) following a layer 2 header is IP-concatenated. If the concatenation indicator indicates that the IP concatenation has been performed, the receiver decodes the total length field to de-concatenate the IP-concatenated packets. If not, there is no need to decode the IP packet.

Figure 17:
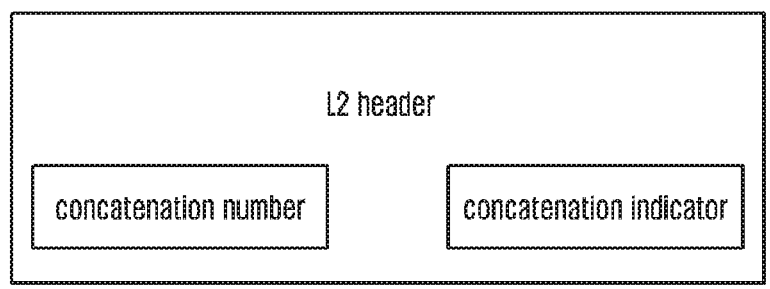
FIG. 17 is a diagram illustrating an exemplary layer 2 (L2) header including a concatenation indicator and a concatenation number according to the first embodiment of the disclosure.

FIG. 17 is a diagram illustrating an exemplary layer 2 (L2) header including a concatenation indicator and a concatenation number according to the first embodiment of the disclosure. In the case where IP concatenation is performed, a receiver has to decode a total length field of an IP header, which increases processing of the receiver. Such a processing overhead may be mitigated using a concatenation indicator. Such a processing overhead may be mitigated with the concatenation indicator and the concatenation number.

The concatenation indicator may be a 1-bit indicator indicating whether the data (SDU) following a layer 2 header is IP-concatenated. If the concatenation indicator indicates that the IP concatenation has been performed, the receiver decodes the total length field to de-concatenate the IP-concatenated packets. If not, there is no need to decode the IP packet. The concatenation number denotes a number of IP packets concatenated in the corresponding SDU. If a concatenation indicator field indicates that the IP concatenation has been performed and a concatenation number field is set to a value, the receiver may decode the total length field as many times as the concatenation number to recover the IP packets.

Figure 18:
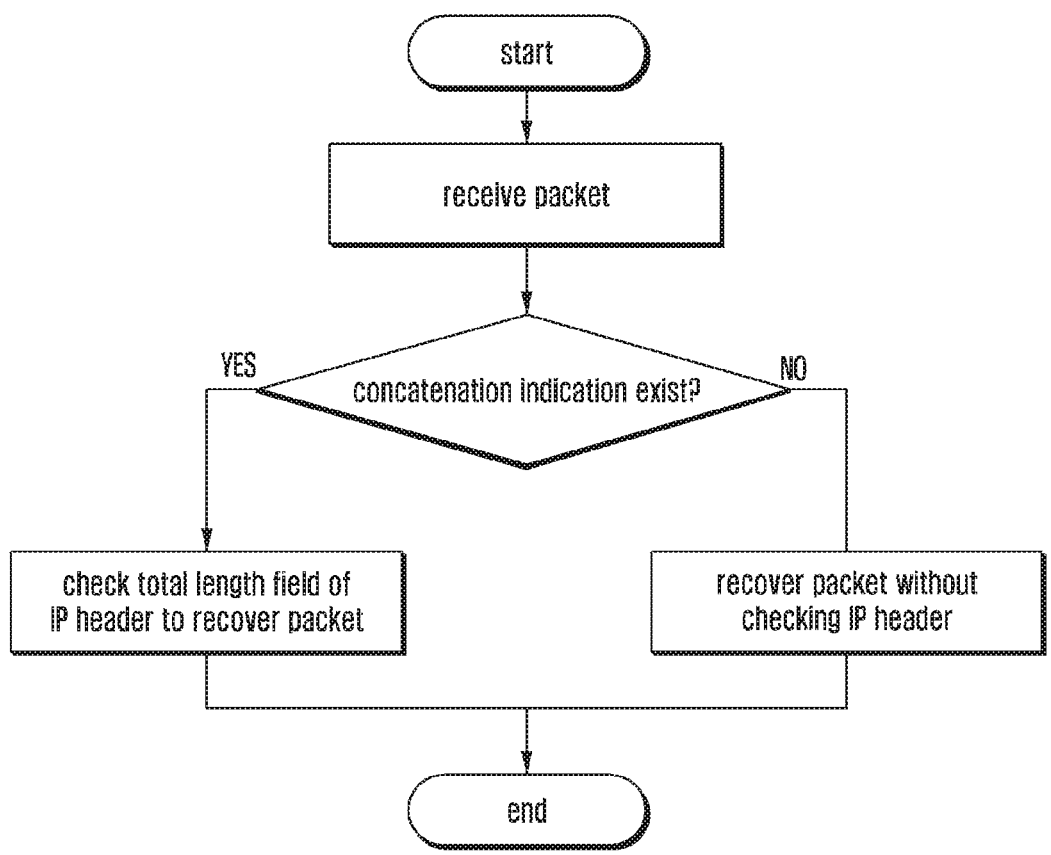
FIG. 18 is a flowchart illustrating an exemplary IP-concatenated packet de-concatenation procedure of a receiver according to the first embodiment of the disclosure.

FIG. 18 is a flowchart illustrating an exemplary IP-concatenated packet de-concatenation procedure of a receiver according to the first embodiment of the disclosure. This procedure assumes that IP concatenation is configured with a concatenation configuration message described with reference to FIGS. 7 to 9 and the concatenation indicator described with reference to FIGS. 16 and 17 is included in the layer 2 header. If the concatenation indicator indicates that IP concatenation has been performed, the receiver decodes the total length field to de-concatenate IP-concatenated packets. If not, there is no need to decode the IP packet.

Figure 19:
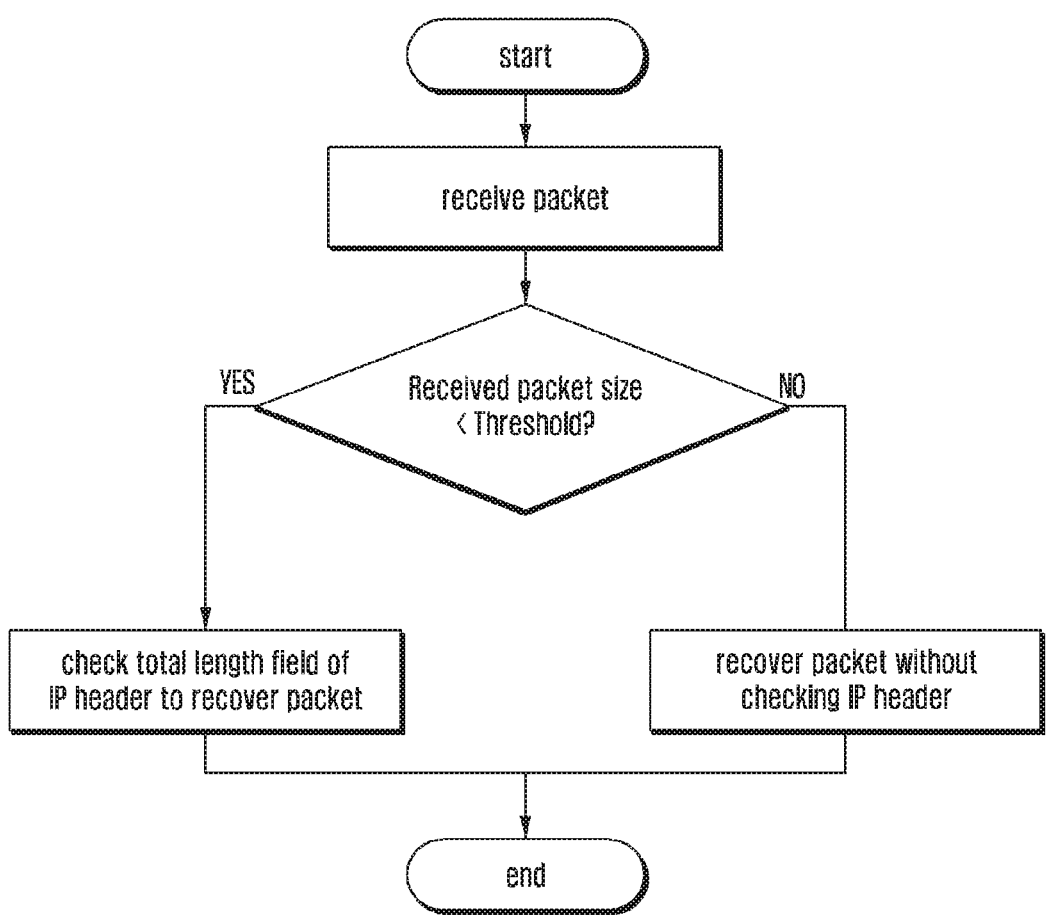
FIG. 19 is a flowchart illustrating another exemplary IP-concatenated packet de-concatenation procedure of a receiver according to the first embodiment of the disclosure.

FIG. 19 is a flowchart illustrating another exemplary IP-concatenated packet de-concatenation procedure of a receiver according to the first embodiment of the disclosure. This procedure assumes that IP concatenation is configured with a concatenation configuration message described with reference to FIG. 7 to 9 or has been preconfigured. In the embodiment of FIG. 19, the receiver decodes the total length field of an IP header to recover the IP packets only if the size of the received packets (SDU) is less than a predetermined threshold value. In this case, the transmitter is not allowed to perform IP concatenation producing an SDU of a size that is equal to or greater than the threshold value. If the size of the SDU received by the receiver is greater than the threshold value, the receiver may determine that IP concatenation has not been performed. The threshold value may be preconfigured or transmitted from the base station to the terminal. In the embodiment of FIG. 19, the concatenation indicator may also be used along with other conditions.

The other conditions may be configured for the IP-concatenated packet de-concatenation procedure of the embodiment of FIG. 19. Examples of the conditions are as follows.

Figure 20:
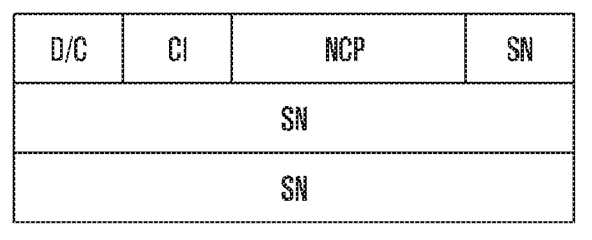

Perform an IP-concatenated packet de-concatenation procedure if a size of received packets (SDU) is greater than a threshold value Perform an IP-concatenated packet de-concatenation procedure if a size of received packets (SDU) is less than a threshold value Perform an IP-concatenated packet de-concatenation procedure if received packets (SDU) are transmitted over a specific bearer Perform an IP-concatenated packet de-concatenation procedure if received packets (SDU) have a specific QoS Flow ID Perform an IP-concatenated packet de-concatenation procedure if received packets (SDU) are transmitted over a specific bearer and a size of the packets is greater than a threshold value Perform an IP-concatenated packet de-concatenation procedure if received packets (SDU) are transmitted over a specific bearer and a size of the packets is less than a threshold value Perform an IP-concatenated packet de-concatenation procedure if received packets (SDU) have a specific QoS Flow ID and a size of the packets is greater than a threshold value Perform an IP-concatenated packet de-concatenation procedure if received packets (SDU) have a specific QoS Flow ID and a size of the packets is greater than a threshold value FIG. 20 is a diagram illustrating an exemplary format of a PDCP header (L2 Header) including a concatenation indicator (CI) and a concatenation number (number of concatenated packets (NCP)) according to the first embodiment of the disclosure.

It is not mandatory that both the CI and NCP should be included in the PDCP header (L2 Header), and it may be possible that one of the CI and NCP is included in the PDCP header. The PDCP header may include a data/control (D/C) field and a sequence number (SN) field.

In the case of including a CI field, if the transmitter performs IP concatenation, the CI field may be set to a value indicating that IP concatenation is performed. In the case of including an NCP field, the NCP field may be set to a value indicating a number of IP packets IP-concatenated by the transmitter. The receiver may determine whether to decode the total length field of the IP header based on the values of the CI and NCP fields.

Figure 21:
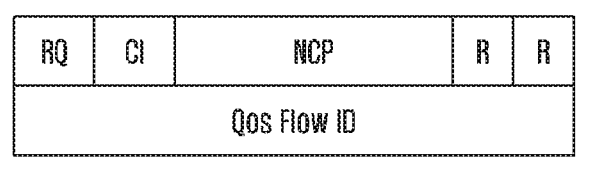

FIG. 21 is a diagram illustrating an exemplary format of a QoS sublayer header including a concatenation indicator (CI) and concatenation number (Number of Concatenated Packets (NCP)) according to the first embodiment of the disclosure.

It is not mandatory that both the CI and NCP should be included in the QoS sublayer header, and it may be possible that one of the CI and NCP is included in the QoS sublayer header. The QoS sublayer header may include a Reflected. QoS (RQ) field and a QoS Flow ID field.

In the case of including a CI field, if the transmitter performs IP concatenation, the CI field may be set to a value indicating that IP concatenation is performed. In the case of including an NCP field, the NCP field may be set to a value indicating a number of IP packets IP-concatenated by the transmitter. The receiver may determine whether to decode the total length field of the IP header based on the values of the CI and NCP fields.

Figure 22:
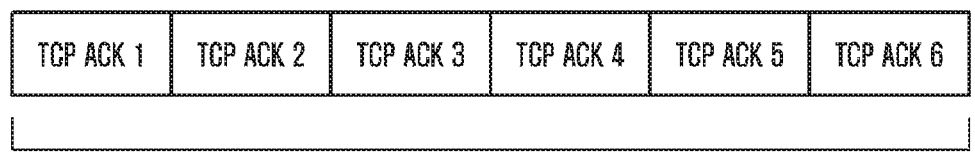
FIG. 22 is a diagram illustrating an exemplary situation of transmitting multiple TCP ACKs according to the first embodiment of the disclosure.

FIG. 22 is a diagram illustrating an exemplary situation of transmitting multiple TCP ACKs according to the first embodiment of the disclosure. In a system supporting ultra-high-speed transmission such as a 5G communication system, multiple packets may be multiplexed, IP-concatenated, and RLC-concatenated during a TTI as a scheduling unit. In the case of using a transport layer protocol such as TCP using an automatic repeat request (ARQ) scheme, multiple ACKs corresponding to received packets may occur during a TTI. In the embodiment of FIG. 22, it is exemplified that a total 6 TCP ACKs of TCP ACK 1 to TCP ACK 6 occur.

Figure 23:
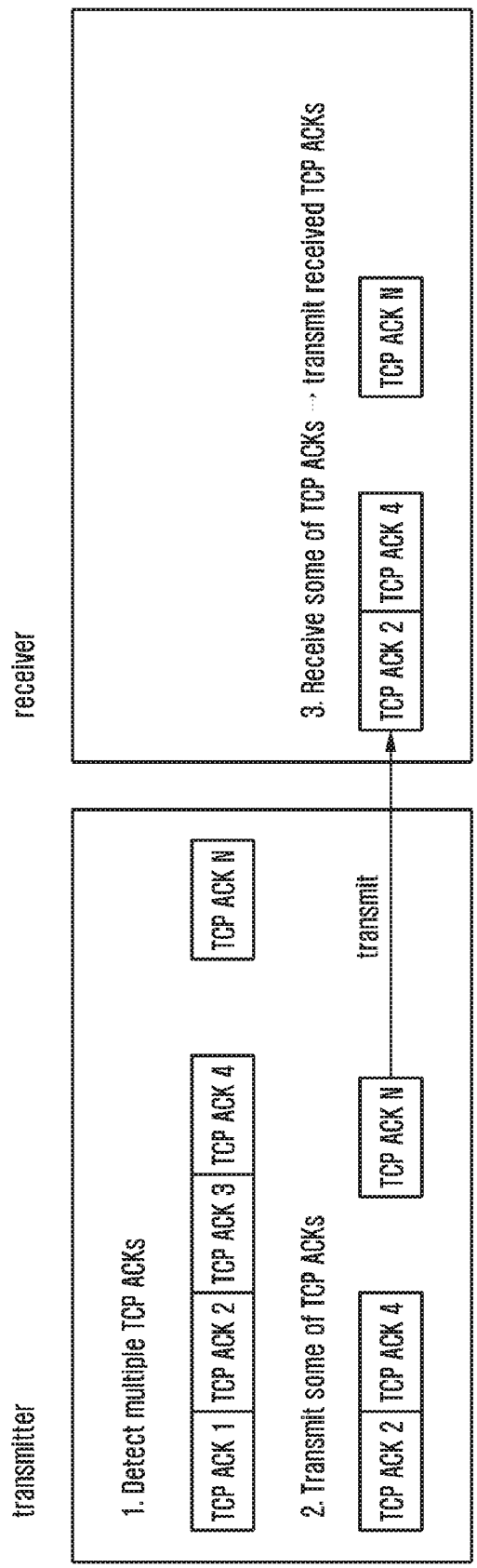
FIG. 23 is a diagram illustrating an exemplary operation of transmitting some of multiple ACKs selectively according to the first embodiment of the disclosure.

FIG. 23 is a diagram illustrating an exemplary operation of transmitting some of multiple ACKs selectively according to the first embodiment of the disclosure. FIG. 23 assumes that a total N packets, i.e., TCP ACK 1 to TCP ACK N, can be transmitted. However, if a large number of packets are transmitted simultaneously during a short time period in a high-speed transmission environment, this may cause excessive occupancy of a link. Transmitting some of the total N packets during the short time period may hardly impact the End-to-End TCP performance. The embodiment of FIG. 23 is characterized in that, when packets generated in the transmitter are recognized as TCP ACKs, some of the TCP ACKs are selectively transmitted to the receiver in which the corresponding received packets are transmitted to the upper layer as they are. Here, a method for selecting the TCP ACKs to be transmitted may be preconfigured or determined subject to a condition configured by the base station.

Although the embodiment of FIG. 23 assumes that one of every two TCP ACKs are transmitted, the TCP ACKs to be transmitted may be selected in various patterns. It may be possible to apply, but it is not limited to, the following conditions.

Transmit one of every predetermined number of TCP ACKs

Transmit latest TCP ACK in one TTI

Transmit predetermined number of latest TCP ACKs in one TTI

In this case, the predetermined number of TCP ACKs or a condition may be preconfigured. It may be possible for the base station to transmit such a configuration to the terminal.

Figure 24:
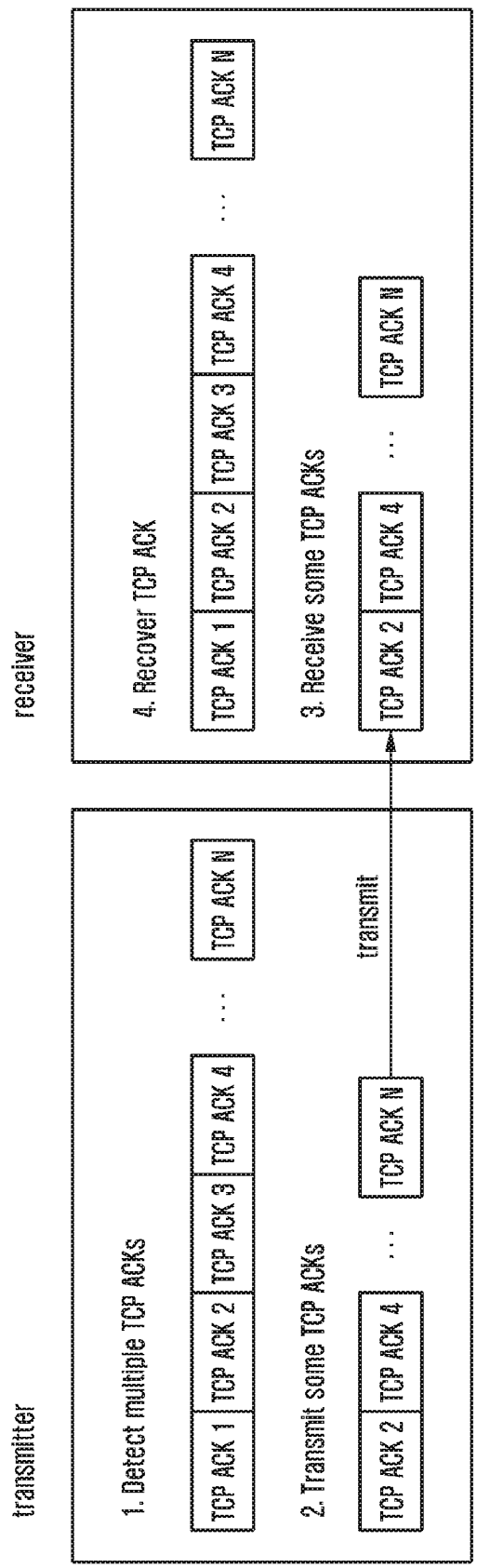
FIG. 24 is a diagram illustrating another exemplary operation of transmitting some of multiple ACKs selectively according to the first embodiment of the disclosure.

FIG. 24 is a diagram illustrating another exemplary operation of transmitting some of multiple ACKs selectively according to the first embodiment of the disclosure. FIG. 24 assumes that a total N packets, i.e., TCP ACK 1 to TCP ACK N, can be transmitted. However, if a large number of packets are transmitted simultaneously during a short time period in a high-speed transmission environment, this may cause excessive occupancy of a link. Transmitting some of the total N packets during the short time period may hardly impact the End-to-End TCP performance. The embodiment of FIG. 24 is characterized in that, when packets generated in the transmitter are recognized as TCP ACKs, some of the TCP ACKs are transmitted to the receiver in which all of the TCP ACKs that are assumed as being generated in the transmitter or some of all the TCP ACKs are recovered and transmitted to the upper layer. Here, a method for selecting the TCP ACKs to be transmitted may be preconfigured or determined subject to a condition configured by the base station. A method for the receiver to recover the TCP ACKs may be preconfigured or determined subject to a condition configured by the base station.

Although the embodiment of FIG. 24 assumes that one of every two TCP ACKs are transmitted, the TCP ACKs to be transmitted may be selected in various patterns. It may be possible to apply, but it is not limited to, the following conditions.

Transmit one of every predetermined number of TCP ACKs

Transmit latest TCP ACK in one TTI

Transmit predetermined number of latest TCP ACKs in one TTI

In this case, the predetermined number of TCP ACKs or a condition may be preconfigured. It may be possible for the base station to transmit such configuration to the terminal.

In the embodiment of FIG. 24, it is assumed that the receiver receives one of every two TCP ACKs and recovers TCP ACK 1 to TCP ACK N based on information on the TCP ACKs received in that manner. This may be implemented with a procedure of updating an ACK field of a TCP header to recover TCP ACK packets. It may also be possible to recover some of the TCP ACKs in such a way that the transmitter transmits one of every 4 TCP ACKs and the receiver recovers one of every two TCP ACKs. In this case, the predetermined number of TCP ACKs or a condition may be preconfigured. It may be possible for the base station to transmit such a configuration to the terminal.

Figure 25:
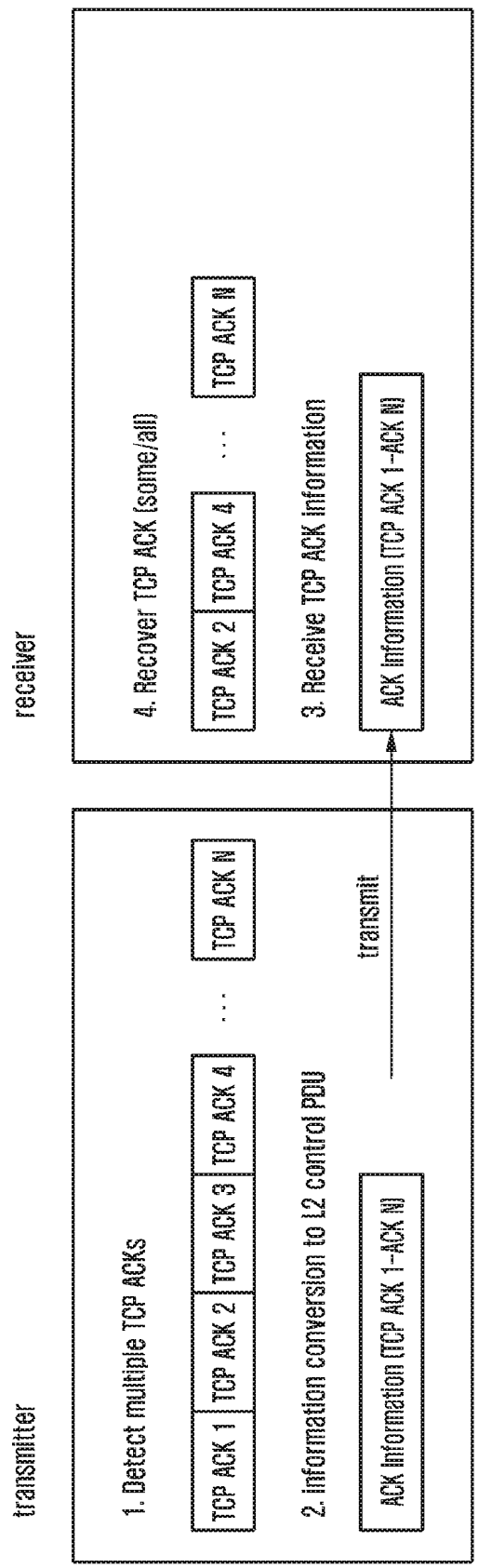
FIG. 25 is a diagram illustrating another exemplary operation of transmitting some of multiple ACKs selectively according to the first embodiment of the disclosure.

FIG. 25 is a diagram illustrating another exemplary operation of transmitting some of multiple ACKs selectively according to the first embodiment of the disclosure. FIG. 25 assumes that a total N packets, i.e., TCP ACK 1 to TCP ACK N, can be transmitted. However, if a large number of packets are transmitted simultaneously during a short time period in a high-speed transmission environment, this may cause excessive occupancy of a link. Transmitting some of the total N packets during the short time period may hardly impact the End-to-End TCP performance. The embodiment of FIG. 25 is characterized in that, when packets generated in the transmitter are recognized as TCP ACKs, information on the TCP ACKs, rather than the TCP ACK packets, is transmitted via a layer 2 control packet (PDU). In this case, the control packet includes information on indices of the TCP ACKs generated in the transmitter. In the embodiment of FIG. 25, the information on N TCP ACKs, i.e., TCP ACK 1 to TCP ACK N, is included in the control packet. The receiver may recover all or some of the TCP ACKs based on the information included in the control packet. A method for the receiver to recover the TCP ACKs may be preconfigured or determined subject to a condition configured by the base station.

In the embodiment of FIG. 25, the receiver may recover one of every two TCP ACKs. In this case, TCP ACK 2, TCP ACK 4, TCP ACK 6, . . . , TCP ACK N are recovered and transmitted to the upper layer. Such a recovery method may be preconfigured or determined subject to a condition transmitted by the base station.

Figure 26:
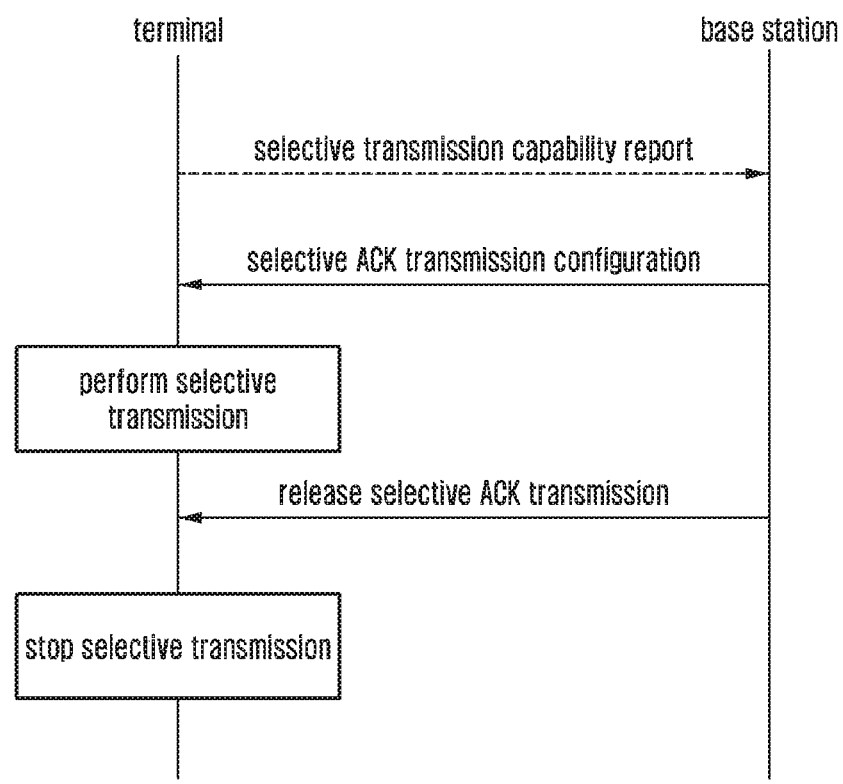
FIG. 26 is a signal flow diagram illustrating a selective TCP ACK transmission procedure described with reference to FIGS. 23 to 25 according to the first embodiment of the disclosure.

FIG. 26 is a signal flow diagram illustrating a selective TCP ACK transmission procedure described with reference to FIGS. 23 to 25 according to the first embodiment of the disclosure. The selective TCP ACK transmission may be executed only when the terminal and the base station support a selective TCP ACK transmission function. The terminal may transmit a selective transmission function report message to notify the base station of the terminal's selective TCP ACK transmission capability. The information indicating whether the terminal has the selective TCP ACK transmission capability may be included in the UE Capability Report message.

The base station may indicate use of the selective TCP ACK transmission. This indication may be carried in a selected ACK transmission configuration message. This indication may also be included in other messages such as RRC Connection Setup and RRC Connection Reconfiguration messages. The selective TCP ACK transmission may also be determined per DRB. The corresponding message may include a condition for the selective TCP ACK transmission and information on whether to recover the TCP ACKs and how to recover the TCP ACKs. The message may also include information on whether to use a Control PDU to transmit the TCP ACK information. The message may also include information being transmitted from the base station and the terminal as described with reference to FIGS. 23 to 25. After receiving the selected ACK transmission configuration message, the terminal may perform selective TCP ACK transmission based on the information included in the message.

Afterward, the base station may indicate release of the selective TCP ACK transmission. This indication may be carried in a selected ACK transmission release message. This indication may also be included in other messages such as RRC Reconfiguration and RRC Connection Release message. Releasing the selective TCP ACK transmission may be determined per DRB. After receiving the selected ACK transmission release message, the terminal may stop the selective TCP ACK transmission.

In an alternative embodiment, the terminal may transmit a selected ACK transmission release configuration message to the base station in response to the selected ACK transmission release message. After transmitting the selected ACK transmission release configuration message, the terminal may stop the selective TCP ACK transmission. After receiving the selected ACK transmission release configuration message, the base station stops the selective TCP ACK transmission.

Figure 27:
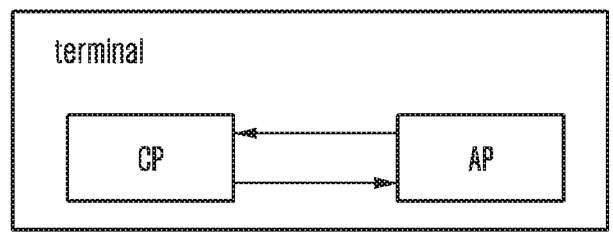
FIG. 27 is a block diagram illustrating a configuration of a terminal including a communication processor (CP) and an application processor (AP) according to the first embodiment of the disclosure.

FIG. 27 is a block diagram illustrating a configuration of a terminal including a communication processor (CP) and an application processor (AP) according to the first embodiment of the disclosure. The CP may include a physical layer and a data link layer. The AP may include a network layer, a transport layer, and an application layer. Typically, it is assumed that upper layers above the data link layer (layer 2) reside in the AP.

Typically, the data generated in the application layer of the AP may be sent to the CP according to a communication protocol. The data arrived at the CP may be processed and sent back to the AP according to the communication protocol. The AP and the CP may exchange control messages as well as data.

Figure 28:
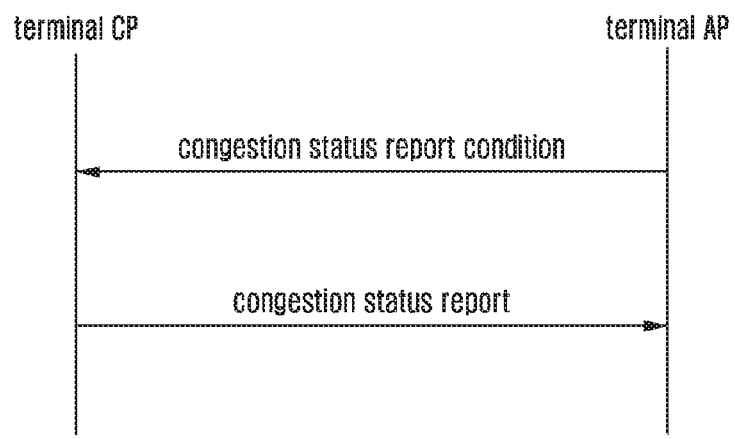
FIG. 28 is a signal flow diagram illustrating an exemplary control message exchange procedure between an AP and a CP according to the first embodiment of the disclosure.

FIG. 28 is a signal flow diagram illustrating an exemplary control message exchange procedure between an AP and a CP according to the first embodiment of the disclosure. According to the TCP specification, TCP ACK transmission may be delayed in order to reduce a TCP ACK overload on the TCP layer. The TCP ACK transmission delay may be executed in such a way of generating a TCP ACK after a predetermined number of TCP packets rather than transmitting a. TCP ACK immediately after receiving a TCP packet. For example, a TCP ACK may be transmitted per three TCP ACKs. The number of TCP packets for which a TCP ACK is transmitted may vary according to the transmission situation of the CP. In the embodiment of FIG. 28, the AP requests to the CP for transmission situation information (congestion status), and the CP sends the transmission situation information (congestion status) to the AP.

The AP may send a congestion status report condition message to request to the CP for reporting a congestion status when a predetermined condition is fulfilled. This message may be configured with predetermined conditions as follows.

Buffering delay time (L2 delay time, time for actual transmission at CP, etc.) at CP is longer than a predetermined time Radio resource congestion degree is greater than a predetermined value Downlink RSSI is greater than a predetermined value Downlink RSRP is greater than a predetermined value Data rate of CP is greater than a predetermined value Predetermined sequence number size is in use Number of TCP ACKs carried per TTI is greater than a predetermined value In addition, various alternative conditions may be configured.

If a condition configured in the congestion status report condition message is fulfilled, the CP may send a congestion status report message to the AP. This message may include information as follows, Conditions triggering congestion status report message transmission Buffering delay time (L2 delay time, time for actual transmission at CP, etc.)
Predetermined value of radio resource congestion degree
Predetermined value of downlink RSSI
Predetermined value of RSRP
Data rate of CP
Sequence number size in use
Number of TCP ACKs carried per TTI In addition, other alternative values or corresponding indices may be configured.

Figure 29:
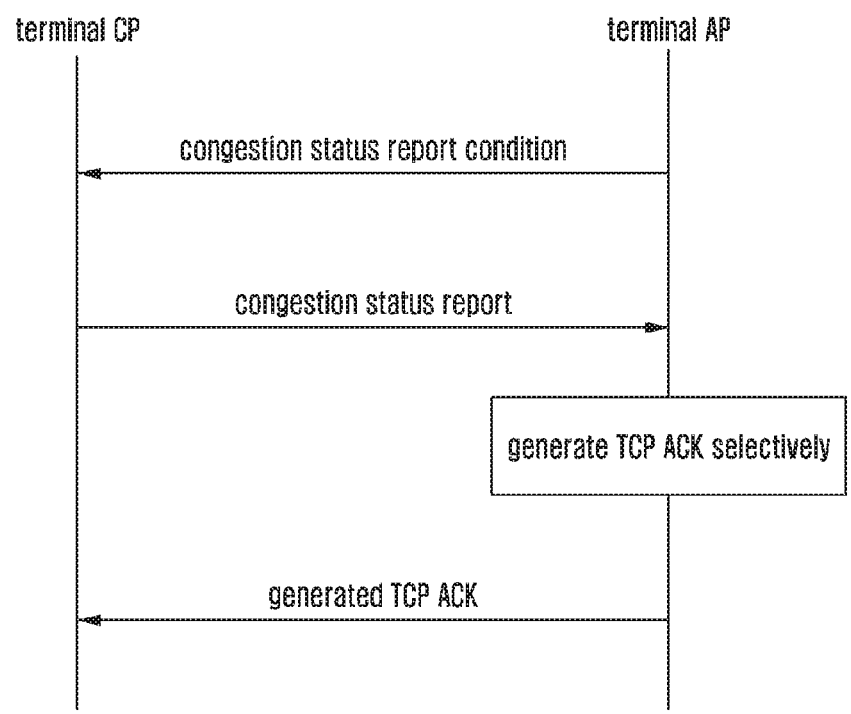
FIG. 29 is a signal flow diagram illustrating another exemplary control message exchange procedure between an AP and a CP according to the first embodiment of the disclosure.

FIG. 29 is a signal flow diagram illustrating another exemplary control message exchange procedure between an AP and a CP according to the first embodiment of the disclosure.

According to the TCP specification, TCP ACK transmission may be delayed in order to reduce a TCP ACK overload on the TCP layer. The TCP ACK transmission delay may be executed in such a way of generating a TCP ACK after a predetermined number of TCP packets rather than transmitting a TCP ACK immediately after receiving a TCP packet. For example, a TCP ACK may be transmitted per three TCP ACKs. The number of TCP packets for which a TCP ACK is transmitted may vary according to the transmission situation of the CP. In the embodiment of FIG. 29, the AP requests to the CP for transmission situation information (congestion status), the CP sends the transmission situation information (congestion status) to the AP, and the AP generates a TCP ACK selectively based on the congestion status and sends the TCP ACK to the CP.

The AP may send a congestion status report condition message to request to the CP for reporting a congestion status when a predetermined condition is fulfilled. This message may be configured with predetermined conditions as follows.

Buffering delay time (L2 delay time, time for actual transmission at CP, etc.) at CP is longer than a predetermined time
Radio resource congestion degree is greater than a predetermined value
Downlink RSSI is greater than a predetermined value
Downlink RSRP is greater than a predetermined value
Data rate of CP is greater than a predetermined value
Predetermined sequence number size is in use
Number of TCP ACKs carried per TTI is greater than a predetermined value In addition, various alternative conditions may be configured.

If a condition configured in the congestion status report condition message is fulfilled, the CP may send a congestion status report message to the AP. This message may include information as follows.

Conditions triggering congestion status report message transmission
Buffering delay time (L2 delay time, time for actual transmission at CP, etc.)
Predetermined value of radio resource congestion degree
Predetermined value of downlink RSSI
Predetermined value of RSRP
Data rate of CP
Sequence number size in use
Number of TCP ACKs carried per TTI In addition, other alternative values or corresponding indices may be configured.

After receiving the congestion status report condition message, the AP may select TCP ACKs to be sent to the CP. Here, the TCP ACK delay transmission may be applied such that a TCP ACK is generated per a predetermined number of TCP packets.

Figure 30:
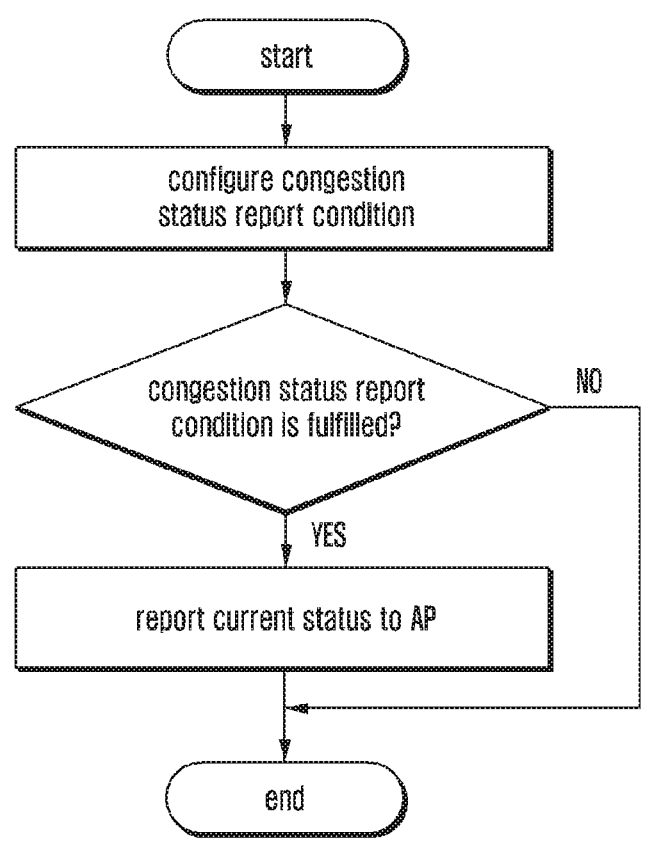
FIG. 30 is a flowchart illustrating a congestion status report operation of a CP of a terminal according to the first embodiment of the disclosure.

FIG. 30 is a flowchart illustrating a congestion status report operation of a CP of a terminal according to the first embodiment of the disclosure.

After receiving the congestion condition configuration message described with reference to FIGS. 28 and 29, the CP may determine whether a condition included in the message is fulfilled. If the congestion status report condition is fulfilled, the CP may report the congestion status to the AP. The determination on whether the congestion status report condition is fulfilled may be made always or at a predetermined time interval. Given that the condition is likely to change frequently, it may be possible to determine whether an average or a median value of values acquired through several measurements fulfils the congestion status report condition. This method may be notified from the AP or indicated by a value preconfigured in the CP.

Second Embodiment

The disclosure is based on a 5G communication or New Radio Technology (RAT) communication system. Given an expectation of supportability of various communication services beyond legacy voice and data services in the future, a 5G communication system should be designed with a scalable communication standard to support various and distinct services and QoSs in comparison with the legacy 4G LTE system. It is expected that the 5G communication system will supports various types of services such as enhanced mobile broadband (eMBB), ultra-reliable and low latency communication (URLLC), and enhanced machine type communication (eMTC). In order to support such services, it is necessary to subdivide legacy QoSs and distinguish between the subdivided QoSs with QoS flow IDs for use in data transmission between a terminal and a base station.

In this regard, there is a need of defining a rule for mapping between a DRB defined through a PHY/MAC/RLC/PDCP layer and a newly introduced QoS flow. For a 3GPP RAN, a new layer that supports mapping between the DRB and QoS flow and is responsible for the mapping function is defined. This new layer is a user plane access stratum (AS) protocol layer, and the corresponding protocol is referred to as packet data association protocol (PDAP), service data adaptation protocol (SDAP), etc. This new layer also supports marking QoS flow ID in downlink and uplink packets as well as mapping between QoS flow and DRB. A QoS flow is determined by a terminal for LTL, and by a core network (CN) for DL, the rule for mapping between the QoS flow and DRB is determined by a RAN. It is also characterized that Multiple QoS flows can be mapped to one DRB.

Figure 31:
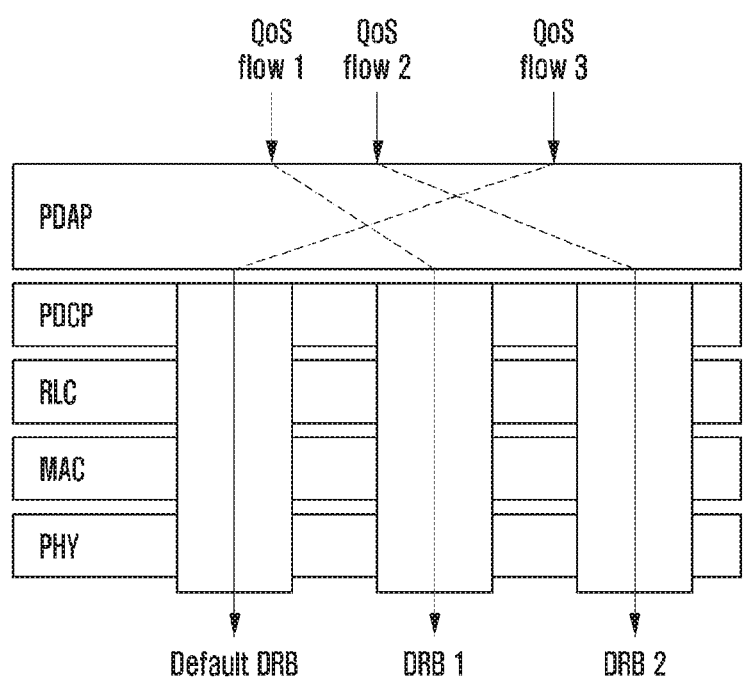
FIG. 31 is a diagram illustrating mapping between QoS flows and DRBs in a new layer according to the second embodiment of the disclosure.

FIG. 31 is a diagram illustrating mapping between QoS flows and DRBs in a new layer according to the second embodiment of the disclosure.

An initially (or one-time) configured QoS flow-DRB mapping rule may be changed. In this case, QoS flow remapping is necessary. For example, the QoS flow-DRB mapping rule may be changed for remapping in the following situations.

In a situation where a terminal is transmitting a UL packet, if the corresponding packet is the first packet of the corresponding QoS flow and a QoS flow-DRB mapping rule is not configured yet, the corresponding packet is transmitted to the network over a default DRB. A CN (e.g., 5G NGC) may perform QoS authentication on the packet, and a RAN may remap between the QoS flow and an appropriate dedicated DRB according to a result of the QoS authentication. After receiving the new QoS flow-DRB mapping configuration information, the terminal may transmit UL packets on the corresponding dedicated DRB.

Figure 32:
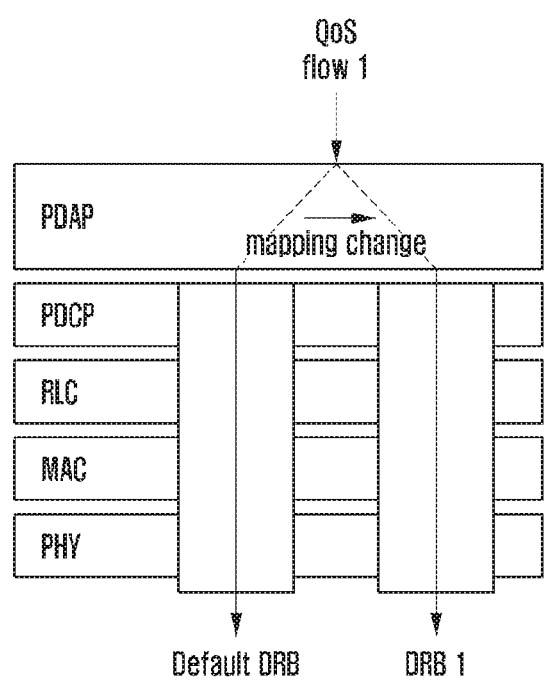
FIG. 32 is a diagram illustrating a change of a QoS flow-DRB mapping rule according to the second embodiment of the disclosure.

FIG. 32 is a diagram illustrating a change of a QoS flow-DRB mapping rule according to the second embodiment of the disclosure.

Figure 33:
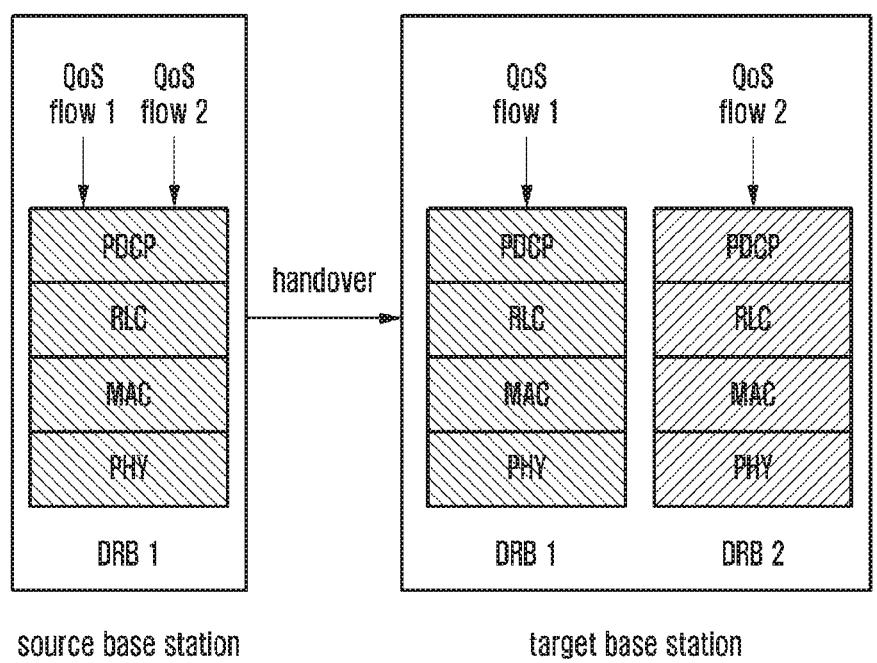
FIG. 33 is a diagram illustrating a change of a QoS flow-DRB mapping rule for a handover of a terminal according to the second embodiment of the disclosure.

In an handover situation of a terminal, the QoS flow-DRB mapping rule may be changed according to a load status or DRB status of a target base station (gNB). For example, in the case where the QoS flow-DRB mapping rule should be changed such as a handover of the terminal, the new layer (PDAP or SDAP) may switch the QoS flow 1 from the default DRB to DRB FIG. 33 is a diagram illustrating a change of a QoS flow-DRB mapping rule for a handover of a terminal according to the second embodiment of the disclosure.

For example, it may happen that both QoS flow 1 and QoS flow 2 are mapped to DRB 1 in a source base station (gNB) and QoS flow 1 and QoS 2 are mapped to DRB 1 and DRB 2, respectively, in a target base station (gNB). In this situation, a handover of the terminal from the source gNB to the target gNB may cause a change of the QoS flow-DRB mapping rule and a QoS flow-DRB remapping, which may lead to a packet out-of-order situation or packet loss.

Figure 34:
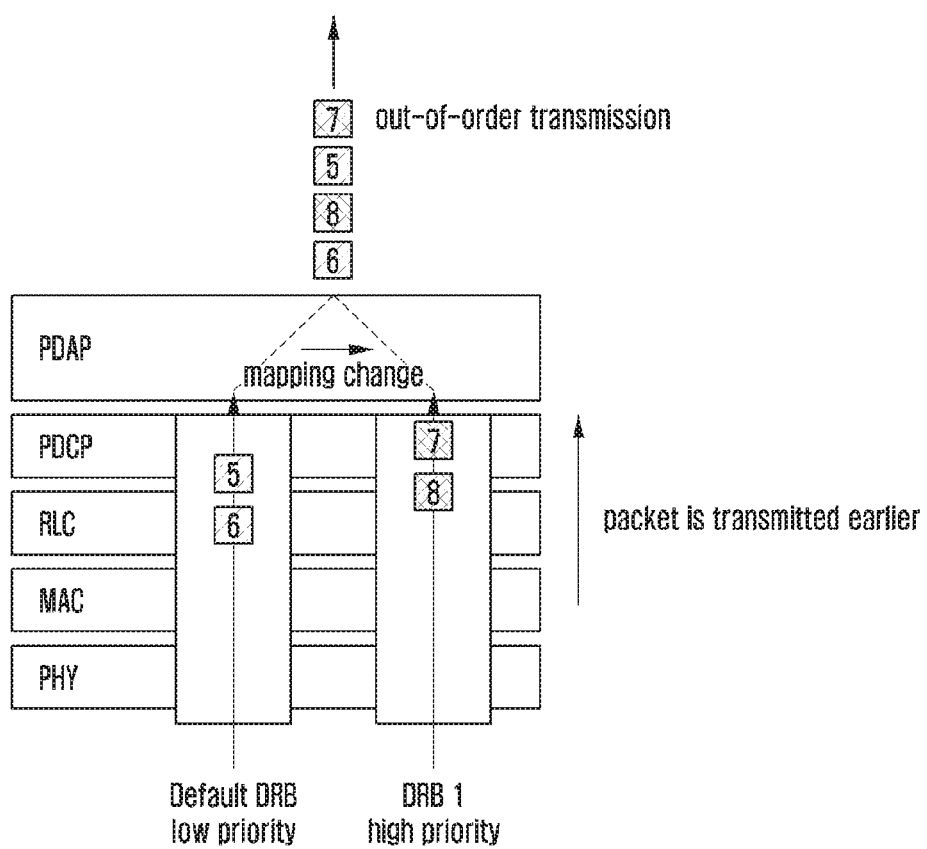
FIG. 34 is a diagram illustrating an exemplary packet out-of-order situation caused by a change of a QoS flow-DRB mapping rule according to the second embodiment of the disclosure.

FIG. 34 is a diagram illustrating an exemplary packet out-of-order situation caused by a change of a QoS flow-DRB mapping rule according to the second embodiment of the disclosure.

In FIG. 34, QoS flow 1 is switched from the default DRB to DRB 1 as a dedicated DRB according to a change of the mapping rule such that packets 5 and 6 on the default DRB are followed by packets 7 and 8 on DRB 1. If DRB 1 is prioritized over the default DRB for packet transmission, even though a base station transmits a packet on DRB 1 after a packet on the default DRB over the QoS flow, the packet on the DRB 1 may be transmitted to the upper layer earlier in the terminal. Given that the two DRBs operate independently, the packets are transmitted to the upper layer out of order (e.g., order of packets 7, 5, 8, and 6) without any reordering process It may also happen that QoS flow 1 is remapped to another DRB such that the previously mapped DRB is removed (or released), which may lead to packet loss.

The disclosure proposes the following methods for solving the aforementioned packet out-of-order and packet loss problems. In regard to QoS flow-DRB mapping, a previously mapped DRB is referred to as legacy DRB and a newly mapped DRB is referred to as new DIM.

An in-order packet transmission support method proposed in the disclosure may be applied to a specific QoS flow or all QoS flows, and the QoS flow to which the in-order packet transmission support method is applied may be configured by exchanging DRB and QoS configuration messages (e.g., RRC Connection Reconfiguration message) between the terminal and the base station. The QoS flow may be a downlink (DL) flow or an uplink (UL) flow.

A base station-triggered or network-triggered QoS flow-DRB remapping may be performed in two approaches as follows.

Figure 35:
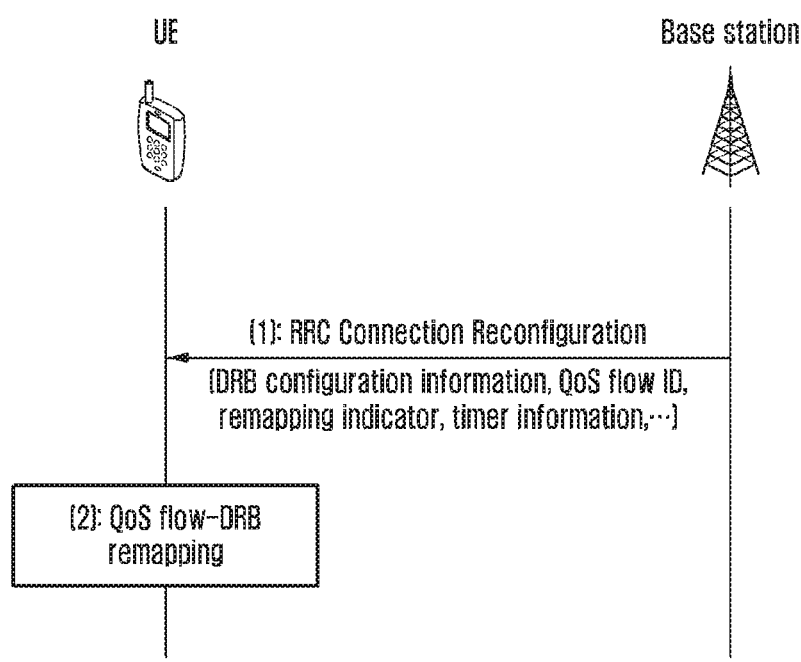
FIG. 35 is a signal flow diagram illustrating an exemplary base station-triggered QoS flow-DRB remapping procedure according to the second embodiment of the disclosure.

FIG. 35 is a signal flow diagram illustrating an exemplary base station-triggered. QoS flow-DRB remapping procedure according to the second embodiment of the disclosure.

In the first approach, the base station (gNB) or network (NGC, EPC, and CN) may transmit an RRC Connection Reconfiguration message including a RadioResourceConfigDedicated IE including new DRB configuration information and/or previously configured DRB ID information (e.g., drb-Identity), QoS flow ID information, and/or a QoS flow-DRB remapping indication to the terminal at step (1).

The corresponding message may include a timer or additional information as in options proposed later. The terminal may check for presence of the QoS flow-DRB remapping indication or QoS flow ID information to identify the corresponding QoS flow as a remapping target and perform a QoS flow-DRB remapping procedure at step (2).

After the QoS flow-DRB remapping and Data packet transfer is completed, the legacy DRB established between the terminal and the base station may be removed (released). The legacy DRB removal may be performed according to a default configuration such that the corresponding DRB is released immediately after the QoS flow-DRB remapping and data packet transmission is completed.

In an alternative embodiment, the legacy DRB removal procedure may include transmitting an RRC Connection Reconfiguration message including a legacy DRB removal indication from the base station to the terminal and, in reply, transmitting an RRC Connection Reconfiguration Complete message from the terminal to the base station.

Figure 36:
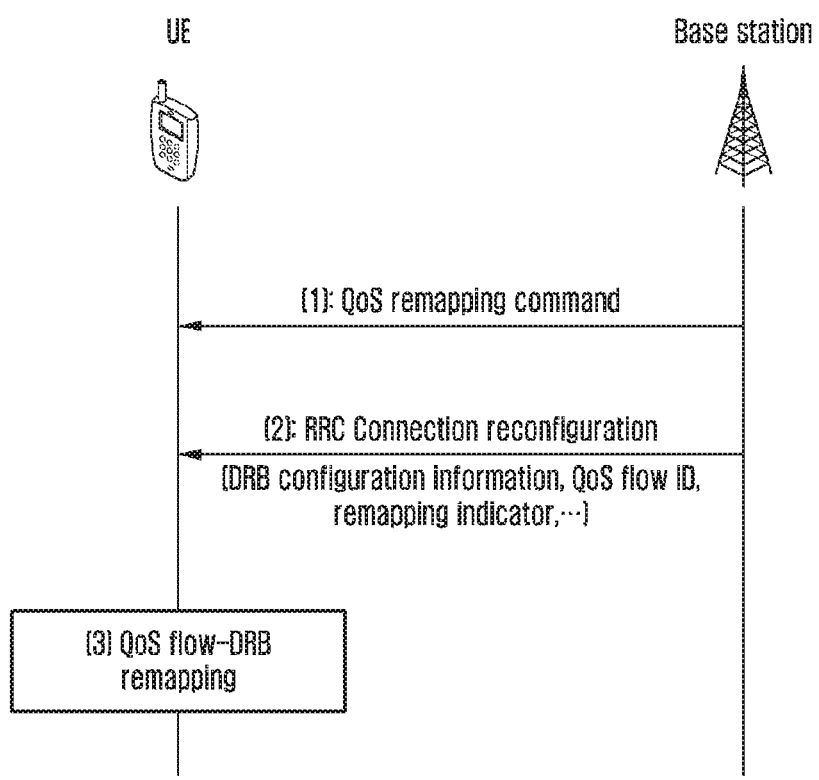
FIG. 36 is a signal flow diagram illustrating another exemplary base station-triggered QoS flow-DRB remapping procedure according to the second embodiment of the disclosure.

FIG. 36 is a signal flow diagram illustrating another exemplary base station-triggered QoS flow-DRB remapping procedure according to the second embodiment of the disclosure.

In the second approach, the base station may transmit a newly defined QoS remapping command to the terminal at step (1). The QoS mapping command may include at least one of indication information indicative of performing QoS flow-DRB remapping and information on an QoS flow ID of a QoS flow-DRB as a remapping target. The base station may transmit an RRC Connection Reconfiguration message including new DRB information to the terminal at step (2).

The new DRB information may include corresponding QoS flow ID information, new DRB configuration information for new DRB addition/modification, and/or previously configured. DRB ID information (e.g., drb-Identity). The QoS remapping command message and RRC Connection Reconfiguration message may be transmitted via different signaling or the same signaling. The terminal may check for the QoS remapping command and QoS flow-DRB remapping configuration information to identify the corresponding QoS flow as the remapping target and perform a QoS flow-DRB remapping procedure at step (3).

After the QoS flow-DRB remapping and data packet transfer are completed, the legacy DRB established between the terminal and the base station may be removed (released). The legacy DRB removal may be performed according to a default configuration such that the corresponding DRB is released immediately after the QoS flow-DRB remapping and data packet transmission is completed. In an alternative embodiment, the legacy DRB removal procedure may include transmitting an RRC Connection Reconfiguration message including a legacy DRB removal indication from the base station to the terminal and, in reply, transmitting an RRC Connection Reconfiguration Complete message from the terminal to the base station.

According to an embodiment, the two above-described options may be used in a combined manner.

Hereinafter, a terminal-triggered QoS flow-DRB remapping method is described.

Figure 37:
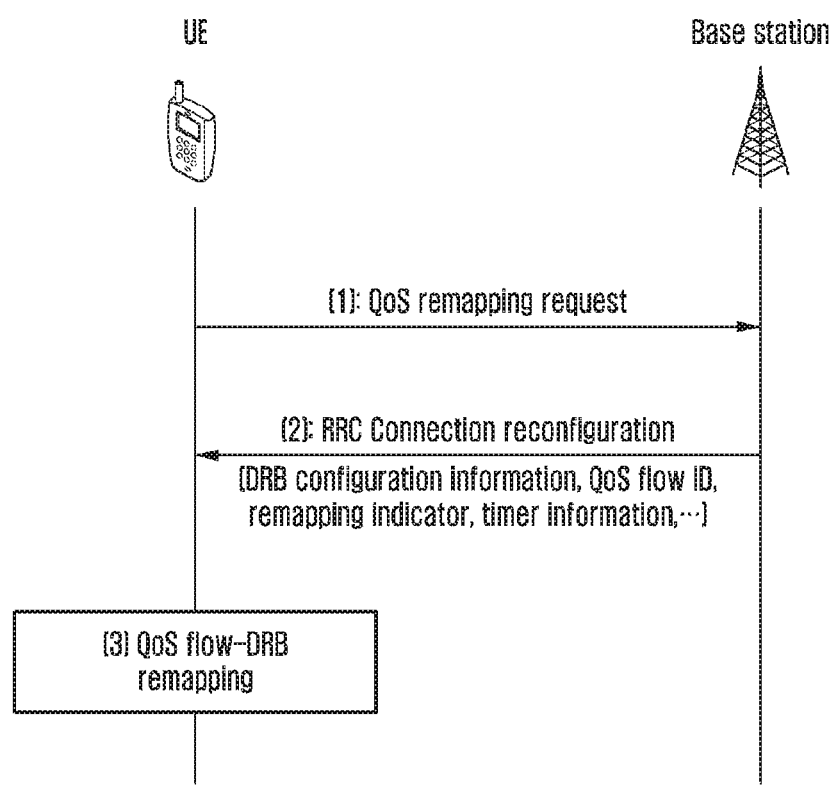
FIG. 37 is a signal flow diagram illustrating an exemplary terminal-triggered QoS flow-DRB remapping procedure according to the second embodiment of the disclosure.

FIG. 37 is a signal flow diagram illustrating an exemplary terminal-triggered QoS flow-DRB remapping procedure according to the second embodiment of the disclosure.

In the terminal-triggered QoS flow-DRB remapping procedure, the terminal may define and transmit a QoS remapping request to a base station or network at step (1). The QoS remapping request message may be transmitted independently or carried in a legacy UL, message such as a Scheduling Request message, RRC connection reestablishment message, and RRC connection reconfiguration complete message. This message may explicitly include at least one of related QoS flow ID information, new DRB ID information, a previously configured DRB ID, or QCI information of the corresponding QoS flow.

After receiving this message, the base station may transmit, at step (2), an RRC Connection Reconfiguration message including information necessary for configuring a new DRB. This information may include the QoS flow ID information, the new DRB ID information, the previously configured DRB ID, and/or the QCI information of the corresponding QoS flow, or a timer or additional information for proposed options as follows. The RRC Connection Reconfiguration message may explicitly indicate presence/absence of a request from the terminal. The base station may define and transmit a QoS remapping response message instead of the RRC Connection Reconfiguration message.

The terminal may perform QoS flow-DRB remapping at step (3) based on the information transmitted by the base station. The legacy DRB established between the terminal and the base station may be removed (released). The legacy DRB removal may be performed according to a default configuration such that the corresponding DRB is released immediately after the QoS flow-DRB remapping and data packet transmission is completed. In an alternative embodiment, the legacy DRB removal procedure may include transmitting an RRC Connection Reconfiguration message including a legacy DRB removal indication from the base station to the terminal and, in reply, transmitting an RRC Connection Reconfiguration Complete message from the terminal to the base station.

The following proposals are described on the basis of the base station-triggered QoS flow-DRB remapping procedures among the QoS flow-DRB remapping procedures. The following proposals may also be applicable in the same manner to the terminal-triggered flow-DRB remapping procedure.

Although the description is directed to the case where a base station is a transmitter and a terminal is a receiver for convenience of explanation, the technical principle of the disclosure may also be applicable to the case where a terminal is a transmitter and a base station is a receiver.

Figure 38:
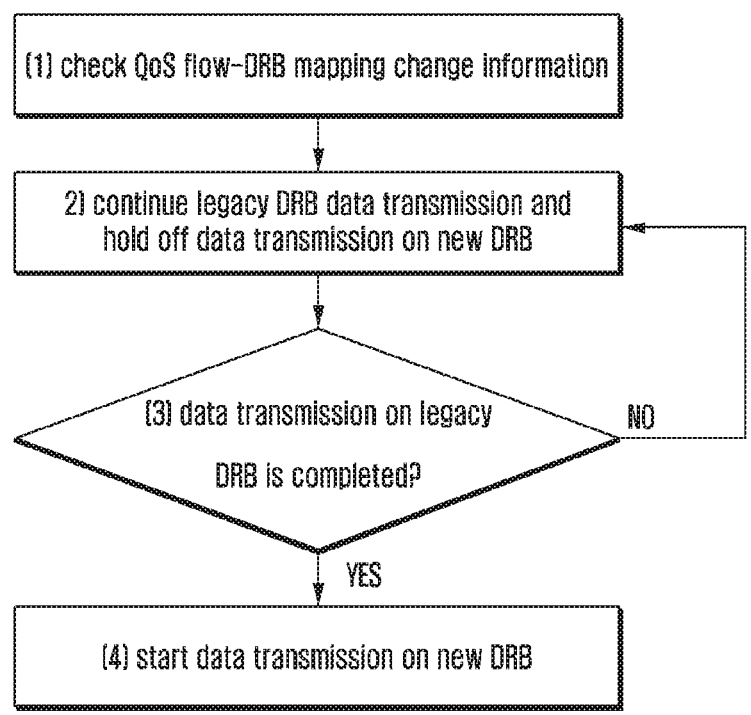
FIG. 38 is a flowchart illustrating an operation of a transmitter for continuing transmission on a new DRB after completing transmission on a legacy DRB.

Proposal 1. After a transmission is completed on a legacy DRB, the transmission continues on a new DRB. FIG. 38 is a flowchart illustrating an operation of the transmitter in Proposal 1 according to the second embodiment of the disclosure.

FIG. 38 is a flowchart illustrating an operation of a transmitter for continuing transmission on a new DRB after completing transmission on a legacy DRB.

In the proposed method, if a QoS flow-DRB mapping rule necessary for data transmission between a base station and a terminal is changed, the transmitter acquires new mapping rule information and applies it at step (1) to determine at step (2) whether the data packet transmission on the legacy DRB has been completed rather than continue the transmission on the new DRB immediately. After determining at step (3) that the data packet transmission has been completed on the legacy DRB, the transmitter may start data packet transmission, at step (4), on the new DRB to which the changed mapping rule is applied. According to this embodiment, although a data packet transmission delay is likely to occur, there is no need of any data packet order reordering operation at the receiver. Descriptions are made of the embodiments in which information on whether the data packet transmission on the legacy DRB has been completed is received from the receiver with reference to Proposals 1-1 and 1-2.

Figure 39:
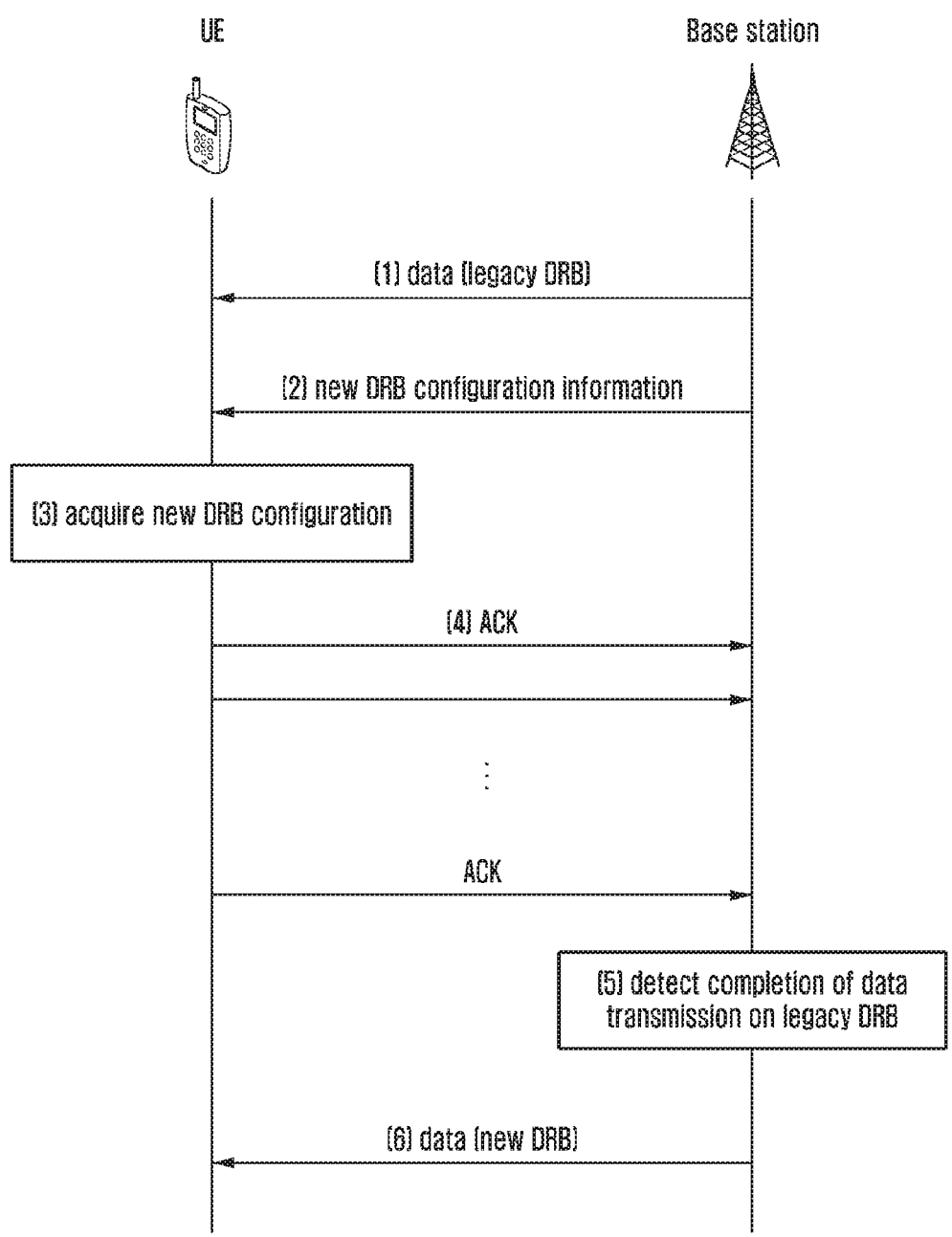
FIG. 39 is a signal flow diagram illustrating signal flows between a terminal and a base station for exchanging a packet reception acknowledgement message on a legacy DRB according to the second embodiment of the disclosure.

Proposal 1-1. FIG. 39 is a signal flow diagram illustrating a procedure for a transmitter to start data packet transmission on a new DRB after being notified by a receiver that the data packet transmission on a legacy DRB has been completed according to the second embodiment of the disclosure. Although the embodiment of FIG. 39 is directed to the case where the transmitter is a base station and the receiver is a terminal, the proposed method may also be applicable to the case where the transmitter is a terminal and the receiver is a base station.

FIG. 39 is a signal flow diagram illustrating signal flows between a terminal and a base station for exchanging a packet reception acknowledgement message on a legacy DRB according to the second embodiment of the disclosure.

The base station as a transmitter may transmit a packet to the terminal on the legacy DRB at step (1). The base station may transmit new DRB configuration information, or QoS flow-DRB mapping change information to the terminal at step (2).

The terminal may receive, at step (3), the new DRB configuration information and QoS flow-DRB mapping change information transmitted by the base station at step (2). In the case where the legacy DRB is re-mapped to another DRB that has been previously configured, the DRB configuration information or QoS flow-DRB mapping change information may include information on at least one of the legacy DRB ID or QoS flow ID mapped to the legacy DRB and information on at least one of another DRB ID to be re-mapped to the legacy DRB or a QoS flow ID mapped to the other DRB.

After receiving the new DRB configuration information or QoS flow-DRB remapping command at step (3), the receiver of the terminal may transmit a reception acknowledgement message corresponding to a PDCP layer packet received after acquisition of the new DRB information at step (3) to the transmitter of the base station. As the reception acknowledgement message, at least one of a layer ACK, a MAC layer ACK, or an RLC layer ACK may be transmitted at step (4).

The transmitter of the base station may determine at step (5) whether the terminal has received the packet based on receiving at least one of the PHY layer ACK, the MAC layer ACK, or the RLC layer ACK corresponding to the packet transmitted on the legacy DRB. After receiving, at step (5), of the at least one of the PHY layer ACK, the MAC layer ACK, or the RLC layer ACK corresponding to the last packet transmitted on the legacy DRB, the base station may identify that the receiver of the terminal has completed packet reception on the legacy DRB. If the packet reception is identified, the transmitter of the base station may transmit the next data packet on the new DRB at step (6). The base station may instruct the terminal to stop transmitting the packet reception acknowledgement message corresponding to the packet on the legacy DRB.

If the terminal receives information indicative of stopping transmission of the packet reception acknowledgement message corresponding to the packet on the legacy DRB from the base station, it may stop transmitting the packet reception acknowledgement message corresponding to the packet on the legacy DRB according to an embodiment of the disclosure. The base station may transmit the information indicative of stopping transmission of the packet reception acknowledgement message corresponding to the packet on the legacy DRB to the terminal via separate signaling before starting packet transmission on the new DRB or along with the packet being transmitted on the new DRB In an alternative embodiment, the base station may transmit timer information to the terminal for stopping transmission of the packet reception acknowledgement message corresponding to the packet on the legacy DRB. The timer for stopping transmission of the packet reception acknowledgement message may be transmitted to the terminal along with the new DRB configuration information or the QoS flow-DRB mapping change information. If the timer expires, the terminal may stop transmitting the packet reception acknowledgement message.

Meanwhile, if the transmitter of the base station fails to determine at step (5) whether packet reception on the legacy DRB has been completed, it may wait for receiving a packet reception acknowledgement from the receiver of the terminal during a predetermined additional time period or stop waiting for receiving the packet reception acknowledgement corresponding to the packet on the legacy DRB and start transmitting packets on the new DRB.

Figure 40:
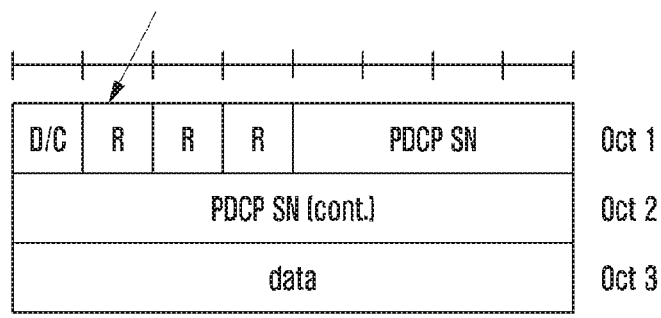
FIG. 40 is a diagram illustrating a PDCP data PDU format according to the second embodiment of the disclosure.

In an embodiment of the disclosure, the packet reception acknowledgement message being transmitted from the receiver to the transmitter at step (4) may include reception acknowledgement indication information in a PDCP Data PDU header by way of example. In the embodiment of FIG. 40, one of 3 reserved (R) bits in a PDCP Header may be defined for the purpose of packet reception acknowledgement.

In an alternative embodiment, a PDCP SN in the PDCP Header of FIG. 40 may be configured with the PDCP SN of each packet received from the base station. In an alternative embodiment, the PDCP SN in the PDCP Header of FIG. 40 may be configured with the PDCP SN of the last packet received from the base station.

In an alternative embodiment, a separate PDCP ACK packet may be defined for the purpose of acknowledging the receiving each packet from the base station.

In an embodiment of an option for a terminal to transmit a packet reception acknowledgement message, the packet reception acknowledgement message may be transmitted per received packet or predetermined number of consecutively received packets.

Figure 41:
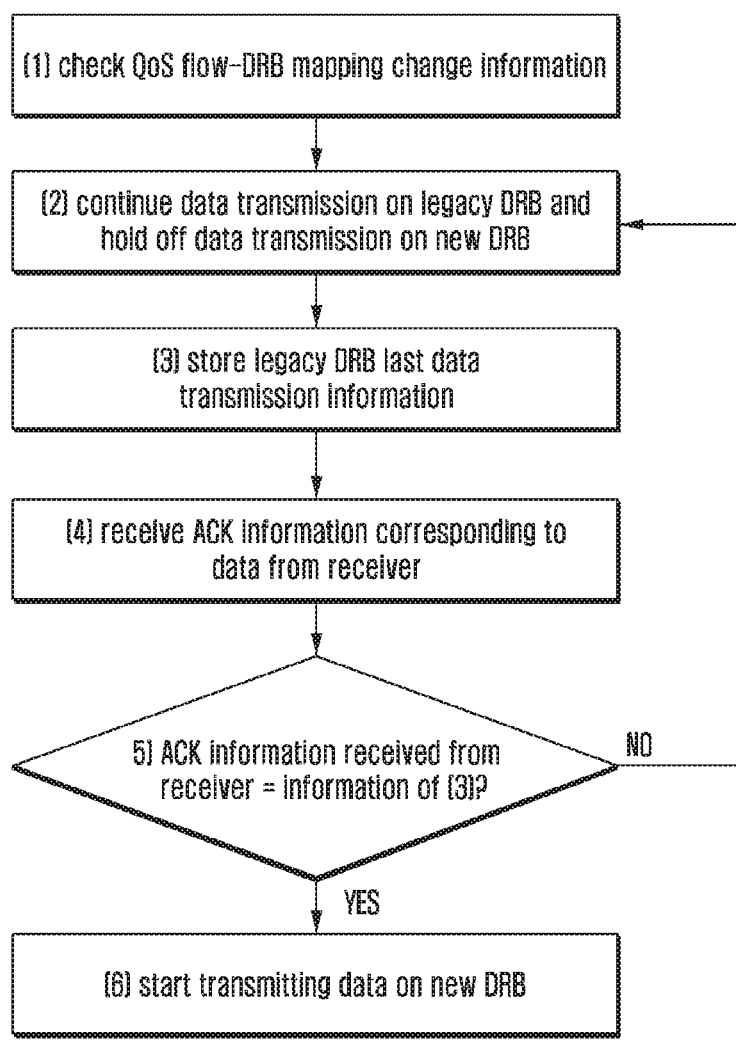
FIG. 41 is a flowchart illustrating an operation of a transmitter supporting an ACK message-based in-order packet transmission in a DRB-switching situation according to the second embodiment of the disclosure.

FIG. 41 is a flowchart illustrating an operation of a transmitter supporting an ACK message-based in-order packet transmission in a DRB-switching situation according to the second embodiment of the disclosure.

In reference to FIG. 41, the transmitter may identify a change in QoS flow-DRB remapping information at step (1) and, if there is any remaining legacy DRB packets, continue transmitting the legacy DRB packets and hold off transmitting new DRB packets at step (2). At step (3), the transmitter may store information on the last data transmitted on the legacy DRB.

In an embodiment, the data information being stored at step (3) may include at least one of a PDCP SN, PHY packet transmission information (SN), MAC packet transmission information (SN), or RlX packet transmission information (SN) of the data. The transmitter may receive data ACK information from the receiver at step (4); in an embodiment of the disclosure, the ACK message may be at least one of an ACK message, a PHY layer ACK message, a MAC layer ACK message, or an RLC layer ACK message, which includes a PDCP SN.

The transmitter may determine at step (5) whether the data ACK message received at step (4) matches the last data information of the legacy DRB that has been stored at step (3). For example, at step (5), the transmitter may determine whether at least one of the PDCP SN value, PHY layer transmission information (SN), MAC layer transmission information (SN), or RLC layer transmission information (SN) that has been transmitted by the receiver is identical with at least one of the last PDCP SN value, PHY layer transmission information (SN), MAC layer transmission information (SN), or RLC layer transmission information (SN) that the transmitter has transmitted on the legacy DRB. If it is determined at step (5) that the information matches, the transmitter may start transmitting data to the receiver on the new DRB at step (6).

In an embodiment of the disclosure, the transmitter may transmit a message indicating that the receiver does not need to transmit the ACK message according to the embodiment of the present invention to the receiver before performing step (6). In another embodiment, the transmitter may transmit the message indicating that the receiver does not need to transmit the ACK message according to the embodiment of the present invention along with the new DRB data transmitted at step (6). In an alternative embodiment, an ACK message transmission termination timer may be configured between the transmitter and the receiver instead of transmitting the message indicating that the receiver does not need to transmit the ACK message according to the embodiment of the present invention before or at step (6). If it is determined at step (5) that the information matches, the transmitter may perform the operation of step (2).

Figure 42:
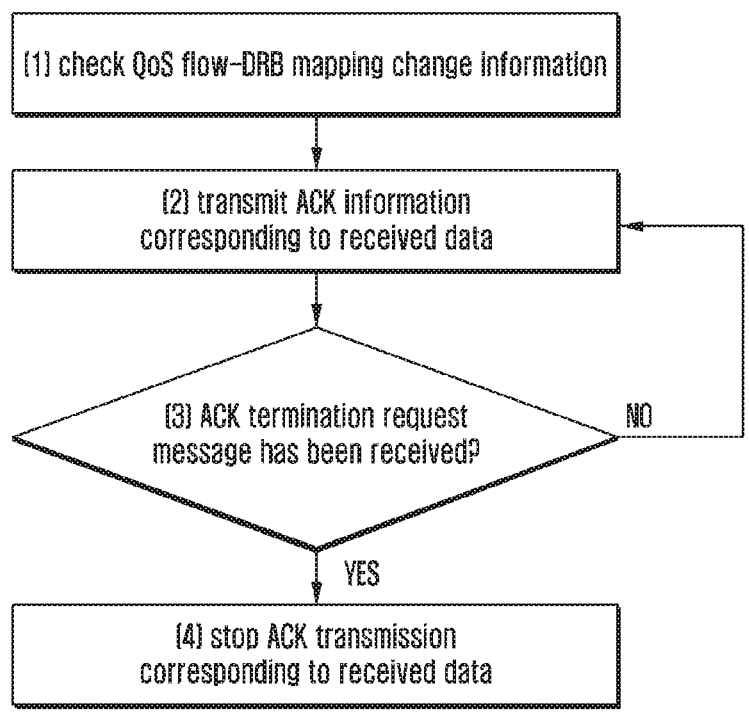
FIG. 42 is a flowchart illustrating an operation of a receiver supporting an ACK message-based in-order packet transmission in a DRB-switching situation according to the second embodiment of the disclosure.

FIG. 42 is a flowchart illustrating an operation of a receiver supporting an ACK message-based in-order packet transmission in a DRB-switching situation according to the second embodiment of the disclosure.

In the embodiment of FIG. 42, the receiver may transmit ACK information corresponding to received data until an ACK termination request message is received from the transmitter. A description is made of the operation procedure of the receiver hereinafter.

At step (1), the receiver may identify new DRB configuration information, or QoS flow-DRB mapping change information. At step (2), the receiver may transmit ACK information corresponding to received data after identifying the QoS flow-DRB mapping change information. In an embodiment, the ACK message being transmitted at step (2) may include a PDCP SN. The ACK message may be at least one of a PHY layer ACK message, a MAC layer ACK message, or a RLC layer message. At step (3), the receiver may receive an ACK termination request message from the transmitter. If it is determined at step (3) that the ACK termination request message is received, the receiver may stop transmitting an ACK corresponding to the received data at step (4). If it is determined at step (3) that the ACK termination request message is not received, the receiver may perform the operation of step 2.

Figure 43:
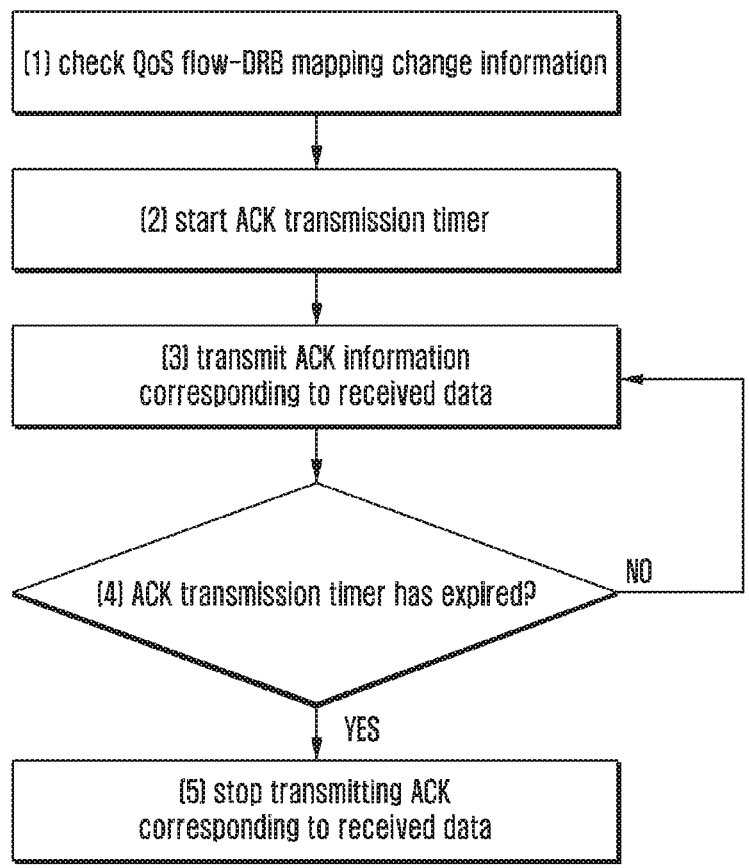
FIG. 43 is a flowchart illustrating an operation of a receiver based on an ACK message of Proposal 1-1 according to the second embodiment of the disclosure.

FIG. 43 is a flowchart illustrating an operation of a receiver based on an ACK message of Proposal 1-1 according to the second embodiment of the disclosure.

In the embodiment of FIG. 43, the receiver may transmit an ACK corresponding to received data until an ACK transmission Timer expires. A description is made of the exemplary operation procedure of the receiver.

At step (1), the receiver may identify new DRB configuration information, or QoS flow-DRB mapping change information. The QoS flow-DRB mapping information identified at step (1) may include an ACK transmission Timer. The ACK transmission Timer may be acquired from system information in advance and stored in the receiver. At step (2), the receiver may start the ACK transmission Timer after identifying the QoS flow-DRB mapping change information. At step (3), the receiver may transmit ACK information corresponding to received data after starting the ACK transmission timer. In an embodiment, the ACK message being transmitted at step (3) may include a PDCP SN. The ACK message may be at least one of a PHY layer ACK message, a MAC layer ACK message, or an RLC layer message. At step (4), the receiver may determine whether the timer started at step 2 expires. If it is determined at step (4) that the ACK transmission Timer has expired, the receiver may stop transmitting ACK corresponding to the received data at step (5). If it is determined at step (4) that the ACK transmission Timer has not expired, the receiver may perform the operation of step (3), Proposal 1-2.

Figure 44:
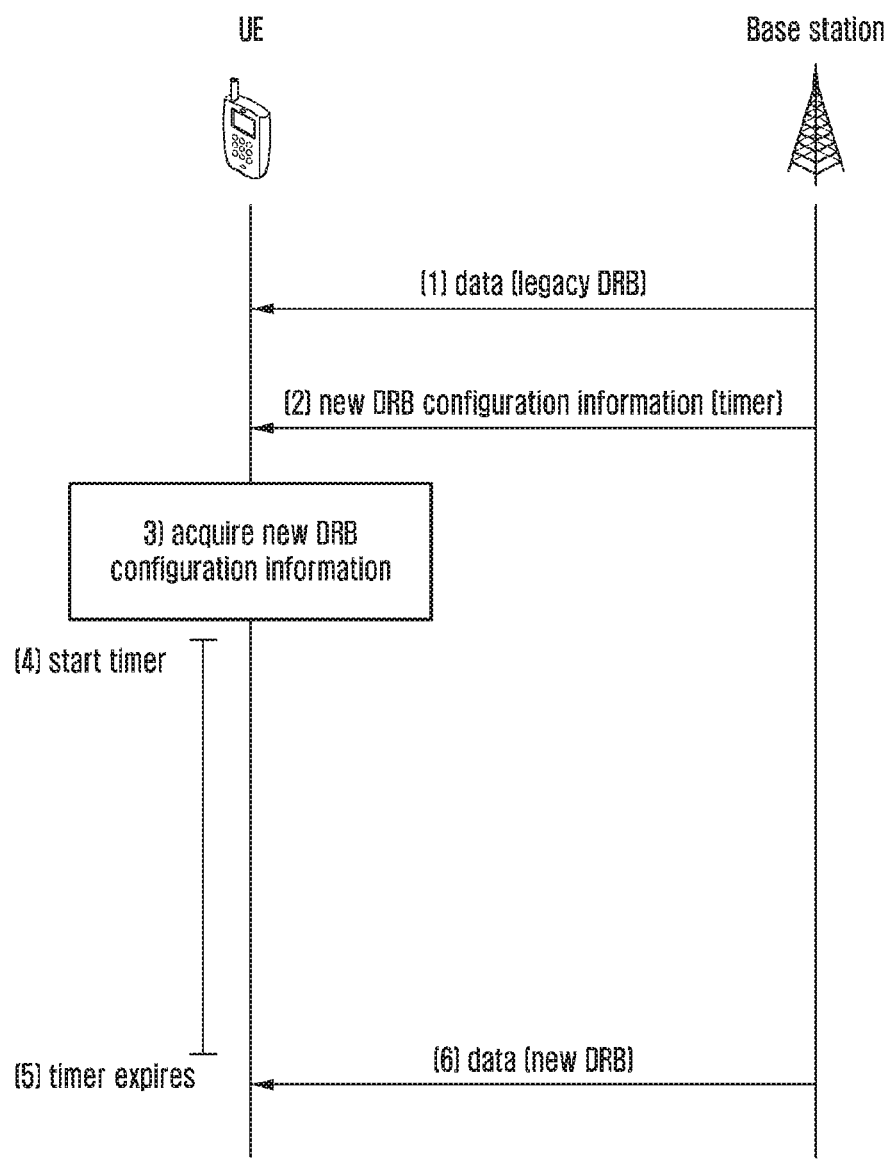
FIG. 44 is a signal flow diagram illustrating signal flows between a terminal and a base station in a timer-based legacy DRB packet reception acknowledgement procedure.

FIG. 44 is a signal flow diagram illustrating a situation where a transmitter starts transmitting data packets on a new DRB after identifying completion of data packet transmission on a legacy DRB based on a timer according to the second embodiment of the disclosure. Although the embodiment of FIG. 44 is directed to the case where a base station is a transmitter and a terminal is a receiver, the procedure may also be applicable to the case where a terminal is a transmitter and a base station is a receiver.

FIG. 44 is a signal flow diagram illustrating signal flows between a terminal and a base station in a timer-based legacy DRB packet reception acknowledgement procedure.

At step (1), the base station as a transmitter may transmit packets to the terminal on the legacy DRB. At step (2), the base station may transmit new DRB configuration information or QoS flow-DRB mapping change information. The base station may transmit timer information along with the new DRB configuration information. The timer information is time information for starting data packet transmission on the new DRB after completing the data packet transmission on the legacy DRB. At step (3), the terminal may receive the new DRB configuration information and QoS flow-DRB mapping change information transmitted by the base station at step (2).

At step (3), the terminal may receive the timer information for starting the data packet transmission on the new DRB after completing the data packet transmission on the legacy DRB in addition to the new DRB configuration information and QoS flow-DRB mapping change information. At step (4), the terminal may start a timer acquired at step (3). Before expiry of the timer, the receiver of the terminal may transmit the packets being received on the legacy DRB to the upper layer. If the timer expires at step (5), the transmitter of the base station starts transmitting packets of the corresponding QoS flow on the new DRB at step (6), and the receiver of the terminal may transmit the packets received on the new DRB instead of the legacy DRB to the upper layer.

According to an embodiment of the disclosure, timer value information may be included in a RadioResourceConfigDedicated IF of an RRC Connection Reconfiguration message being transmitted from the base station to the terminal at step (2) for the purpose of RRC Radio Control. In an alternative embodiment, the above message may include information on whether to use a timer. In this case, the timer value should be basically configured and needs to be preconfigured between the terminal and the base station. If the timer use of the DRB-ToAddModList is set to "on", the terminal and the base station may perform the operation of FIG. 44 by applying the preconfigured timer.

In an alternative embodiment, the terminal may transmit a packet reception acknowledgement message corresponding to the received packet after the expiry of the timer. The packet reception acknowledgement message may include information on the packets received while the timer is running or the last packet received while the timer is running.

Figure 45:
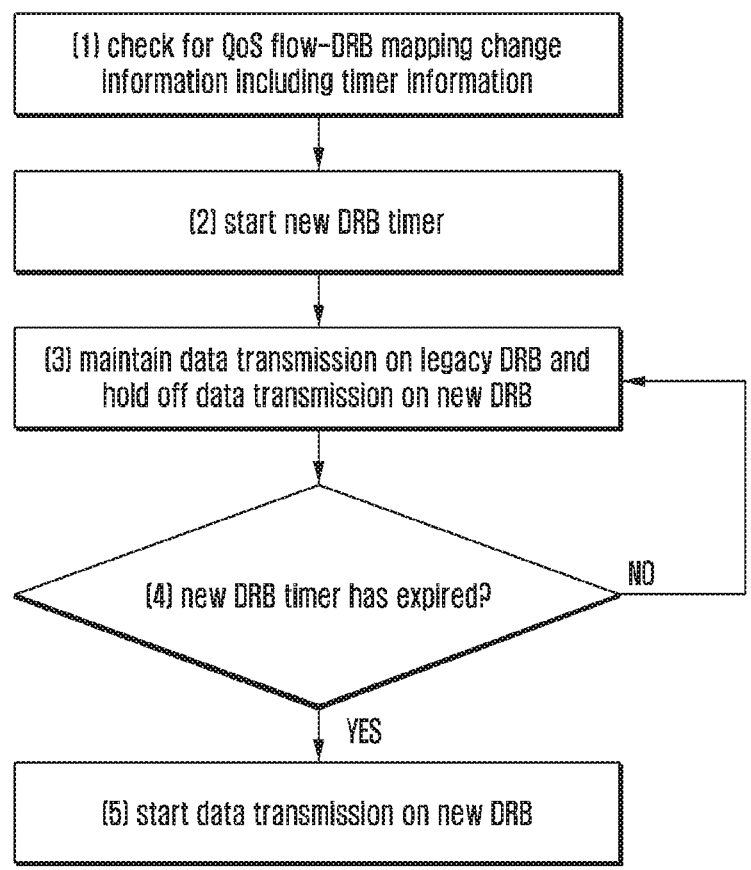
FIG. 45 is a flowchart illustrating an operation of a transmitter in a timer-based legacy DRB packet reception acknowledgement procedure according to the second embodiment of the disclosure.

FIG. 45 is a flowchart illustrating an operation of a transmitter in a timer-based legacy DRB packet reception acknowledgement procedure according to the second embodiment of the disclosure.

In reference to FIG. 45, the transmitter may identify, at step (1), new DRB configuration information or QoS flow-DRB mapping change information and Timer information to be referenced for starting new DRB packet transmission. At step (2), the transmitter may start a timer for transmitting new DRB data (new DRB Timer). At step (3), the transmitter may transmit data remaining on the legacy DRB to the receiver and hold off data transmission on the new DRB. At step (4), the transmitter may determine whether the new DRB Timer started at step (2) has expired. If it is determined at step (4) that the new DRB Timer has expired, the transmitter may start transmitting data on the new DRB at step (5). If it is determined at step (4) that the new DRB Timer has not expired, the transmitter may perform the operation of step (3).

If it is determined at step (5) that the new DRB Timer has expired, the transmitter may receive a packet reception acknowledgement message from the receiver. Here, the transmitter may start new DRB packet transmission subject to the expiry of the timer and the receiving the packet reception acknowledgement message.

Figure 46:
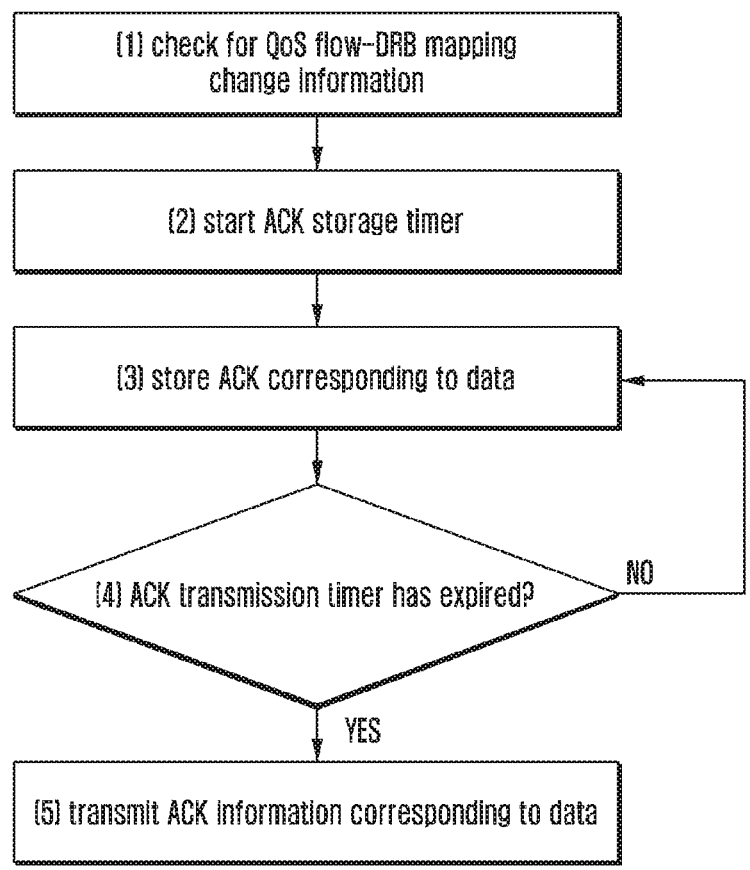
FIG. 46 is a flowchart illustrating an operation of a receiver in a timer-based procedure of Proposal 1-2 according to the second embodiment of the disclosure.

FIG. 46 is a flowchart illustrating an operation of a receiver in a timer-based legacy DRB packet reception acknowledgement procedure of Proposal 1-2 according to the second embodiment of the disclosure.

In reference to FIG. 46, the receiver may identify at step (1) Timer information for storing ACK along with new DRB configuration information QoS flow-DRB mapping change information. At step (2), the receiver may start the timer for storing ACK (ACK storing timer). At step (3), the receiver may store ACK information corresponding to data received while the timer (ACK storing Timer) is running. At step (4), the receiver may determine whether the timer (ACK storing Timer) started at step (2) has expired. If it is determined at step (4) that the timer (ACK storing Tinier) has expired, the receiver may transmit, at step (5), the ACK corresponding to stored data. For example, if n data are stored while the timer (ACK storing Timer) is running, the receiver may transmit all of ACKs corresponding to the n data to the transmitter. In an alternative embodiment, if n data are stored while the timer is running, the receiver may transmit only the ACK corresponding to the nth data. If it is determined at step (4) that the timer (new DRB timer) has not expired, the receiver may perform the operation of step (3).

Proposal 2. The transmitter has information on the last packet transmitted on the legacy DRB during or before the packet transmission on the new DRB. After receiving the information on the last packet transmitted on the legacy DRB through the new DRB, the receiver may distinguish between the packets received on the legacy DRB and the packet received on the new DRB and process the packets in order. In this case, even though the information on the last packet transmitted on the legacy DRB arrives earlier or later than the last packet transmitted on the legacy DRB, no problem arises. Because the receiver can predict the last packet received on the legacy DRB, it may be possible to guarantee in-order and lossless packet transmission to the upper layer.

Figure 47:
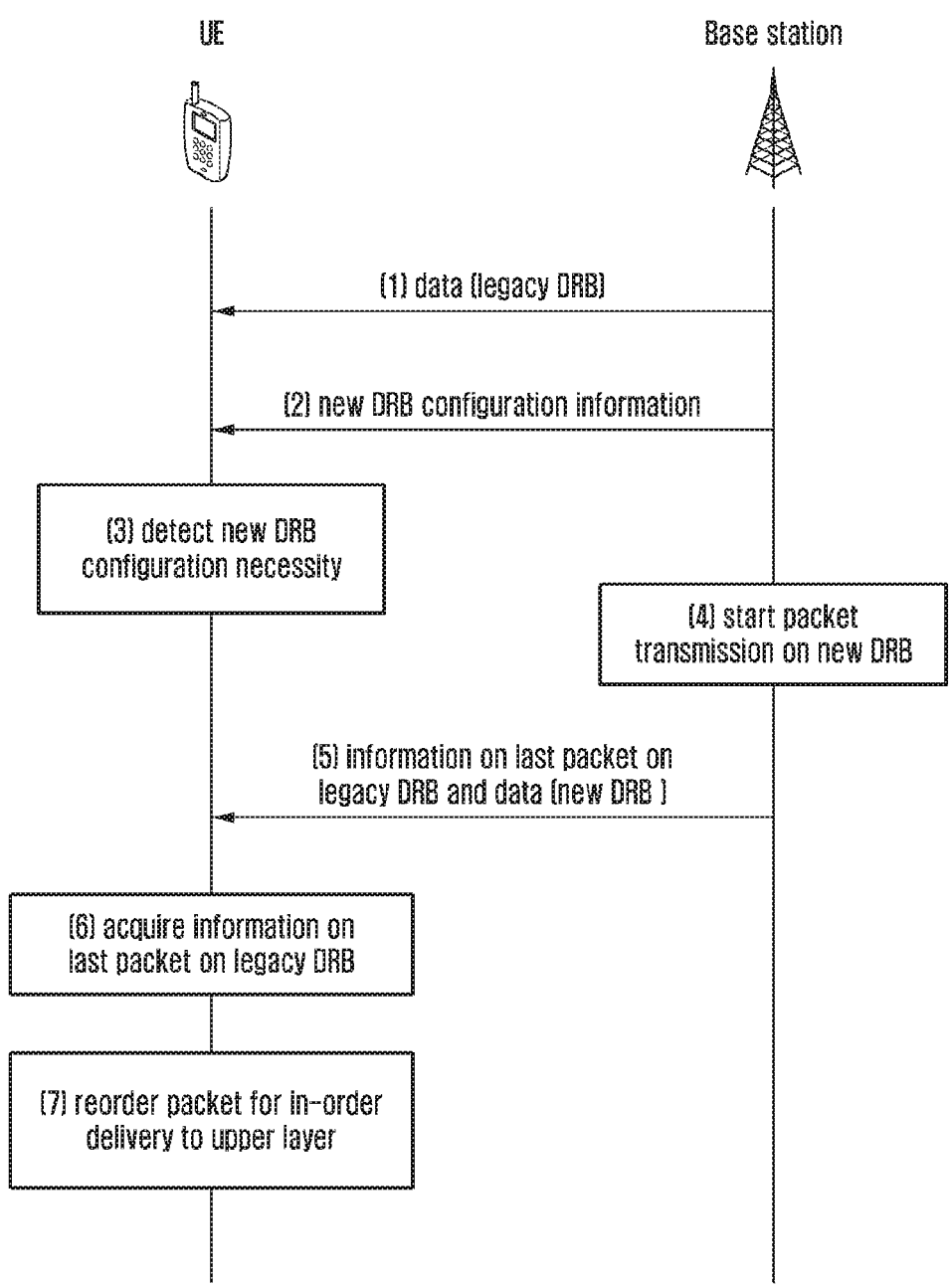
FIG. 47 is a signal flow diagram illustrating signal flows between a terminal and a base station in a procedure for receiving information on the last packet on a legacy DRB through a new DRB and processing the legacy DRB and new DRB packets according to the second embodiment of the disclosure.

FIG. 47 is a signal flow diagram illustrating signal flows between a terminal and a base station in a procedure for receiving information on the last packet on a legacy DRB through a new DRB and processing the legacy DRB and new DRB packets according to the second embodiment of the disclosure. Although the embodiment of FIG. 47 is directed to the case where a base station is a transmitter and a terminal is a receiver, the procedure may also be applicable to the case where a terminal is a transmitter and a base station is a receiver.

In reference to FIG. 47, the base station as the transmitter may transmit packets to the terminal on the legacy DRB at step (1). At step (2), the base station may transmit new DRB configuration information or QoS flow-DRB mapping change information to the terminal. At step (3), the terminal may receive the new DRB configuration information and QoS flow-DRB mapping change information transmitted by the base station at step (2). At step (4), the base station may start transmitting packets on the new DRB. At step (5), the base station may transmit information on the last packet transmitted on the legacy DRB to the terminal through the new DRB. For example, the information on the last packet transmitted on the legacy DRB may include a packet sequence number. For example, a control packet including the packet sequence number may be transmitted to the terminal on the new DRB.

For example, a user packet transmitted on the new DRB may include a packet sequence number of the last packet transmitted on the legacy DRB. At step (6), the terminal may acquire the information on the last packet transmitted on the legacy DRB transmitted by the base station. At step (7), the terminal may determine whether all of the packets transmitted on the legacy DRB have been received based on the information on the last packet transmitted on the legacy DRB, this information being acquired at step (6), before the received packets are transmitted to the upper layer. The terminal may determine whether a packet transmitted on the new DRB starts arriving based on the information on the last packet transmitted on the legacy DRB that has been acquired at step 6.

The terminal may transmit the packets received on the legacy DRB and the new DRB in order to the upper layer. Descriptions are made of various embodiments in which a receiver acquires information on the last packet on the legacy DRB and transmits packets in order to the upper layer with reference to Proposals 2-1 and 2-2.

Proposal 2-1.

Figure 48:
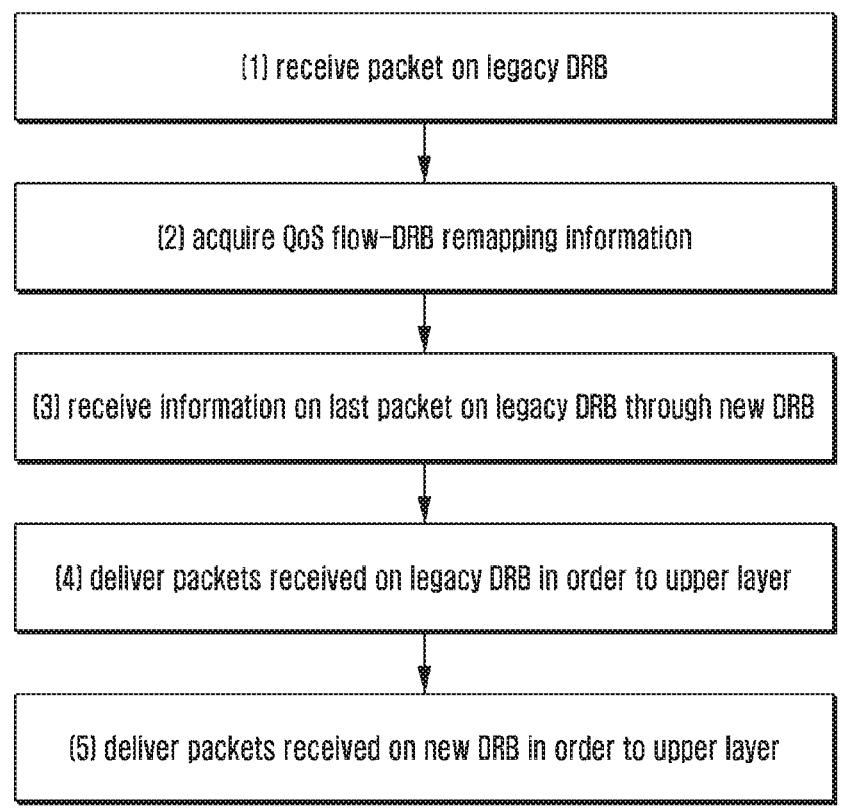
FIG. 48 is a flowchart illustrating a procedure for a receiver to distinguish between packets transmitted on a legacy DRB and packets transmitted on a new DRB based on information on the last packet transmitted on the legacy DRB and transmit the packets in order to an upper layer as transmitted by a transmitter.

FIG. 48 is a flowchart illustrating a procedure for a receiver to distinguish between packets transmitted on a legacy DRB and packets transmitted on a new DRB based on information on the last packet transmitted on the legacy DRB and transmit the packets to an upper layer in order as transmitted by a transmitter according to the second embodiment of the disclosure.

FIG. 48 is a flowchart illustrating an operation of a receiver supporting a legacy DRB last packet information-based in-order packet processing procedure.

In the middle of receiving packets on the legacy DRB at step (1), the receiver may acquire QoS flow-DRB mapping change information at step (2). At step (3), the receiver may receive information on the last packet transmitted on the legacy DRB based on a packet transmitted on the new DRB. After receiving the information on the last packet transmitted on the legacy DRB, the receiver may transmit, at step (4), the packets received on the legacy DRB to the upper layer in order, the packets including the last packet. The upper layer may be a new layer (e.g., PDAP or SDAP layer) proposed in an embodiment of the disclosure. Although the packets transmitted on the new DRB while the packets received on the legacy DRB are transmitted to the upper layer, the receiver holds off transmission of the packets received on the new DRB to the upper layer. If even the last packet received on the legacy DRB is transmitted to the upper layer, the receiver may transmit, at step (5), the packets received on the new DRB to the upper layer in order.

The legacy DRB last packet information being received at step (3) may be provided as in one or a combination of options as follows.

Option 1. A sequence number (SN) of the last packet on the legacy DRB is carried in a PDCP header of the packet being transmitted on the new DRB. For example, a packet carrying the SN of the last packet transmitted on the legacy DRB may be a dummy packet carrying no data. Here, the PDCP header may include an indicator indicating that the information on the last packet transmitted on the legacy DRB is included. In the PDCP header, one of the reserved (R) bits may be used as a last packet information indicator, and SN bits may indicate the SN of the last packet transmitted on the legacy DRB.

Option 2. A region for the SN information of the last packet on the legacy DRB may be newly defined in the PDCP header. For example, the PDCP header may include the SN of the last packet on the legacy DRB as well as an SN of a packet on the new DRB. One of the R bits of the PDCP header may be used as the last packet information indicator indicative of the PDCP header carrying the information on the last packet of the legacy DRB rather than a normal PDCP header. In order to include the SN of the last packet on the legacy DRB, it may be necessary to increase the size of the PDCP header.

Option 3. Indication information indicating that the corresponding PDU is the first packet on the new DRB is included in the PDCP header. If this PDCP header is received, the receiver may acquire the SN information of the last packet on the legacy DRB based on the SN information of the first packet on the new DRB and the indication information. The indication information may be newly defined with part of R bits of the PDCP header.

Option 4. The transmitter retransmits the last packet of the legacy DRB on the new DRB. If the receiver receives packet, with the same SN, it determines that the corresponding packet is the last packet on the legacy packet.

Option 5. A new PDCP control PDU may be defined for indicating information on the last packet of the legacy DRB when the QoS flow-DRB mapping is changed. The new PDCP control PDU is transmitted on the new DRB. The PDCP control PDU may include an indicator indicating the corresponding packet is a control packet carrying the information on the last packet of the legacy DRB and SN information of the last packet of the legacy DRB.

Option 6. QoS flow ID or DRB ID information may be transmitted together in each of the above options. This aims to prevent the receiver from misidentifying the last packet of the legacy DRB when multiple QoS flows are mapped to one DRB. The QoS flow ID or DRB ID may be included in the PDCP header or a new protocol header (e.g., PDAP or SDAP header).

Proposal 2-2.

Figure 49:
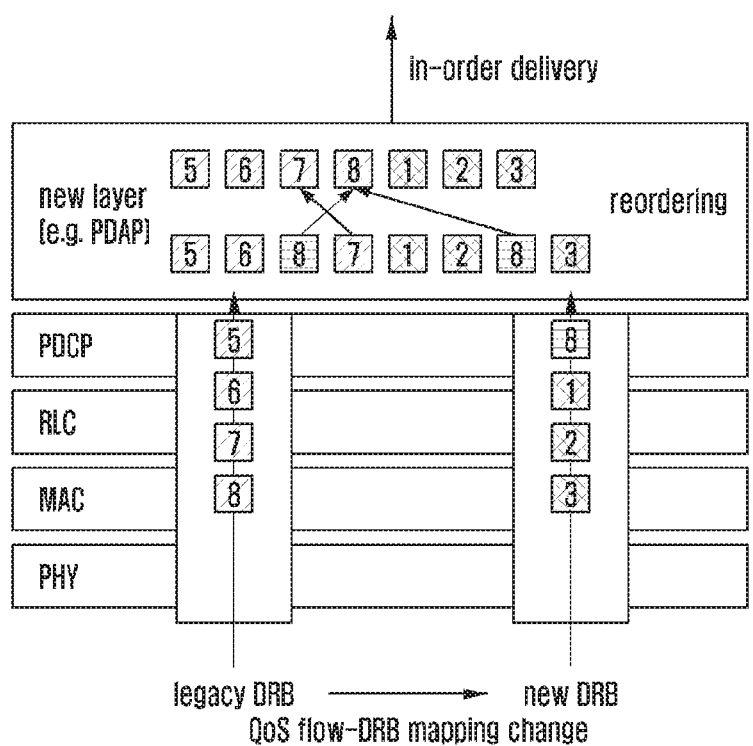
FIG. 49 is a diagram illustrating a new layer for supporting in-order transmission of packets transmitted on a legacy DRB and a new DRB according to the second embodiment of the disclosure.

FIG. 49 is a diagram for explaining a reordering function of a new layer (e.g., PDAP or SDAP layer) for in-order transmission of packets received on a legacy DRB and a new DRB to the upper layer in a QoS flow-DRB mapping change situation according to the second embodiment of the disclosure.

For example, in order to support the reordering function of the new layer, there is a need to define a new layer (PDAP or SDAP layer) sequence number (SN). The new layer SN may be included in a new layer packet header and it may be variable in length. In an embodiment of the disclosure, a transmitter may transmit information of the last packet of the legacy DRB to a receiver in order for the receiver to determine whether to use the reordering function of the new layer. If the information of the last packet of the legacy DRB is received from the transmitter, the receiver may activate the reordering function of the new layer.

Figure 50:
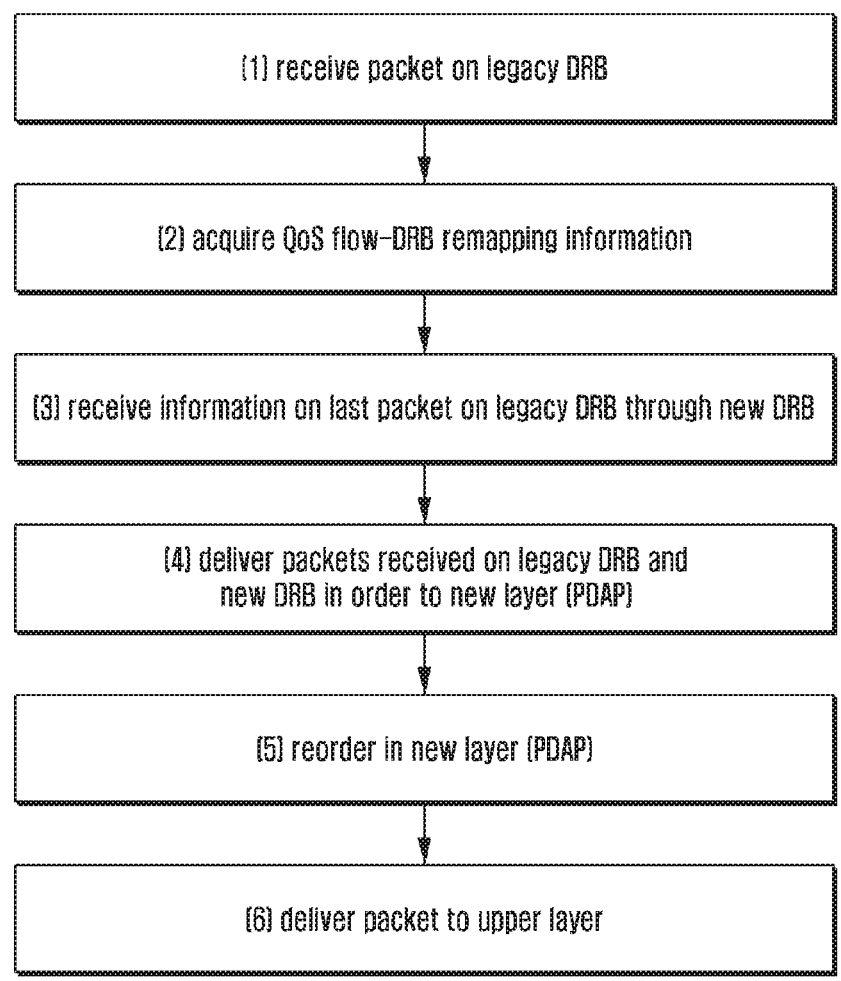
FIG. 50 is a flowchart illustrating an operation of a receiver supporting in-order transmission of packets transmitted on a legacy DRB and a new DRB in a new layer according to the second embodiment of the disclosure.

FIG. 50 is a flowchart illustrating a procedure in order for a new layer in a receiver to reorder packets received on a legacy DRB and a new DRB based on the information on the last packet of the legacy DRB and transmit the packets in order to an upper layer according to the second embodiment of the disclosure.

In the middle of receiving packets on the legacy DRB at step (1), the receiver may acquire QoS flow-DRB mapping change information at step (2). At step (3), the receiver may receive the information of the last packet of the legacy DRB, which is carried in a packet transmitted on the new DRB. The information of the last packet of the legacy DRB may be used in determining whether to configure the reordering function of the new layer (e.g., PDAP or SDAP layer).

In the receiver, the packets received on the legacy DRB and the new DRB may be transmitted to the new layer (e.g., PDAP or SDAP layer) in a first-arrive-first-transmit order at step (4). Here, the packets may be transmitted to the new layer (PDAP or SDAP) out of order according to the priorities of the DRBs. At step (5), the new layer may hold off transmission of the packets received on the new DRB to the new layer and perform reordering of packets based on the information of the last packet of the legacy DRB received at step (3).

At step (5), the receiver may reorder the packets received on the legacy DRB and the new DRB based on the new layer (PDAP or SDAP layer) SN information. After reordering the packets, the receiver may transmit the packets in order to the upper layer at step (6).

In the receiver, the PDCP layer may resume transmitting packets received on the new DRB. In an embodiment of the disclosure, the reordering function of the new layer (PDAP or SDAP layer) is triggered by receiving the information of the last packet of the legacy DRB The information of the last packet of the legacy DRB being received at step (3) is provided as in one or a combination of the following options.

Option 1. The transmitter may include the sequence number (SN) of the last packet on the legacy DRB in a PDAP or SDAP header. The PDAP or SDAP header may be defined so as to include an indicator indicating inclusion of the information of the last packet of the legacy DRB or PDAP or SDAP SN information. The data region of a PDAP or SDAP packet with the PDAP or SDAP header including the information of the last packet of the legacy DRB (indicator and/or PDAP or SDAP SN) may remain empty.

Option 2. The transmitter may include the PDAP or SDAP SN of the last packet on the legacy DRB in a region newly defined within the PDAP or SDAP header so as to transmit the PDAP or SDAP SN of the last packet on the legacy DRB along with the PDAP or SDAP SN of a packet on the new DRB in one PDAP or SDAP header.

Option 3. Indication information indicating that the corresponding PDU in the first packet on the new DRB is included in the PDAP or SDAP header. If this indication information is received, the receiver may acquire the PDAP or SDAP SN information of the last packet on the legacy DRB based on the PDAP or SDAP SN information of the corresponding packet and the indication information.

Option 4. The transmitter transmits the last packet of the legacy DRB on the new DRB in the same manner. If the duplicate of the last packet (same SN) of the legacy DRB is received, the receiver may identify the last packet of the legacy DRB.

Option 5. A PDAP or SDAP control PDU may be defined for indicating the information of the last packet of the legacy DRB when the QoS flow-DRB mapping is changed. The PDAP or SDAP control PUD is transmitted on the new DRB. The PDAP or SDAP control PDU may include an indicator indicative of the control packet carrying the information of the last packet of the legacy DRB and SN information of the last packet on the legacy DRB.

Option 6. QoS flow ID or DRB ID information may be transmitted together in each of the above options. This aims to prevent the receiver from misidentifying the last packet of the legacy DRB when multiple QoS flows are mapped to one DRB. The QoS flow ID or DRB ID may be included in the PDCP header or a new protocol header (e.g., PDAP or SDAP header).

Proposal 3.

Hereinafter, a description is made of the method for the PDCP layer in a receiver to temporarily attach a new layer packet SN (PDAP or SDAP SN) to the PDCP packets being received until completion of last packet transmission on a legacy DRB for packet reordering at the new layer. Whether to stop attaching a temporary new layer packet SN at the PDCP layer in the receiver may be determined based on the method for identifying the last packet on the legacy DRB as in one or a combination of the options proposed in Proposal 2.

Figure 51:
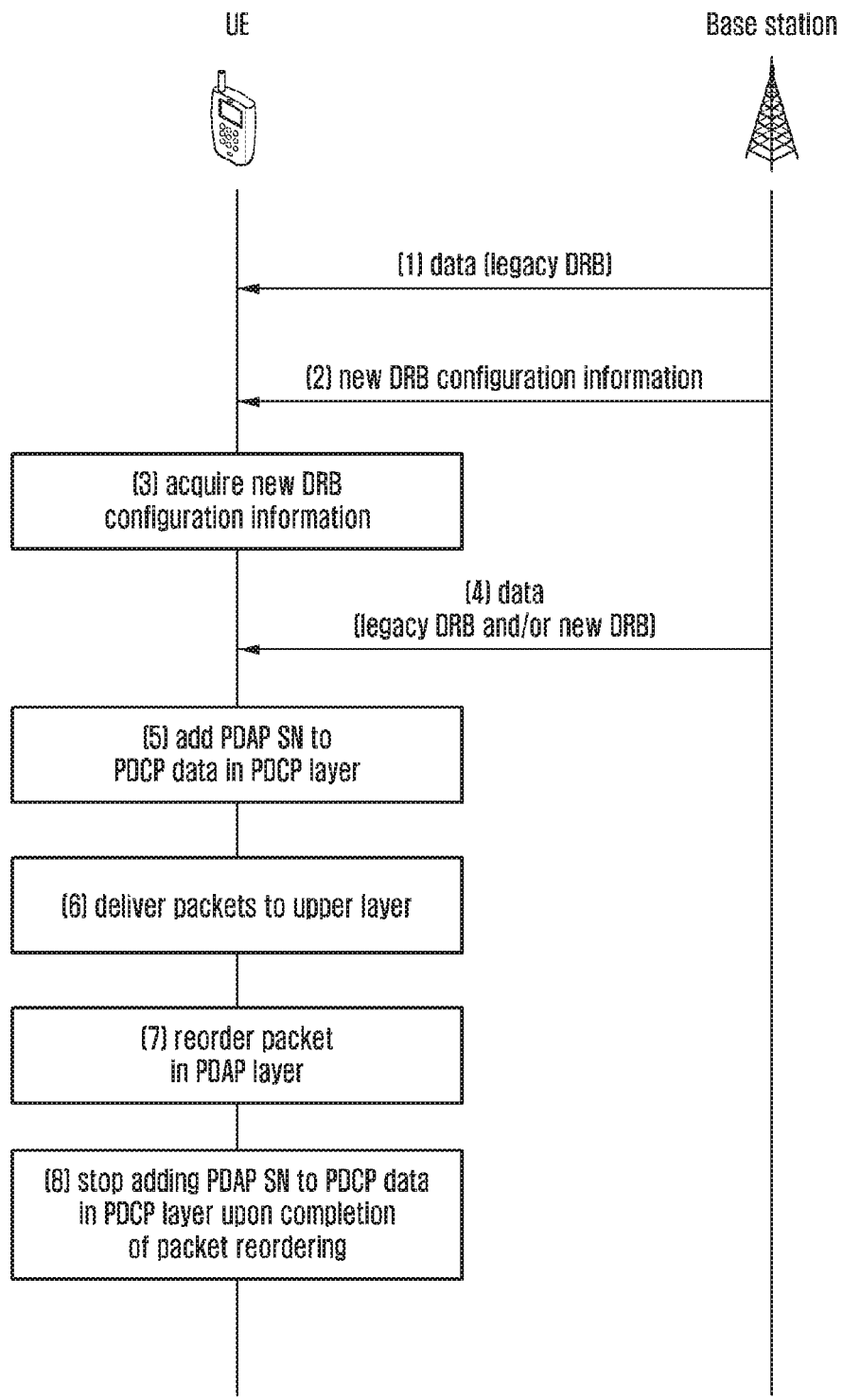
FIG. 51 is a signal flow diagram illustrating signal flows between a transmitter and a receiver for supporting a reordering function in a PDAP layer according to the second embodiment of the disclosure.

FIG. 51 is a signal flow diagram illustrating signal flows between a transmitter and a receiver for supporting a reordering function in a PDAP or SDAP layer according to the second embodiment of the disclosure. Although the embodiment of FIG. 51 is directed to the case where a base station is a transmitter and a terminal is a receiver, the procedure may also be applicable to the case where a terminal is a transmitter and a base station is a receiver.

In reference to FIG. 51, the base station as the transmitter may transmit packets to the terminal on a legacy DRB at step (1). At step (2), the base station may transmit new DRB configuration information or QoS flow-DRB mapping change information to the terminal. At step (3), the terminal may receive the new DRB configuration information and QoS flow-DRB mapping change information transmitted by the base station at step (2). At step (4), the base station may start transmitting packets on the new DRB after completing the packet transmission on the legacy DRB.

After receiving the QoS flow-DRB mapping change information at step (3), the terminal may generate a temporary new layer (PDAP or SDAP) SN for a received packet and attach it to the PDCP data at step (5). The operation of step 5 may be performed at the PDCP layer in the receiver in such a way that the PDCP layer generates the new layer (PDAP or SDAP) SN and attaches the SN to the PDCP data. The new layer (PDAP or SDAP) SN generated at the PDCP layer may be a sequence number being temporarily attached by the PDCP layer for supporting the reordering function of the new protocol (PDAP or SDAP) layer. The temporary SN may be identical with the PDCP SN or arbitrarily set by the PDCP layer. In the terminal, the packet to which the new layer SN is attached may be transmitted to the upper layer at step (6).

Here, the upper layer may correspond to the new layer (PDAP or SDAP layer). At step (7), the new layer in the receiver may reorder the packets with the SNs as attached at step (5) and transmit the packets to the upper layer. If it is determined that, with the inclusion of the last packet, the packets transmitted on the legacy DRB have been successfully received, the receiver may stop, at step (8), attaching the temporary SN to the packet (PDCP SDU).

Whether a packet received by the receiver is any packet or the last packet on the legacy DRB may be determined using one or a combination of options as follows.

Option 1. An indicator indicative of the last packet of the legacy DRB may be defined to be included along with the new layer SN being attached to the last packet of the legacy DRB before transmission to the upper layer in the PDCP layer of the receiver.

Option 2. An indicator indicating that a packet is the last packet of the legacy DRB may be defined to be included, by the transmitter, in the PDAP or SDAP header of the last packet of the legacy DRB. If this packet is received, the receiver may acquire the information of the last packet of the legacy DRB based on the indication information.

Option 3. The receiver PDCP layer may be defined to include an indication indicative of the first packet on the new DRB along with the new layer SN being attached to the first packet of the new DRB before transmission to the upper layer. If this packet is transmitted to the upper layer, the upper layer may acquire the SN information of the last packet on the legacy DRB based on the SN of the packet and the indication information.

Option 4. The transmitter may define an indication indicating a packet is the first packet in the PDAP or SDAP header of the first packet on the new DRB. If this packet is received, the receiver may acquire the SN information of the last packet on the legacy DRB based on the SN of the packet and the indication information.

Option 5. After transmitting to the upper layer the last packet of the legacy DRB to which the new layer SN is attached, the PDCP layer of the receiver may send the upper layer an indicator indicating that all data packets on the legacy DRB have been completely transmitted. After sending the indicator, the legacy DRB may be controlled to be released.

Option 6. After transmitting the last packet on the legacy DRB, the transmitter transmits an indicator indicative of completion of packet transmission through the legacy DRB. Afterward, the transmitter transmits subsequent packets on a new DM.

Option 7. After completing transmission of the last packet on the legacy DRB, the transmitter may transmit an indicator indicative of completion of packet transmission through the new DRB. Afterward, the transmitter transmits subsequent packets on a new DRB.

Option 8. QoS flow ID or DRB ID information may be transmitted together in each of the above options. This aims to prevent the receiver from misidentifying the last packet of the legacy DRB when multiple QoS flows are mapped to one DRB. The QoS flow ID or DRB ID may be attached along with the new layer SN.

Figure 52:
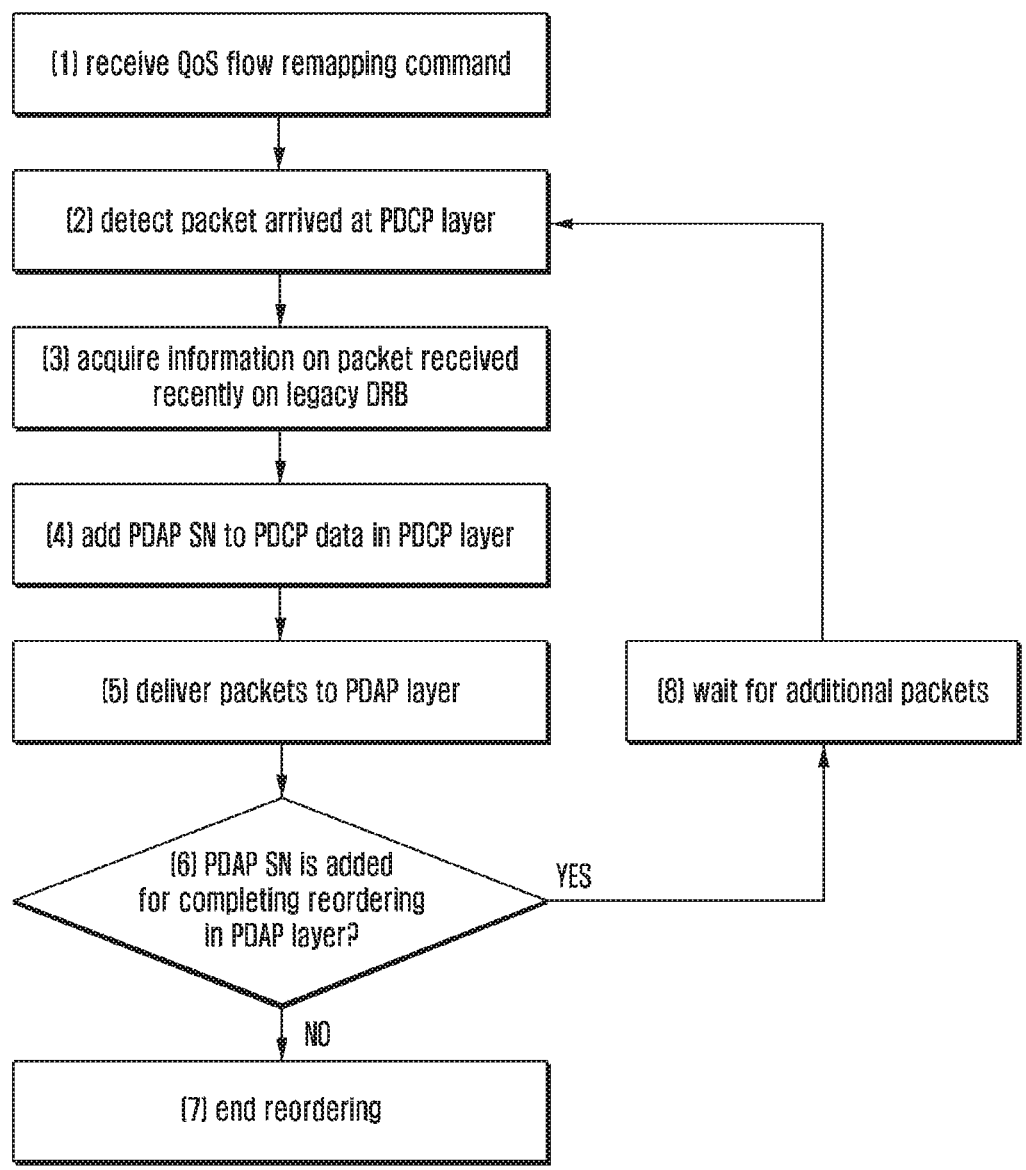
FIG. 52 is a flowchart illustrating an operation of a receiver for supporting a reordering function of a PDAP layer according to the second embodiment of the disclosure.

FIG. 52 is a flowchart illustrating an operation of a receiver for supporting a reordering function of a PIMP or SDAP layer according to the second embodiment of the disclosure.

In reference to FIG. 52, a receiver may receive QoS flow-DRB mapping change indication information from a transmitter at step (1). For example, the QoS flow-DRB mapping change indication information corresponds to DRB-QoS Flow mapping rule information included in an RRC Reconfiguration message transmitted by the terminal. After the operation of step (1), the PDCP layer of the receiver detects packet arrival at step (2). At step (3), the PDCP layer of the receiver may acquire the information indicating whether the received packet is the last packet on the legacy DRB.

If it is not determined that the last packet on the legacy DRB is successfully received, an operation of attaching a new layer packet SN to the packet received from the transmitter may be performed at step (4) in the receiver. At step (4), the PDCP layer of the receiver may check for the PDCP SN of the data packet, process the PDCP SN to produce a new layer SN (PDAP or SDAP SN), and prefix this SN to the PDCP data. The operation of step (4) may be performed on the legacy DRB and new DRB packets arrived at the PDCP layer of the receiver after receiving the QoS flow-DRB mapping change indication.

The PDCP layer of the receiver may generate the new SN in a format readable by the PDAP or SDAP layer and send it to the upper layer along with the PDCP data. The SN information in the PDCP header may be copied to be used as the PDAP or SDAP layer SN, and the PDCP layer may apply SNs in an arbitrary order. The PDCP layer may indicate a separate indication to the PDAP or SDAP SN that is newly generated by the PDCP layer so as to be distinguished from the PDAP or SDAP header that is typically used in the PDAP or SDAP layer. A temporary PDAP or SDAP SN obtained by converting the SN in the PDCP header to a format readable by the PDAP or SDAP layer may be sent to the upper layer (PDAP or SDAP layer) along with the PDCP data. The PDAP or SDAP layer may reorder the packets based on the temporary PDAP or SDAP SN. After the sequence information is attached to the packets, the packets may be transmitted, at step (5), to the PDAP or SDAP layer as the upper layer.

At step (6), the receiver may determine whether the last packet on the legacy DRB is successfully received or packets are still being received on the legacy DRB. Whether the last packet on the legacy DRB is successfully received may be determined using one or a combination of the options of Proposal 2. If it is determined at step (6) that packets are still being received on the legacy DRB, the PDCP layer may wait for receiving packets on the legacy DRB and the new DRB at step (8). If it is determined at step (6) that the last packet on the legacy DRB has been successfully received and all the packets received on the legacy DRB are completely transmitted to the upper layer, the PDCP layer of the receiver may complete the operation of configuring the temporary PDAP or SDAP SN, and the PDAP or SDAP layer may stop, at step (7), reordering the packets received on the legacy DRB and the new DRB.

Figure 53:
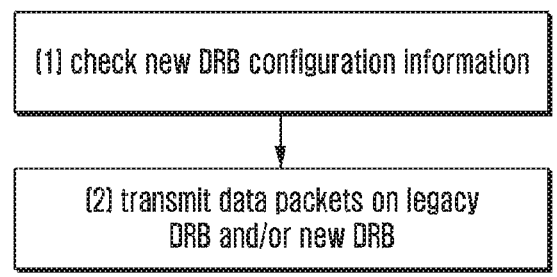
FIG. 53 is a flowchart illustrating an exemplary operation of a transmitter for supporting a reordering function of a PDAP layer according to the second embodiment of the disclosure.
Figure 54:
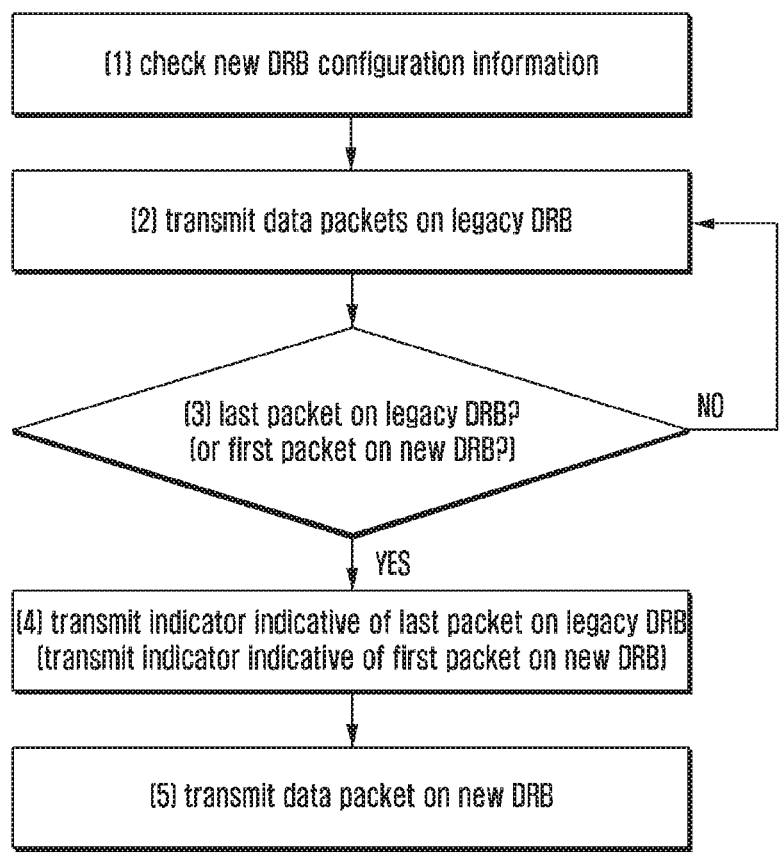
FIG. 54 is a flowchart illustrating another exemplary operation of a transmitter for supporting a reordering function of a PDAP layer according to the second embodiment of the disclosure.

FIGS. 53 and 54 are flowcharts illustrating operations of a transmitter for supporting a reordering function of a PDAP or SDAP layer according to the second embodiment of the disclosure.

FIG. 53 is a flowchart illustrating an exemplary operation of a transmitter for supporting a reordering function of a PDAP or SDAP layer according to the second embodiment of the disclosure.

The procedure of FIG. 53 may be performed in the case of Options 1, 3, 5, and 7 of Proposal 3. At step (1), the transmitter may check for QoS flow-DRB remapping or new DRB configuration information. At step (2), the transmitter may transmit data packets assigned to the legacy DRB on the legacy DRB and, if the data packet transmission on the legacy DRB is completed, transmit data packets on the new DRB.

FIG. 54 is a flowchart illustrating another exemplary operation of a transmitter for supporting a reordering function of a PDAP or SDAP layer according to the second embodiment of the disclosure.

The procedure of FIG. 54 may be performed in the case of applying Options 2, 4, 6, and 7 of Proposal 3. In reference to FIG. 54, the transmitter may check for QoS flow-DRB remapping or new DRB configuration information at step (1). At step (2), the transmitter may continuously transmit data packets on the legacy DRB. At step (3), the transmitter may determine whether a packet to be transmitted is the last packet on the legacy DRB. If it is determined that the packet to be transmitted is the last packet on the legacy DRB, the transmitter may include, at step (4), an indicator indicative of the last packet on the legacy DRB in the PDCP header of the last packet on the legacy DRB. In an alternative embodiment, if it is determined that the packet to be transmitted is not the last packet on the legacy DRB, the transmitter may transmit a packet indicative of the transmission of the last packet on the legacy DRB after the transmission of the last packet on the legacy DRB.

In an alternative embodiment, if the first packet on the new DRB is transmitted at step (3), the transmitter may include an indicator indicative of the first packet on the new DRB in the PDCP header of the first packet on the new DRB. In an alternative embodiment, if the first packet on the new DRB is transmitted at step (3), the transmitter may transmit information of the last packet of the legacy DRB on the new DRB. At step (5), the transmitter may continue transmitting data packets on the new DRB.

Figure 55:
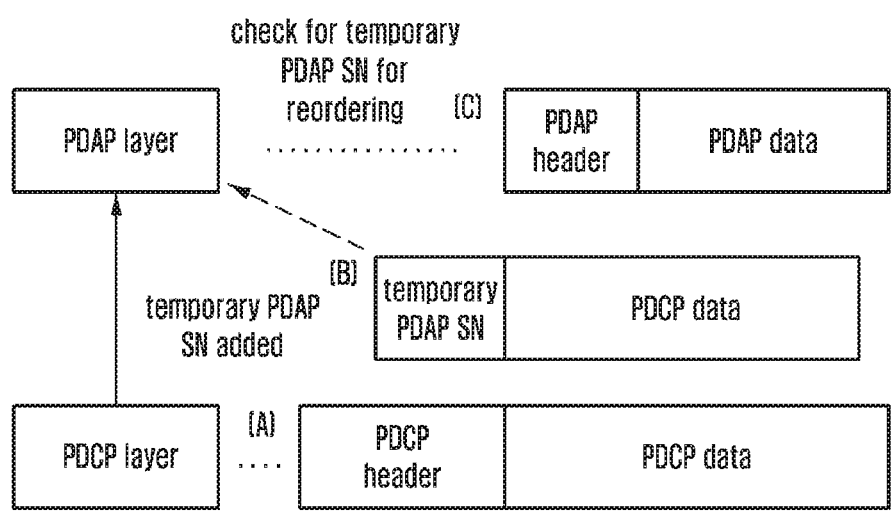
FIG. 55 is a diagram illustrating a packet structure for the case r here a PDCP layer attaches a PDAP or SDAP layer packet SN according to the second embodiment of the disclosure.

FIG. 55 is a diagram illustrating a packet structure for the case where a PDCP layer attaches a PDAP or SDAP layer packet SN according to the second embodiment of the disclosure.

FIG. 55 is a diagram illustrating an exemplary packet structure having a PDAP or SDAP SN attached in the PDCP layer. In reference to FIG. 55, a PDCP layer packet (A) may include a PDCP header and PDCP data. A PDAP or SDAP layer packet (C) may include a PDAP or SDAP header and PDAP or SDAP data. (B) denotes an exemplary structure of a packet that is temporarily generated to transmit the PDCP data with a temporary PDAP or SDAP SN generated in the PDCP layer to the PDAP or SDAP layer.

The temporary PDAP or SDAP SN may be obtained by converting the SN in the PDCP header to a format to be identified by the PDAP or SDAP layer. The temporary PDAP or SDAP SN may be transmitted to the upper layer (PDAP or SDAP layer) along with the PDCP data. The temporary PDAP or SDAP SN may be generated based on a copy of the SN in the PDCP header or may be configured as an SN that is arbitrarily determined in the PDCP layer.

In the embodiment of Proposal 3, the description has been made of the method for the PDCP layer of the receiver to configure a temporary PDAP or SDAP SN for the case where the QoS flow-DRB mapping is changed such that the PDAP or SDAP layer is capable of transmit packets in order to the upper layer.

In an alternative embodiment, the packet structure of Proposal 3 may be used as a method for the PDCP layer of the receiver to configure a temporary PDAP or SDAP SN, for predetermined QoS flow-DRB mapping regardless of a change in the QoS flow-DRB mapping, such that the PDAP or SDAP layer transmits the packets in order to the upper layer.

Proposal 4.

In an embodiment of the disclosure, a dedicated PDAP or SDAP status report message may be defined for DL and UL to support in-order packet transmission in the PDAP or SDAP layer. The Status Report of the PDAP or SDAP layer may be used to request for retransmission that may be likely to be lost in the course of QoS flow remapping.

The PDAP or SDAP status report message may be structured in the form of status report information in the PDAP or SDAP header or a separate PDAP or SDAP control PDU. The PDAP or SDAP status report message may be transmitted periodically or in response to an instruction from the base station. The PDAP or SDAP status report transmission may be triggered by an event as follows. For example, the PDAP or SDAP status report may be transmitted in the case where the packets on the legacy DRB are not correctly received or it is necessary to determine whether an assumed last packet on the legacy DRB is the last packet transmitted on the legacy DRB.

A description is made of the structure of the PDAP or SDAP status report hereinafter. The structure of the PDAP or SDAP status report may be defined with one or a combination of options as follows.

Figure 56:
FIG. 56 is a diagram illustrating Option 1 according to the second embodiment of the disclosure.

Option 1. The PDAP or SDAP status report may be managed in the same manner as the Status report in the PDCP header. That is, it may consist of a first mission PDAP or SDAP SN (FMS) and a bitmap. FIG. 56 is a diagram illustrating a PDAP or SDAP status report message format proposed in Option 1 according to the second embodiment of the disclosure.

Figure 57:
FIG. 57 is a diagram illustrating Option 2 according to the second embodiment of the disclosure.

Option 2. The PDAP or SDAP status report may include only the FMS. In this case, the transmitter needs to retransmit all packets following the FMS on the new DRB. FIG. 57 is a diagram illustrating a PDAP or SDAP status report message proposed in Option 2 according to the second embodiment of the disclosure.

Figure 58:
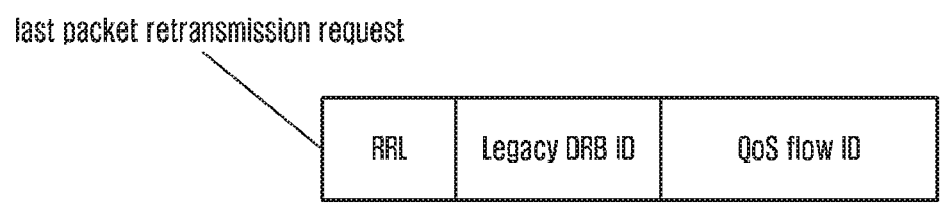
FIG. 58 is a diagram illustrating Option 3 according to the second embodiment of the disclosure.

Option 3. It may be possible to request for retransmission of only the last packet on the legacy DRB. In this case, the PDAP or SDAP status report may include information indicating whether to request for retransmission or not. FIG. 58 is a diagram illustrating a PDAP or SDAP status report message format proposed in Option 3 according to the second embodiment of the disclosure.

Figure 59:
FIG. 59 is a diagram illustrating Option 4 according to the second embodiment of the disclosure.

Option 4. It may be possible to request for retransmission of the last packet on the legacy DRB and first packet on the new DRB. In this case, the PDAP or SDAP status report may include information indicating whether to request for retransmission or not. FIG. 59 is a diagram illustrating a PDAP or SDAP status message format proposed in Option 4 according to the second embodiment of the disclosure.

Option 5. Legacy DRB ID and new DRB ID information may be included together for Options 1 to 4.

Option 6. QoS flow ID information of the corresponding QoS flow may be included together for Options 1 to 4.

Figure 60:
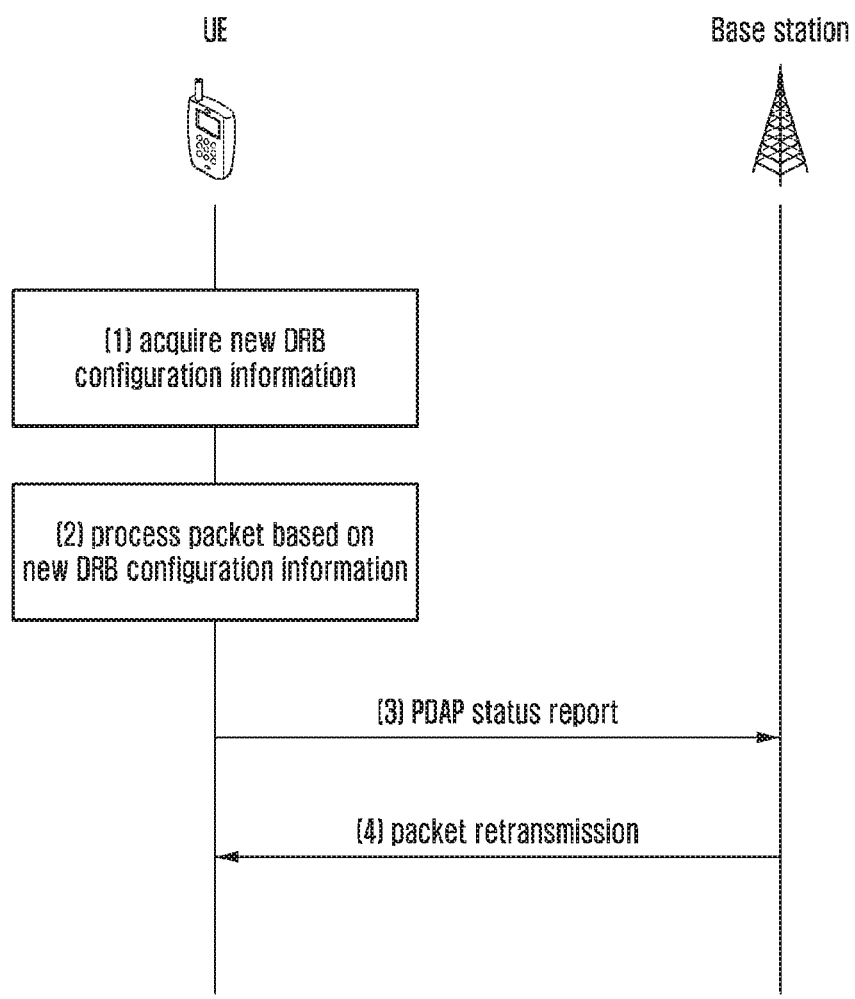
FIG. 60 is a signal flow diagram illustrating an exemplary PDAP status report procedure according to the second embodiment of the disclosure.
Figure 61:
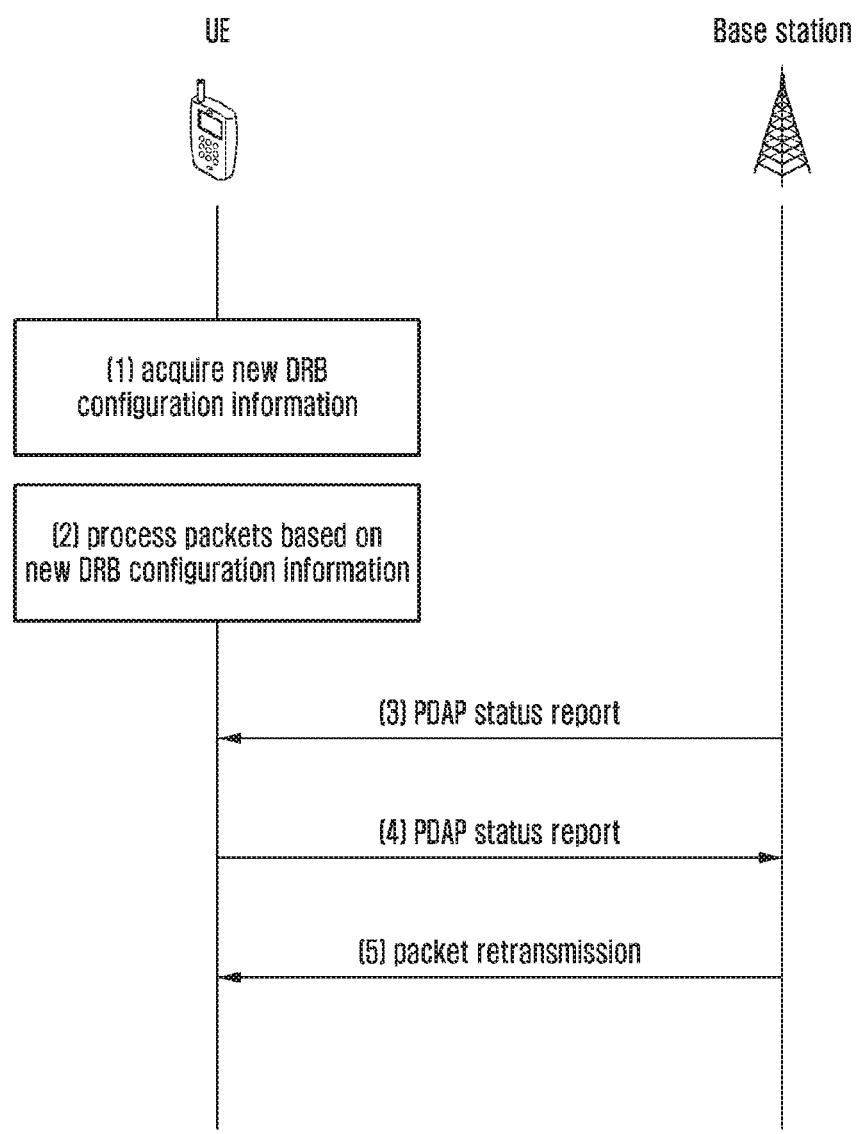
FIG. 61 is a signal flow diagram illustrating another exemplary PDAP status report procedure according to the second embodiment of the disclosure.

FIGS. 60 and 61 are signal flow diagrams illustrating signal flows between a transmitter and a receiver supporting a PDAP or SDAP status report with various Options for packets on a legacy DRB. Although the embodiments of FIGS. 60 and 61 are directed to the case where a base station is a transmitter and a terminal is a receiver, the procedure may also be applicable to the case where a terminal is a transmitter and a base station is a receiver.

FIG. 60 is a signal flow diagram illustrating an exemplary PDAP or SDAP status report procedure according to the second embodiment of the disclosure.

In reference to FIG. 60, the terminal may acquire new DRB configuration information at step (1). At step (2), the terminal may process packets being received from the base station based on the DRB configuration information. The DRB configuration information may include information such as a packet SN on the legacy DRB, a new DRB transmission start timer, or a legacy DRB transmission end timer. At step (3), the terminal may transmit the PDAP or SDAP status report at a time point when the legacy DRB last packet transmission is expected.

The PDAP or SDAP status report may include status information on the packets received by the PDAP or SDAP layer and transmitted to the upper layer ire the terminal. The time point when the PDAP or SDAP status report is transmitted may be indicated in the DRB configuration information transmitted by the base station.

The PDAP or SDAP status report transmission timing may be transmitted periodically after receiving the new DRB configuration information at step (1). At step (4), the terminal may receive the packets retransmitted by the base station, the packets missing on the legacy DRB. The packet retransmission at step (4) may be determined by the base station based on the PDAP or SDAP status report transmitted by the terminal at step (3).

In an alternative embodiment, the base station may transmit information of the last packet of the legacy DRB to the terminal in the middle of the packet retransmission at step (4). If it is determined that the terminal has completely received all packets transmitted on the legacy DRB based on the PDAP or SDAP status report, the base station may transmit a legacy DRB packet reception complete message to the terminal.

FIG. 61 is a signal flow diagram illustrating another exemplary PDAP or SDAP status report procedure according to the second embodiment of the disclosure.

In reference to FIG. 61, the terminal may acquire new DRB configuration information at step (1). At step (2), the terminal may process packets being received from the base station based on the DRB configuration information. The DRB configuration information may include information such as a packet SN on the legacy DRB, a new DRB transmission start timer, or a legacy DRB transmission end timer. At step (3), the terminal may receive a PDAP or SDAP status report transmission request from the base station.

In response to the PDAP or SDAP status report transmission request, the terminal may transmit a PDAP or SDAP status report to the base station at step (4). The PDAP or SDAP status report may include status information on the packets received by the PDAP or SDAP layer and transmitted to the upper layer in the terminal. The packet retransmission at step (5) may be determined by the base station based on the PDAP or SDAP status report transmitted by the terminal at step (4).

In an alternative embodiment, the base station may transmit information of the last packet of the legacy DRB to the terminal in the middle of the packet retransmission at step (5). If it is determined that the terminal has completely received all packets transmitted on the legacy DRB based on the PDAP or SDAP status report, the base station may transmit a legacy DRB packet reception complete message to the terminal.

Hereinafter, descriptions are made of the operations of additional options applicable to the proposed operations of the disclosure.

Additional Option 1. A timer operation may be added to Proposal 2. If a supported QoS flow is a low-latency intensive service such as an URLLC service and the remapped new DRB is more suitable for the service or prioritized over the legacy DRB in packet transmission to the upper layer, latency in receiving the last packet on the legacy DRB may delay supporting the service. This additional option makes it possible to protect against service provision delay led by packet reception latency on the legacy DRB by running a timer associated with receiving packets on the legacy DRB. After receiving the timer information, the receiver has to complete processing the packets on the legacy DRB before expiry of the timer. In this case, packet loss may occur on the legacy DRB.

The timer value mentioned in Additional Option 1 may be carried in a RadioResourceConfigDedicated IF of an RRC Connection Reconfiguration message. In this case, the timer value information may be transmitted along with new DRB information. Information on whether to use the timer or not may also be included along with the new DRB information. In the case of including the information on whether to use the timer rather than the timer value information in the IE, the timer value should be basically configured and needs to be preset between the terminal and the base station.

Additional Option 1-1.

Figure 62:
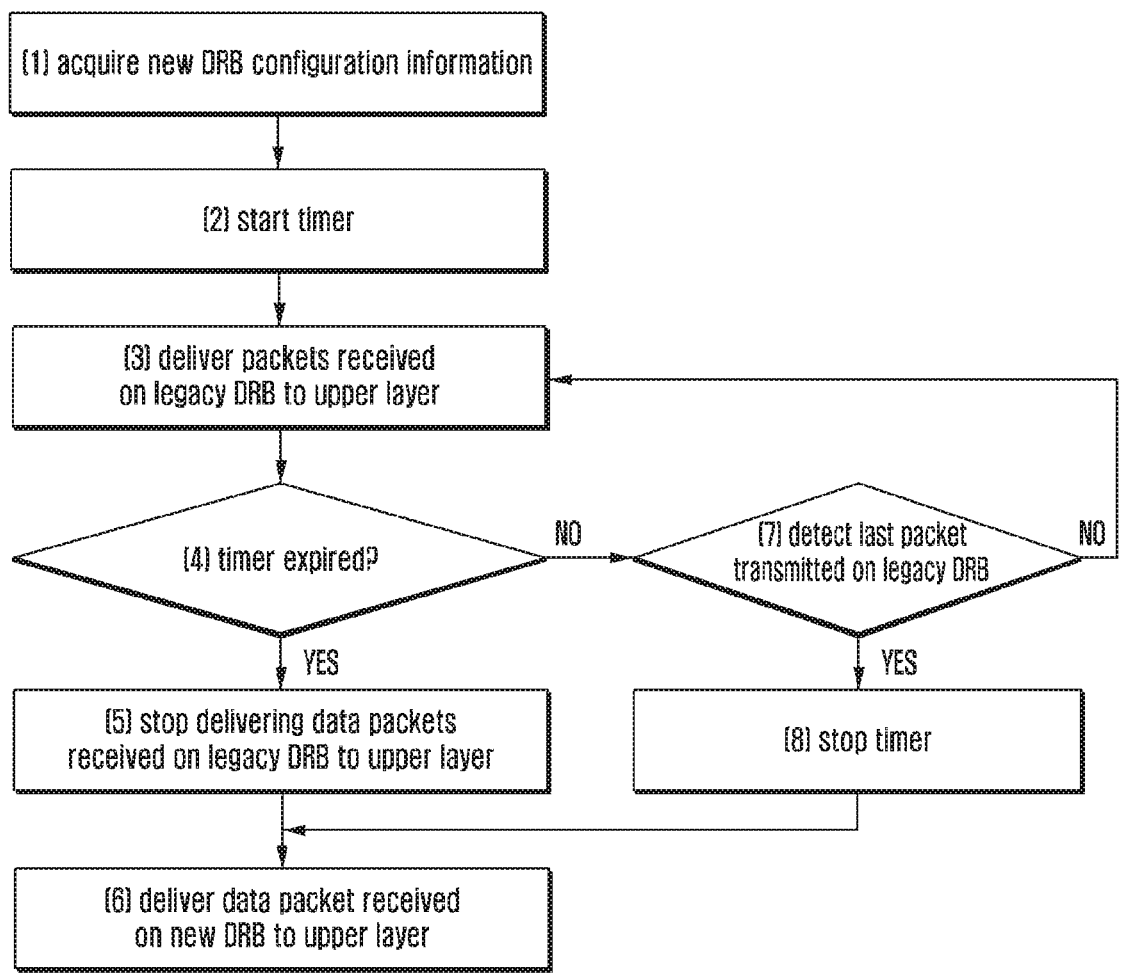
FIG. 62 is a flowchart illustrating a timer-based in-order transmission operation of a receiver according to the second embodiment of the disclosure.

FIG. 62 is a flowchart illustrating a timer-based in-order transmission operation of a receiver according to the second embodiment of the disclosure.

A timer operation may be added for transmission of packets received on the legacy DRB to the upper layer in Proposal 2-1. After receiving the QoS flow remapping command, the receiver may receive new DRB configuration information at step (1) and start a timer, at step (2), for transmission of packets received on the legacy DRB to the upper layer. At step (3), the PDCP layer of the receiver may transmit the packets received on the legacy DRB to the upper layer while the timer is running.

The receiver determines at step (4) whether the timer has expired and, if the tinier has expired, the PDCP layer may stop, at step (5), transmitting the packets received on the legacy DRB and start, at step (6), transmitting the packets received on the new DRB to the upper layer. If it is determined at step (4) that the timer has not expired, the receiver determines at step (7) whether the last packet transmitted on the legacy DRB has been received. If it is determined at step (7) that the last packet on the legacy DRB has been received, the receiver stops the timer at step (8) and transmits, at step (6), the packets received on the new DRB in order in subsequence to the last packet on the legacy DRB. If it is determined at step (7) that the last packet on the legacy DRB has not been received yet, the receiver performs the operation of (3).

In order to minimize a data loss rate with the timer operation, the operation described in Proposal 2-1 may be modified. If it is determined at step (7) that the last packet on the legacy DRB has not been received, the receiver may perform the operation of step (2). That is, if the packet received on the legacy DRB is not the last packet, the timer may restart. The receiver may extend the running time of the timer until the last packet on the legacy DRB is received so as to increase the probability of receiving the last packet on the legacy DRB.

Additional Option 1-2.

Figure 63:
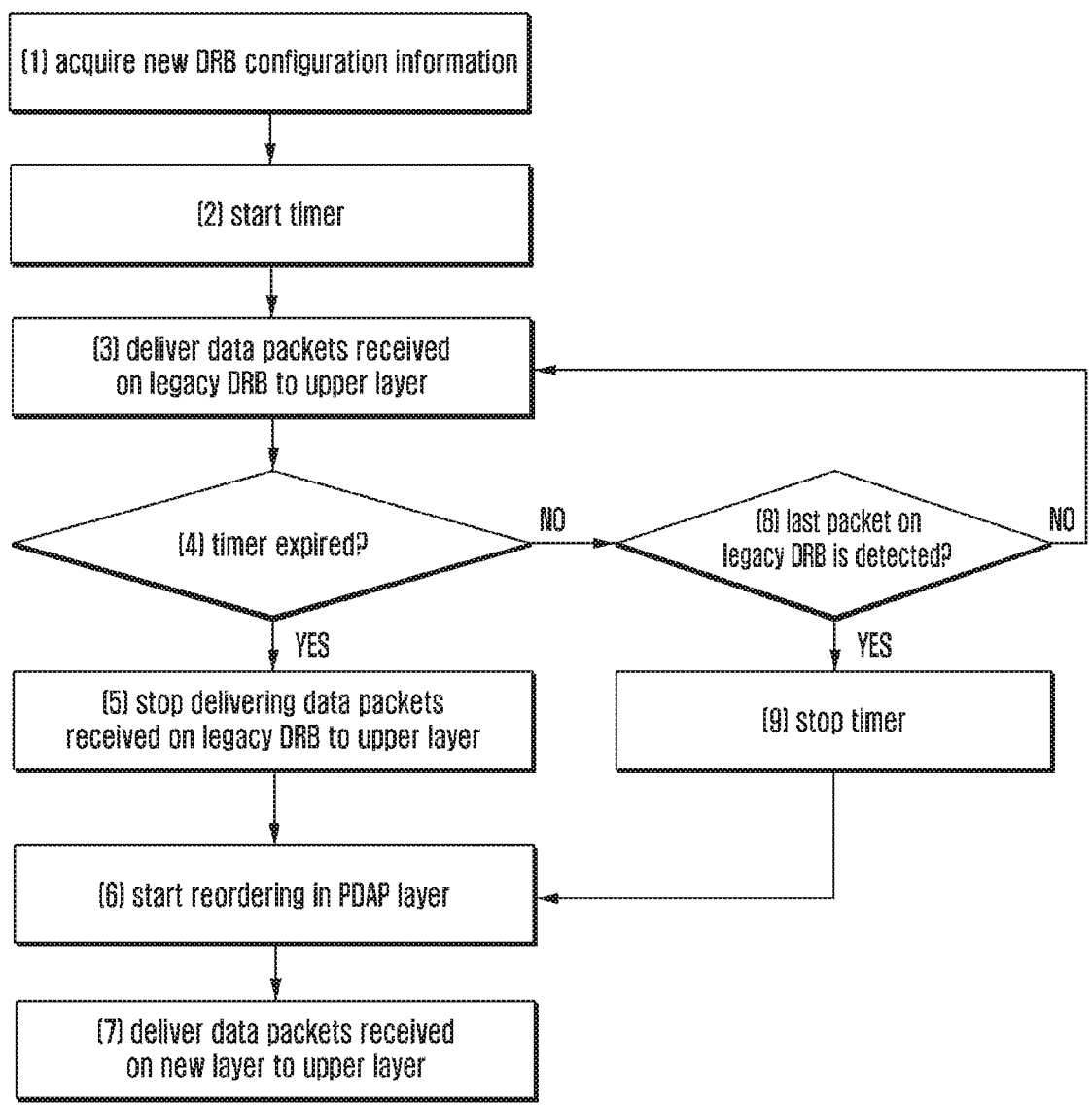
FIG. 63 is a diagram illustrating a timer-based reordering operation of a receiver according to the second embodiment of the disclosure.

FIG. 63 is a diagram illustrating a timer-based reordering operation of a receiver according to the second embodiment of the disclosure. A reordering timer operation may be added in Proposal 2-2.

In reference to FIG. 63, the receiver may receive a QoS flow remapping command, acquire new DRB configuration information at step (1), and start a timer operation at step (2). The start of the timer operation may be triggered by receiving a QoS flow-DRB remapping command, transmission of the first packet on the new DRB to the PDAP or SDAP layer, or transmission of a packet on the legacy DRB to the PDAP or SDAP layer after receiving the new DRB configuration information or QoS flow-DRB remapping command. While the timer is running, the PDCP layer of the receiver may transmit the packets on the legacy DRB to the upper layer at step (3). At step (3), the receiver holds off transmitting transmission of packets on the new DRB to the upper layer.

The receiver determines at step (4) whether the timer has expired. If it is determined at step (4) that the timer has expired, the PDCP layer of the receiver stops, at step (5), transmitting the packets on the legacy DRB to the upper layer, and the PDAP or SDAP layer starts packet reordering at step (6). After the expiry of the timer, the packets arrived at the PDCP layer may be discarded. After completing the packet reordering, the PDAP or SDAP layer of the receiver transmits the packets in order to the upper layer and, upon completion of this operation, the PDCP layer resumes transmitting packets to the upper layer at step (7). If it is determined at step (4) that the timer has not expired, the receiver may determine at step (8) whether the last packet on the legacy DRB is received. If it is determined at step (8) that the last packet on the legacy DRB is received, the receiver stops the timer operation at step (9), and the PDAP or SDAP layer starts packet reordering at step (6). After completing the packet reordering, the PDAP or SDAP layer may transmit the packets in order to the upper layer and, upon completion of this operation, the PDCP layer resumes, at step (7), sending packets to the upper layer. If it is determined at step (8) that the last packet on the legacy DRB is not received before the expiry of the timer, the receiver may perform the operation of step (3).

In order to minimize a data loss rate with the timer operation, the operation described in Proposal 2-2 may be modified. If it is determined at step (8) that the last packet on the legacy DRB is not received, the receiver may perform the operation of step (2). That is, if the packet received on the legacy DRB is not the last packet, the timer may restart. The receiver may extend the running time of the timer until the last packet on the legacy DRB is received so as to increase the probability of receiving the last packet on the legacy DRB.

Figure 64:
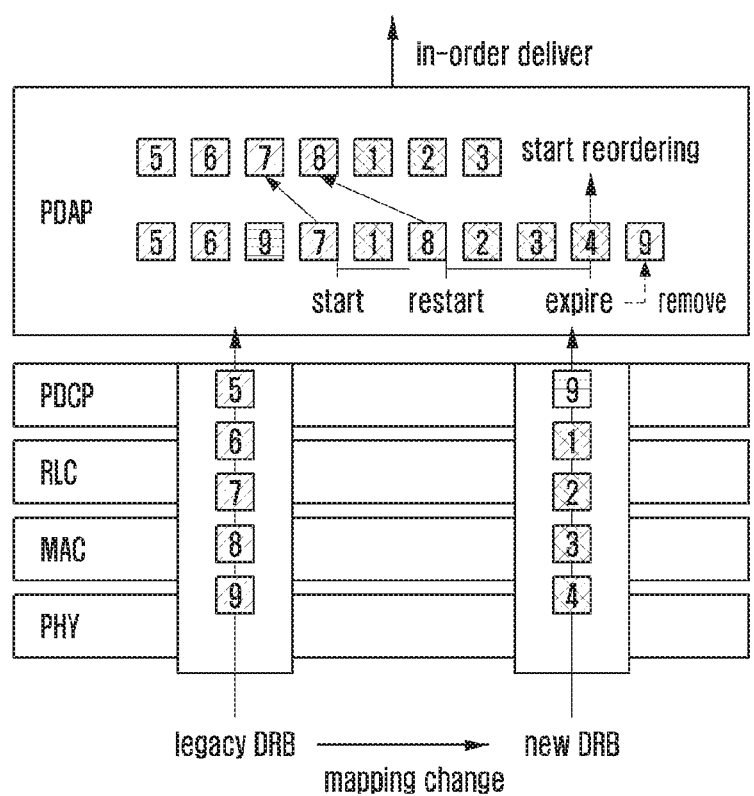
FIG. 64 is a diagram illustrating an operation of additional option 1-2 according to the second embodiment of the disclosure.

FIG. 64 is a diagram illustrating an operation of additional option 1-2 according to the second embodiment of the disclosure.

Additional Option 1-2. In order to guarantee lossless packet transmission, an operation of identifying SNs may be added. For the operation of the additional option, new information may be included in the PDCP header.

For Proposals 1-1 and 1-2, the transmitter may request to the receiver for an acknowledgement corresponding the packets transmitted on the legacy DRB before transmitting packets on a new DRB. The acknowledgement request may be made with SN information of the last packet on the legacy DRB. If the receiver transmits the acknowledgement in response to the request, the transmitter may start transmitting packets on the new DRB.

For Proposal 2-1, the PDCP layer of the receiver may determine whether the packets transmitted on the legacy DRB have been all received before transmitting the packets received on the new DRB. For this purpose, the receiver may make an acknowledgement request by transmitting SN information of the last packet on the legacy DRB. After receiving this request, the transmitter verifies the transmission and transmits an acknowledgement in response to the request. If the information transmitted by the transmitter mismatches the information on the last packet transmitted on the legacy DRB, the transmitter may retransmit the last packet transmitted on the legacy DRB along with a negative acknowledgement. After identifying the last packet transmitted on the legacy DRB, the PDCP layer of the receiver transmit the packets received on the new DRB to the upper layer.

Figure 65:
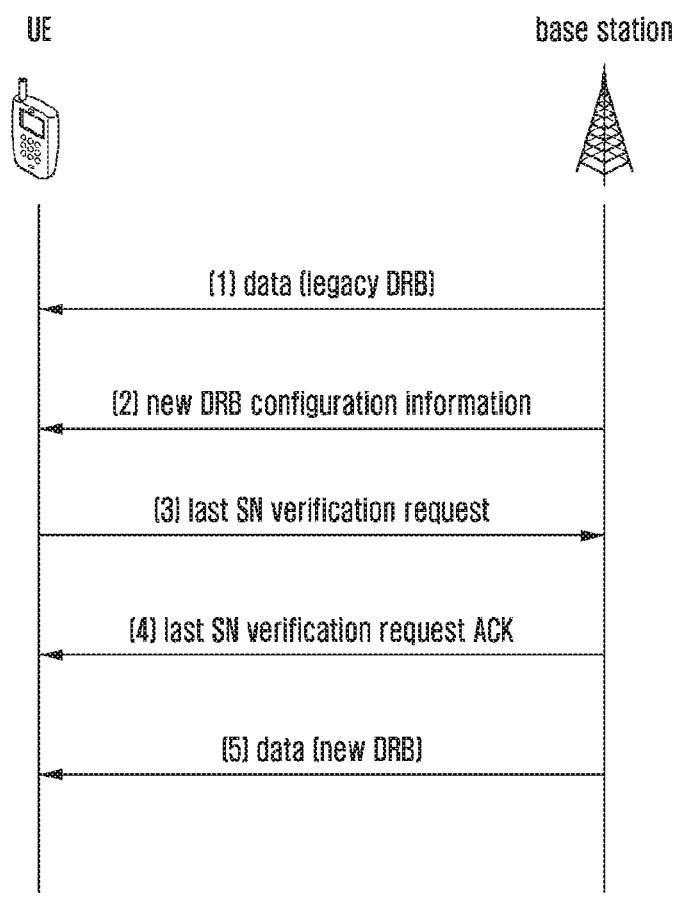
FIG. 65 is a signal flow diagram illustrating a procedure for identifying a last packet for in-order transmission according to the second embodiment of the disclosure.

FIG. 65 is a signal flow diagram illustrating a procedure for identifying a last packet for in-order transmission according to the second embodiment of the disclosure.

In reference to FIG. 65, a receiver (e.g., UE) may receive packets from a transmitter (e.g., base station) on a legacy DRB at step (1). In the case where the QoS flow-DRB mapping information is changed, the receiver may acquire new QoS flow-DRB mapping information from the transmitter or based on configured information at step (2). After completing the packet transmission on the legacy DRB, the transmitter may start transmitting packets on a new DRB. If it is determined that the last packet transmitted on the legacy DRB is received, the receiver may request to the transmitter, at step (3), for verifying information of the last packet of the legacy DRB. In order to verify the information of the last packet of the legacy DRB, the receiver may transmit SN information of the last packet received on the legacy DRB to the transmitter.

At step (4), the transmitter may transmit an acknowledgement message to the receiver in response to the information verification request of the last packet of the legacy DRB. The acknowledgement message being transmitted in response to the information verification request of the last packet of the legacy DRB may include information indicating whether the SN information of the last packet of the legacy DRB transmitted by the receiver matches the SN information of the last packet transmitted on the legacy DRB. If the SN information of the last packet of the legacy DRB identified by the receiver matches that identified by the transmitter, the transmitter may continue transmitting packets on the new DRB at step (5). If the SN information of the last packet of the legacy DRB identified by the receiver does not match that identified by the transmitter, the transmitter may retransmit the packets transmitted on the legacy DRB, with the inclusion of the last packet transmitted thereon, to the receiver.

For Proposal 2-2, the receiver may determine whether the packets transmitted on the legacy DRB have been all received before the PDAP or SDAP layer performs a reordering operation. For this purpose, the receiver may transmit SN information of the last packet received on the legacy DRB to the transmitter request for verification thereon. In reply to the request, the transmitter may determine whether the SN information is indicative of the last packet on the legacy DRB and transmit a response. If the information transmitted by the transmitter does not match the information on the last packet transmitted on the legacy DRB, the transmitter may retransmit the last packet transmitted on the legacy DRB along with a negative acknowledgement. After identifying the last packet transmitted on the legacy DRB, the receiver may perform a reordering operation.

Figure 66:
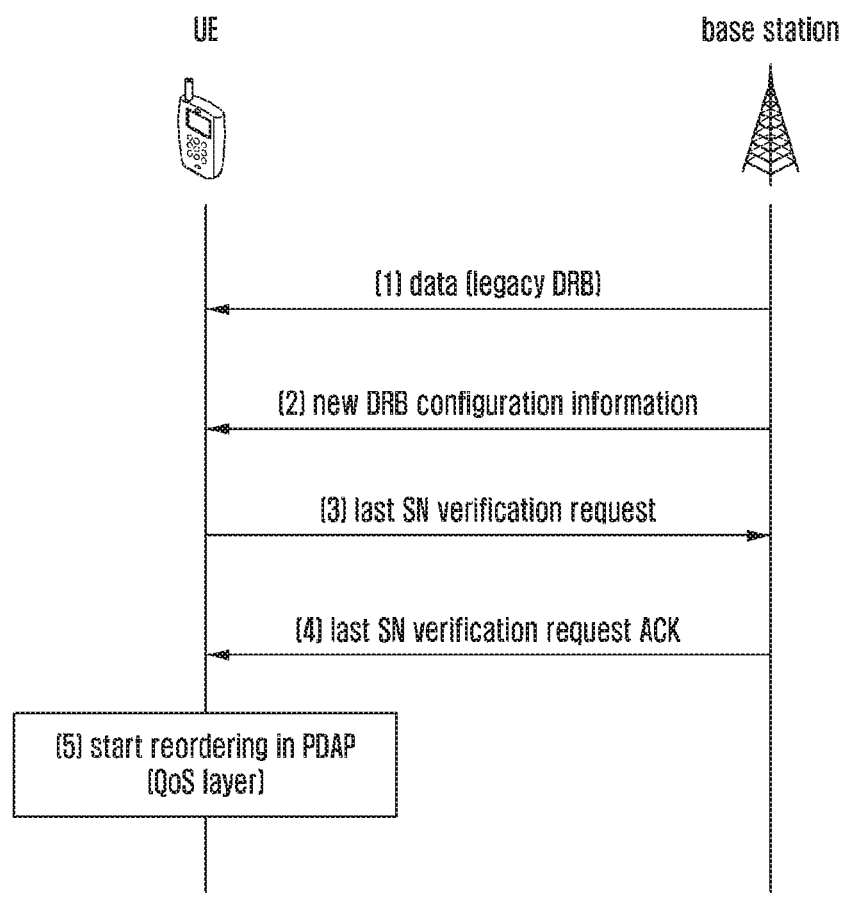
FIG. 66 is a signal flow diagram illustrating a procedure for identifying a last packet for reordering according to the second embodiment of the disclosure.

FIG. 66 is a signal flow diagram illustrating a procedure for identifying a last packet for reordering according to the second embodiment of the disclosure.

In reference to FIG. 66, a receiver (e.g., UE) may receive packets from a transmitter (e.g., base station) on a legacy DRB at step (1). In the case where the QoS flow-DRB mapping information is changed, the receiver may acquire new QoS flow-DRB mapping information from the transmitter or based on configured information at step (2), After completing the packet transmission on the legacy DRB, the transmitter may start transmitting packets on a new DRB. If it is determined that the last packet transmitted on the legacy DRB is received, the receiver may request to the transmitter, at step (3), for verifying information of the last packet of the legacy DRB. In order to verify the information of the last packet of the legacy DRB, the receiver may transmit SN information of the last packet received on the legacy DRB to the transmitter. At step (4), the transmitter may transmit an acknowledgement message to the receiver in response to the verification request for the information of the last packet of the legacy DRB. The acknowledgement message being transmitted in response to the verification request for the information of the last packet of the legacy DRB may include information indicating whether the SN information of the last packet of the legacy DRB transmitted by the receiver matches the SN information of the last packet transmitted on the legacy DRB. If the SN information of the last packet of the legacy DRB identified by the receiver matches that identified by the transmitter, the receiver may reorder the received packets in the PDAP or SDAP layer at step (5). If the SN information of the last packet of the legacy DRB identified by the receiver does not match that identified by the transmitter, the transmitter may retransmit the packets transmitted on the legacy DRB, with the inclusion of the last packet transmitted thereon, to the receiver. The receiver may reorder the packets including the retransmitted packets in the PDAP or SDAP layer.

Figure 67:
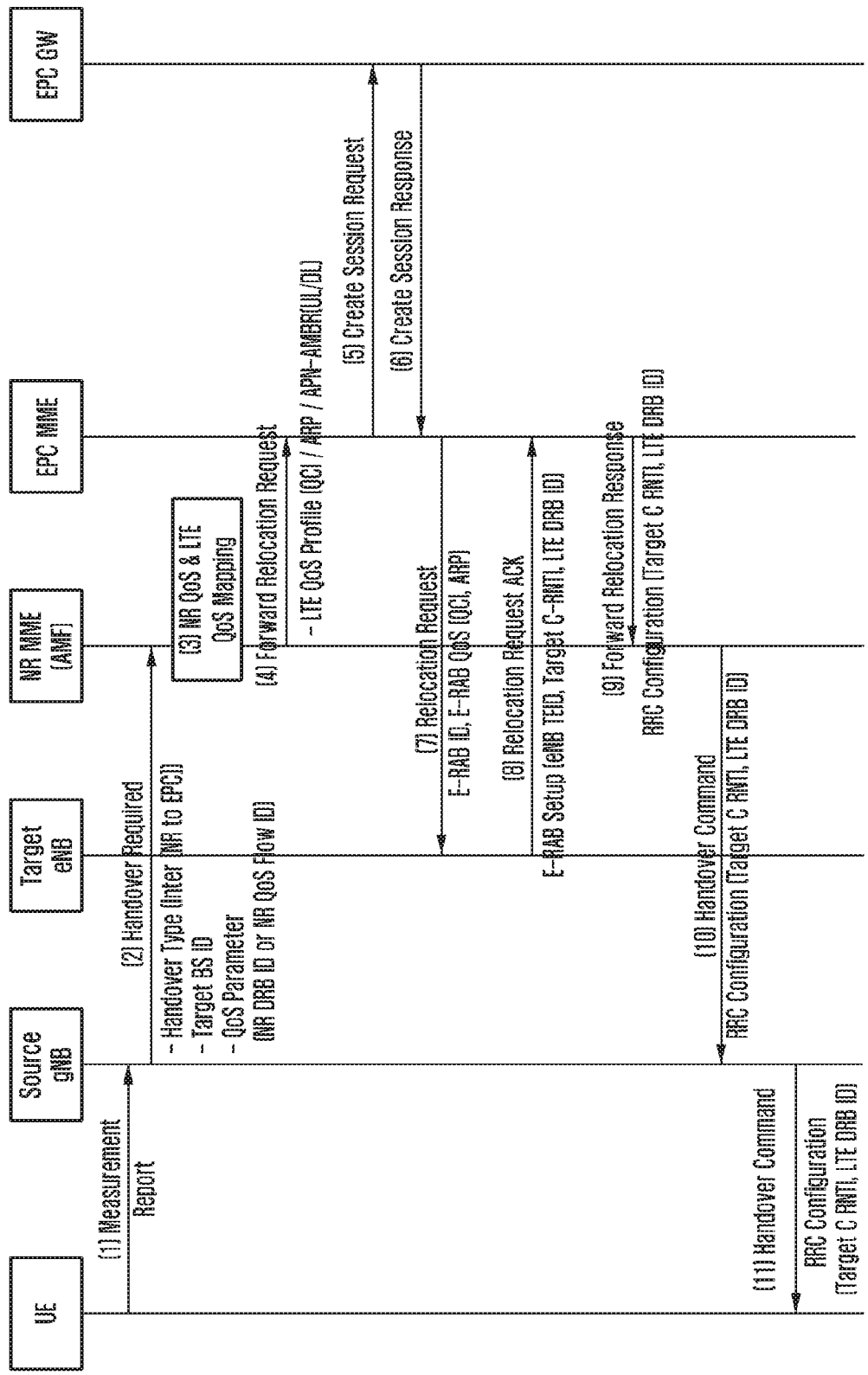
FIG. 67 is a signal flow diagram illustrating a method for guaranteeing QoS for a UE moving from a new radio (NR) system to an LTE system according to the third embodiment of the disclosure.

FIG. 67 is a signal flow diagram illustrating a method for guaranteeing QoS for a UE moving from a new radio (NR) system to an LTE system according to the third embodiment of the disclosure.

Upon detection of a change in channel condition in the middle of receiving a service from the NR system, the UE may transmit a Measurement Report message including channel signal information of a target eNB to a source gNB at step (1). The source gNB makes a decision on handover of the UE to the LTE system based on the measurement result of the UE and transmits a Handover Required message to an NR MME (e.g., Access Mobility Function (AMF)) at step (2).

The Handover Required message may include a Handover Type indicative of a cause for handover, a Target BS ID of a handover target, and a QoS Parameter in use by the source gNB. Examples of the QoS parameter may include a QoS flow ID and a DRB ID. After receiving the Handover Required message from the source gNB, the NR MME may acquire an LTE QoS Parameter from the QoS parameter of the source gNB. For example, the NR MME may acquire an LTE CQI, an ARP, and APN-AMBR (UL/DL) from an NR QoS Flow ID at step (3). How to acquire the LTE QoS parameter from the NR QoS parameter at step (3) is described later with reference to FIG. 73 or 74.

After acquiring the LTE QoS parameter, the NR MME may transmit to an EPC MME, at step (4), a Forward Relocation Request message as information for use in configuring a bearer. The Forward Relocation Request message may include the LTE QCI, ARP, and APN-AMBR (UL/DL) values for configuring an LTE EPS Bearer. In order to establish a bearer, the EPC MME transmits a Create Session Request message as a bearer establishment request message to an EPC GW (e.g., S-GW or P-GW) at step (5). At step (6), the EPC GW transmits a Create Session Response message to the EPC MME in reply upon completing bearer establishment. At step (7), the EPC MME transmits a Relocation Request message as a request for configuring a radio bearer to the target eNB. The Relocation Request message may include an E-UTRAN Radio Access Bearer (E-RAB) ID and E-RAB QoS information (e.g., QCI and ARP). The target eNB may complete E-RAB configuration based on the Relocation Request message received from the EPC MME and transmit, at step (8), a Relocation Request ACK as a configuration complete message to the EPC MME. The Relocation Request ACK message may include an eNB Tunnel Endpoint ID (TEM), a Target C-RNTI, and LTE DRB ID information.

At step (9), the EPC MME may transmit a Forward Relocation Response message including the target C-RNTI and LTE DRB information configured from the target eNB to the NR MME.

The NR MME receives handover target eNB information (e.g., target C-RNTI and LTE DRB information) from the EPC MME and transmits a Handover Command message including the corresponding information to the source gNB at step (10).

The source gNB receives the Handover Command from the NR MME and transmits the Handover Command message to the UE at step (11). After receiving the Handover Command message, the UE starts a handover to the target eNB using the target C-RNTI and LTE DRB information included in the received Handover Command message.

Figure 68:
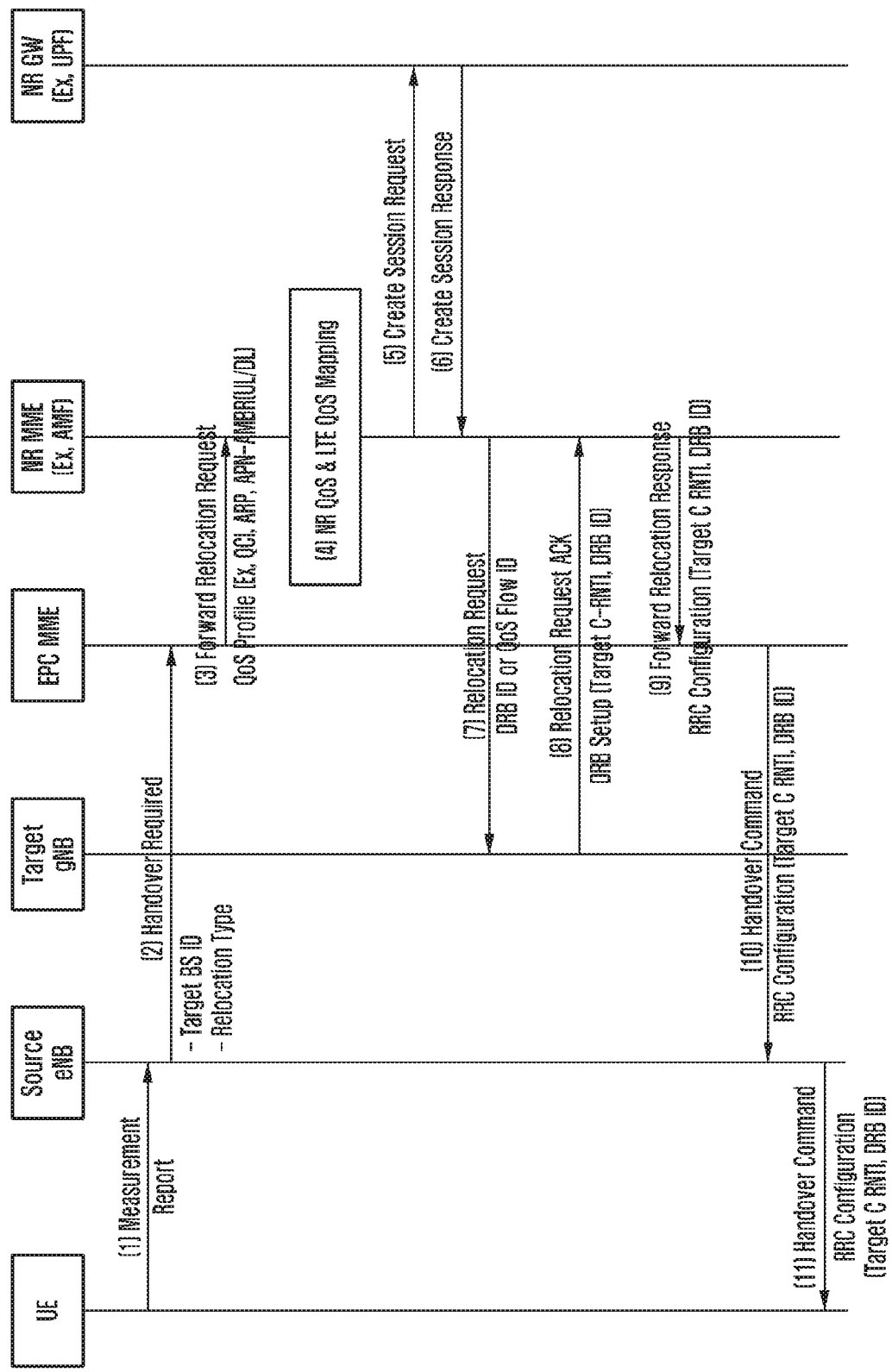
FIG. 68 is a signal flow diagram illustrating a method for guaranteeing QoS for a UE moving from an LTE system to an NR system according to the third embodiment of the disclosure.

FIG. 68 is a signal flow diagram illustrating a method for guaranteeing QoS for a UE moving from an LTE system to an NR system according to the third embodiment of the disclosure.

Upon detection of a change in channel condition in the middle of receiving a service from the LTE system, the UE may transmit a Measurement Report message including channel signal information of a target gNB to a source eNB at step (1). The source eNB makes a handover decision to the NR system based on the measurement result of the UE and transmits a Handover Required message to an EPC MME at step (2). The Handover Required message may include a Handover Type indicative of a cause for handover (e.g., LTE to NR) and a Target BS ID of a handover target.

At step (3), the EPC MME may transmit a Forward Relocation Request message including bearer configuration information to the NR MME. The Forward Relocation Request message may include an LTE QoS parameter, Examples of the LTE QoS parameter may include QCI, ARP, and APN-AMBR (UL/DL) value.

After receiving the Forward Relocation Request message from the EPC MME, the NR MME may derive a QoS Flow ID or DRB ID from the LTE QoS parameter. For example, the NR MME may derive the QoS flow ID from the LTE QCI, ARP, and APN-AMBR (UL/DL) at step (4). How to derive the LTE QoS parameter from the NR QoS parameter at step (4) is described later with reference to FIG. 73 or 74.

At step (5), the NR MME transmits a Create Session Request message as a bearer establishment request message to an NR GW User Plane Function (UPF)) for establishing a bearer. After establishing the bearer, the NR GW transmits, at step (6), a Creation Session Response message to the NR MME in reply. At step (7), the NR MME may transmit a Relocation Request message as a Radio Bearer configuration request message to the target gNB. The Relocation Request message may include the QoS Flow ID or DRB D. The target gNB may complete configuring a radio bearer based on the Relocation Request message received from the EPC MME and transmit a Relocation Request ACK message as a configuration completion message to the NR MME at step (8). The Relocation Request ACK message may include a Target C-RNTI and NR DRB ID information.

At step (9), the NR MME may transmit a Forward Relocation Response message including the Target C-RNTI and NR DRB ID information configured from the Target gNB to the LTE MME.

The EPC MME receives handover target gNB information (e.g., target C-RNTI and NR DRB information) from the NR MME and transmits a Handover Command message including the corresponding information to the source eNB at step (10).

The source eNB receives the Handover Command message from the NR MME and transmits the Handover Command message to the UE at step (11). After receiving the Handover Command message, the UE starts a handover to the target gNB using the target C-RNTI and LTE DRB information included in the received Handover Command message.

Figure 69:
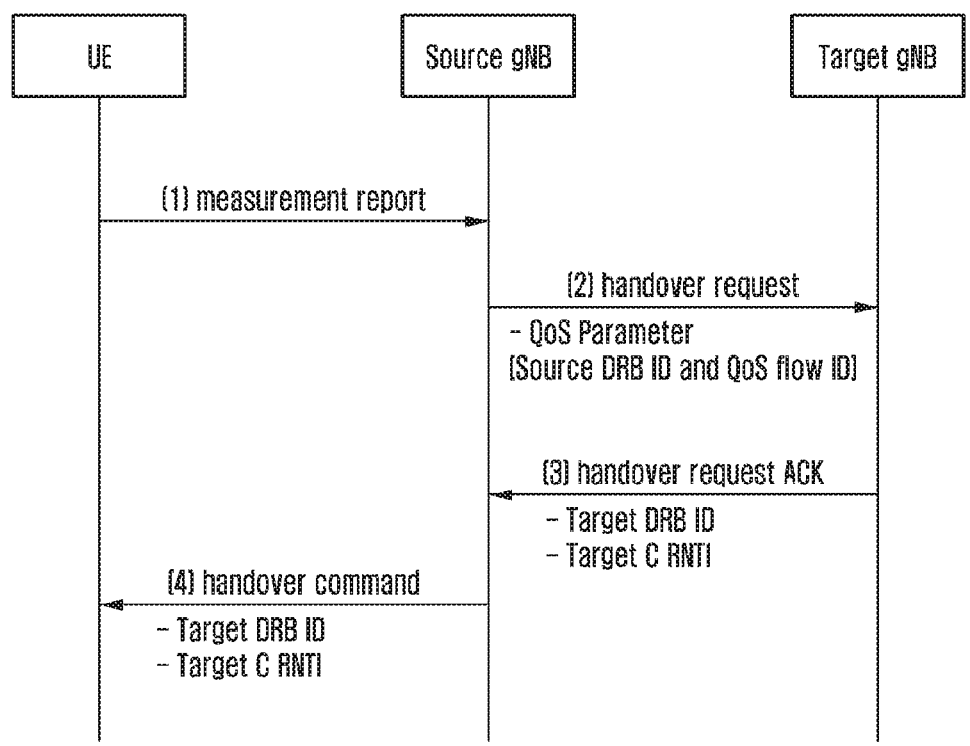
FIG. 69 is a signal flow diagram illustrating a method for guaranteeing QoS for a UE being handed over in an NR system according to the third embodiment of the disclosure.

FIG. 69 is a signal flow diagram illustrating a method for guaranteeing QoS for a UE being handed over in an NR system according to the third embodiment of the disclosure.

Upon detection of a change in channel condition, the UE may transmit a Measurement Report message including channel signal information of a target gNB to a source gNB at step (1). The source gNB may make a decision on handover of the UE to the target gNB based on the Measurement Report message and transmit a Handover Request message to the target gNB at step (2). In order to make it possible for the target gNB to guarantee the QoS being provided by the source gNB, the Handover Request message may include QoS parameters used by the source gNB. For example, the QoS parameters may include a DRB ID and QoS Flow ID of the source gNB. After receiving the Handover Request message, the target gNB may configure a radio bearer based on the QoS parameter information included in the handover request message. For example, after acquiring information on mapping DRB 1 between QoS Flow ID 1 from the handover Request message from the source gNB, the target gNB may be able to guarantee the corresponding QoS by mapping DRB 1 to QoS flow ID 1.

After completing preparation for handover, the target gNB transmits, at step (3), a Handover Request ACK message including target DRB information and target C-RNTI information to the source gNB in response to the Handover Request message. After receiving the Handover Request ACK message, the source gNB may transmit, at step (4), a Handover Command message including the target DRB ID and target C-RNTI to the LTE.

After receiving the Handover Command message from the source eNB, the UE may start handover to the target gNB based on the target C-RNTI and target DRB FIG. 70 is a table of conditions that may be considered for determining a QoS Flow ID according to the third embodiment of the disclosure.

In a method proposed in the disclosure, the QoS flow ID may be determined in consideration of at least one of a Service Type, a Latency, a Max Data Rate (Download), a Max Data Rate (Uplink), a Min Data Rate (Downlink), a Min Data Rate (Uplink), a Reliability, a Priority, and an ARP.

Among the parameters proposed for determining the QoS Flow ID in an embodiment of the disclosure, the Service Type is as follows. The Service Type denotes a service being provided on the corresponding QoS Flow such as enhanced mobile broadband (eMBB) for large volume data services, ultra-reliable low-latency communications (URLLC) for low-latency high-reliability services, massive machine type communication (mMTC), V2X (connected car) service, and various NW/RAN Slicing services.

Among the parameters proposed for determining the QoS Flow ID in an embodiment of the disclosure, the Latency is as follows. The Latency denotes a data packet latency on the corresponding QoS Flow and may be set to 100 ms for determining the QoS Flow ID corresponding to a video data packet transmission for which a minimum latency of 100 ms should be guaranteed by way of example. In an alternative embodiment, if it is necessary to guarantee a minimum latency of 10 ms for a V2X data packet transmission, the Latency for determining the QoS flow ID may be set to 10 ms.

Among the parameters proposed for determining the QoS Flow ID in an embodiment of the disclosure, the Max Data Rate (DL) is as follows. The Max Data Rate (DL) denotes the maximum downlink data rate of the corresponding QoS Flow and may be set to 1 Gbps for determining the QoS Flow ID corresponding to a high quality video image for which the maximum downlink data rate of 1 Gbps should be guaranteed by way of example.

Among the parameters proposed for determining the QoS Flow ID in an embodiment of the disclosure, the Max Data Rate (UL) is as follows. The Max Data Rate (UL) denotes the maximum uplink data rate of the corresponding QoS Flow and may be set to 1 Gbps for determining the QoS Flow ID corresponding to a high quality video call for which the maximum uplink data rate of 1 Gbps should be guaranteed by way of example.

Among the parameters proposed for determining the QoS Flow ID in an embodiment of the disclosure, the Min Data Rate PO is as follows. The Min Data Rate (DL) denotes a minimum downlink data rate of the corresponding QoS Flow and may be set to 1 Gbps for determining the QoS Flow ID corresponding to a high quality video image for which the minimum download data rate of 1 Gbps should be guaranteed by way of example.

Among the parameters proposed for determining the QoS Flow ID in an embodiment of the disclosure, the Min Data Rate (UL) is as follows. The Min Data Rate (UL) denotes a minimum uplink data rate of the corresponding QoS Flow and may be set to 1 Gbps for determining the QoS Flow ID corresponding to a high quality video call for which the minimum uplink data rate of up to 1 Gbps should be guaranteed by way of example.

Among the parameters proposed for determining the QoS Flow ID in an embodiment of the disclosure, the Reliability is as follows. The reliability denotes a packet loss rate of the corresponding QoS Flow and it may be categorized into Classes: High, Medium, and Low. For example, if the Reliability is High, the packet loss rate may be mapped as 10-6. For example, if the Reliability is Low, the packet loss rate is mapped to 10-3. In an alternative embodiment, the Reliability may be mapped to the packet loss rate as 1:1 and configured as a packet loss rate. For example, the Reliability may be 10-9, 10-6, or 10-3.

Among the parameters proposed for determining the QoS Flow ID in an embodiment of the disclosure, the Priority is as follows. The Priority denotes a packet transmission priority on the corresponding QoS Flow and may be set to 1 for a packet to be first transmitted in a Buffer by way of example.

Among the parameters proposed for determining the QoS Flow ID in an embodiment of the disclosure, the ARP (Allocation and Retention Priority) is as follows. The ARP denotes a priority of continuous packet retention on the corresponding QoS Flow and may be set to 1 to reduce a packet drop rate in comparison with being set to 10 by way of example.

Figure 71:
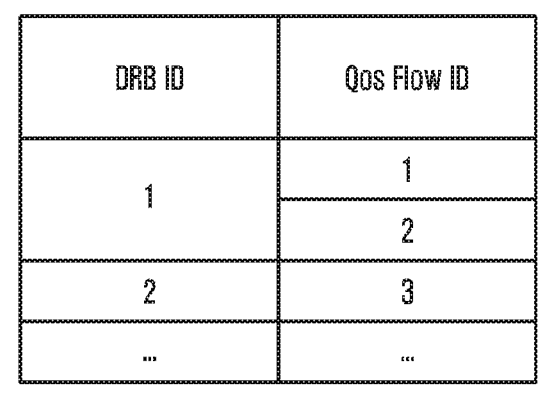

FIG. 71 is a table of mapping DRBs (Data Radio Bearers) and QoS Flow IDs in an NR system.

A DRB ID may be mapped to one or more QoS Flow IDs.

For example, DRB ID 1 may be mapped to QoS Flow IDs 1 and 2. As another example, DRB ID 2 may be mapped to QoS Flow ID 3.

FIG. 72 is a table of QoSs defined in an LTE system according to the third embodiment of the disclosure.

An LTE system may configure a QoS for a bearer between a base station and a network using a QCI (QoS Class Identifier) among QoS Classifications. The QCI may be derived from 4 QoS Classifications. The 4 parameters are as follows. A Resource Type is defined to indicate supportability of GBR/Non-GBR. A Priority is defined to indicate a data transmission priority. A Packet Delay is defined to indicate a minimum packet transmission delay. A Packet Loss Rate is defined to indicate an initial packet transmission reliability.

In a QCI determination method according to an embodiment, QCI=1 corresponds to the case where the Resource Type is set to GBR, the Priority is set to 1, the Packet Delay is set to 100 ms, and the Packet Loss Rate is set to 10-2.

FIG. 73 is a table for explaining a method for deriving LTE system QoS parameters (QCI, ARP, and APN-AMBR (DL/UL) for establishing a bearer) corresponding to an NR system QoS Flow ID according to the third embodiment of the disclosure.

As described with reference to FIG. 67, in the handover of the UE from the NR system to the LTE system, an entity that is responsible for managing QoS mapping between the NR system and the LTE system (NR MME in the embodiment of FIG. 67) needs to derive an LTE system QoS parameter mapped to an NR system QoS flow ID. This entity may derive a parameter table of FIG. 73 using the QoS parameter table as shown in FIG. 70 as proposed in the disclosure.

Figure 75:
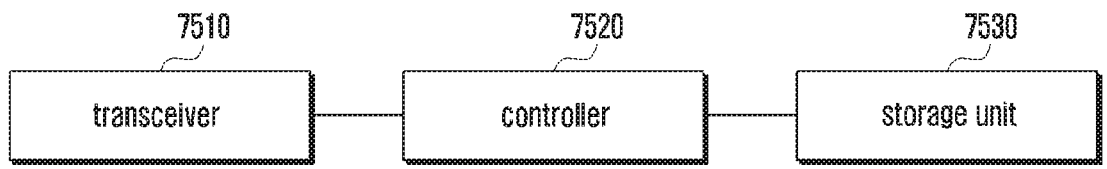
FIG. 75 is a block diagram illustrating a configuration of a UE according to embodiments of the disclosure.

In an embodiment of the disclosure, if a QoS Flow ID of a QoS flow in use by the UE in the NR system is 1, it may be possible to derive from FIG. 75 that the Service Type is set to eMBB, the Latency is set to 100 ms, the Max Data Rate (DL) and Max Data Rate (UL) are each set to 10 Gbps, the Min Data Rate (DL) and Min Data. Rate (UL) are each set to 100 Mbps, the Reliability is set to Medium, the Priority is set to 1, and the ARP is set to 1.

The values derived from FIG. 70 may be mapped to QoS Classifications of the LTE system as shown in FIG. 72. The Service Type of a QoS Flow ID may be mapped to the Resource Type of an LTE QoS. For example, if the Service Type is set to eMBB in the NR system, the corresponding Resource Type may be set to GBR in the LTE system. The Latency of a QoS flow ID may be mapped to the Packet Delay of an LTE QoS.

For example, if the Latency is set to 100 ms in the NR system, the corresponding Packet Delay may be set to 100 ms in the LTE system. The Priority of a QoS Flow ID may be mapped the Priority of an LTE QoS. For example, if the Priority of a QoS Flow ID is set to 1 in the NR system, the corresponding QoS Priority is set to 1 in the LTE system. The Reliability of a QoS Flow ID may be mapped to the Packet Loss Rate of an LTE QoS. For example, if the Reliability is set to Low in the NR system, the corresponding Packet Loss Rate is set to 10-2 in the LTE system.

Through the above method, the Priority, Resource Type, Packet Delay, and Packet Loss Rate of an LTE QoS are determined, from which the QCI value of the corresponding LTE QoS may be derived.

The Max Data Rate (DL) and Max Data Rate (UL) of a QoS flow ID may be mapped to the APN-AMBR (DL/UL) of an LTE QoS. For example, if the QoS Flow ID is 1, the Max Data Rate (DL) and Max Data Rate (UL) are each determined as 10 Gbps, which means that the APN-AMBR (DL/UL) is set to 10 Gbps.

The ARP of a QoS Flow ID may be mapped to the ARP of an LTE QoS. For example, if the ARP of a QoS Flow ID is 1, the ARP of the corresponding LTE QoS may be set to 1.

The above-described method for deriving the QoS parameters of the LTE system from the QoS parameters of the NR system may also be used to derive the QoS parameters of the NR system from the QoS parameters of the LTE system in performing a handover of the UE from the LTE system to the NR system as in the embodiment of FIG. 68. For example, the QoS Flow ID of the NR system may be derived using the QCI, APN-AMBR, and ARP of the LTE system. In this case, the QoS Flow ID of the NR system may be mapped to the QoS parameter of the LTE system in a one-to-one fashion or equal or similar in value to a requirement through a priority of the QoS parameter required for the packet service.

For example, in the case where a QoS parameter of the LTE system and a QoS parameter of the NR system are mapped in a one-to-one manner, if LTE QCI=1 and the NR QoS Flow ID=1 are identical in value with each other, the LTE QCI=1 and the NR QoS Flow ID=1 may be mapped to each other. Alternatively, in the case where a QoS parameter of the LTE system and a QoS parameter of the NR system are not mapped in a one-to-one manner, if a priority of Data Rate guarantee is high, a mapping may be made to a QoS Flow ID equal or proximate to the required Data. Rate value.

FIG. 74 is a table for explaining QoS mapping and another exemplary method for deriving LTE system QoS parameters (QCI, ARP, and APN-AMBR (DL/UL) for establishing a bearer) corresponding to an NR system QoS parameter ID according to the third embodiment of the disclosure.

As described with reference to FIG. 67, in the handover of the UE from the NR system to the LTE system, an entity that is responsible for managing QoS mapping between the NR system and the LTE system (NR MME in the embodiment of FIG. 67) needs to derive an LTE system QoS parameter mapped to an NR system QoS flow D. This entity may derive a parameter table of FIG. 74 using the QoS parameter tables of FIGS. 70 and 71 as proposed in the disclosure.

The QoS Flow IDs may be derived from the table mapping DRB IDs to QoS Flow IDs as shown in FIG. 71, Because a DRB ID may be mapped to multiple QoS Flow IDs, the DRB ID may be configured with different QoS parameter values. In this case, the DRB ID may be configured with QoS parameters set to a value selected so as to be minimally or maximally guaranteed per QoS Flow ID.

In an embodiment, a QoS parameter value configured for the DRB ID may be determined by selecting a value that should be maximally guaranteed per QoS Flow ID. For example, if the QoS Flow IDs 1 and 2 are mapped to the DRB ID 1, the parameter values selectable for the DRB ID are as follows. In the case where the Max Data Rate (DL) value for the QoS Flow ID 1 is 1 Gbps and the Max Data Rate (DL) value for the QoS Flow ID 2 is 10 Gbps, the Max Data Rate (DL) value selectable for DRB ID 1 may be 10 Gbps. In the case where the Reliability for the QoS Flow ID 1 is set to Low and the Reliability for the QoS Flow ID 2 is set to Medium, the Reliability value selectable for the DRB ID 1 may be Medium.

Using this method, it may be possible to derive a QoS Flow ID value reset for the DRB ID, and the derived QoS Flow ID value may be applied to the method described with reference to FIG. 73 to derive the LTE system QoS parameter (QCI, ARP, APN-AMBR (DL/UL) for establishing a bearer) from the NR system QoS parameter.

The above-described method may be used to derive the NR system QoS parameter from the LTE system QoS parameter in performing a handover of the UE from the LTE system to the NR system as in the embodiment of FIG. 68. For example, the DRB ID of the NR system may be reset using the QCI, APN-AMBR, and ARP of the LTE system. In order to derive a QoS Flow ID mapped to the DRB ID to be reset, the method described with reference to FIG. 73 may be used.

FIG. 75 is a block diagram illustrating a configuration of a UE according to embodiments of the disclosure.

In reference to FIG. 75, the UE may include a transceiver 7510, a controller 7520, and a storage unit 7530. In the disclosure, the controller may be defined as a circuit, an application-specific integrated circuit, or at least one processor.

The transceiver 7510 may transmit/receive signals to/from other network entities. For example, the transceiver 7510 may receive system information, a synchronization signal, or a reference signal from a base station.

The controller 7520 may control overall operations of the UE according to disclosed embodiments. For example, the controller 7520 may control signal flows among the components to perform the operations described with reference to the flowcharts.

The storage unit 7530 may store at least one of information transmitted/received by the transceiver 7510 and information generated by the controller 7520.

Figure 76:
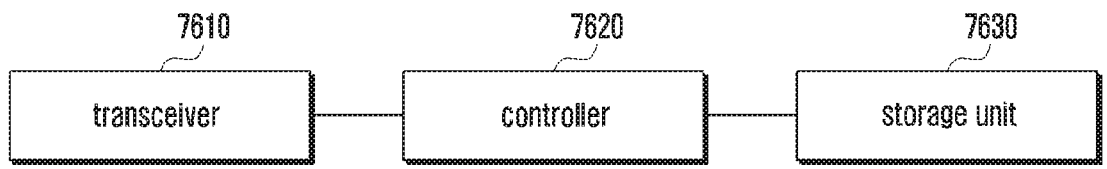
FIG. 76 is a block diagram illustrating a configuration of a base station according to embodiments of the disclosure.

FIG. 76 is a block diagram illustrating a configuration of a base station according to embodiments of the disclosure.

In reference to FIG. 76, the base station may include a transceiver 7610, a controller 7620, and a storage unit 7630. In the disclosure, the controller may be defined as a circuit, an application-specific integrated circuit, or at least one processor.

The transceiver 7610 may transmit/receive signals to/from other network entities.

The controller 7620 may control overall operations of the base station according to disclosed embodiments. For example, the controller 7620 may control signal flows among the components to perform the operations described with reference to the flowcharts.

The storage unit 7630 may store at least one of information transmitted/received by the transceiver 7610 and information generated by the controller 7620.

The embodiments disclosed in the specification and drawings are proposed to help explain and understand the disclosure rather than to limit the scope of the disclosure. It is obvious to those skilled in the art that various modifications and changes can be made thereto without departing from the broader spirit and scope of the disclosure. If necessary, the embodiments may be combined in whole or in part.

The invention claimed is:

1. A packet processing method of a transmitting device in a wireless communication system, the method comprising:
identifying whether a data radio bearer (DRB) mapped to a quality of service (QoS) flow is changed from a legacy DRB to a new DRB; and
transmitting, to a receiving device via the new DRB, information on a last packet transmitted from the transmitting device to the receiving device on the legacy DRB in the QoS flow, in case that the DRB is changed from the legacy DRB to the new DRB,
wherein the information on the last packet transmitted from the transmitting device to the receiving device on the legacy DRB includes a sequence number of the last packet on the legacy DRB.

2. The method of claim 1, further comprising transmitting, to the receiving device, information on a legacy packet transmitted on the new DRB in the QoS flow.

3. The method of claim 1, further comprising:
starting a timer; and
transmitting, to the receiving device, a packet related to the QoS flow on the new DRB in case that the timer has expired.

4. The method of claim 1, further comprising receiving, from the receiving device, a message requesting for re-transmission of at least one packet transmitted on the legacy DRB.

5. The method of claim 1, further comprising:
receiving, from the receiving device, an acknowledgement (ack) message corresponding to the last packet transmitted from the transmitting device to the receiving device; and
transmitting, to the receiving device, a packet related to the QoS flow on the new DRB after receiving the ack message.

6. A packet processing method of a receiving device in a wireless communication system, the method comprising:
identifying whether a data radio bearer (DRB) mapped to a quality of service (QoS) flow is changed from a legacy DRB to a new DRB; and
receiving, from a transmitting device via the new DRB, information on a last packet transmitted from the transmitting device to the receiving device on the legacy DRB in the QoS flow in case that the DRB is changed from the legacy DRB to the new DRB,
wherein the information on the last packet transmitted from the transmitting device to the receiving device on the legacy DRB includes a sequence number of the last packet on the legacy DRB.

7. The method of claim 6, further comprising receiving, from the transmitting device, information on a legacy packet transmitted on the new DRB in the QoS flow.

8. The method of claim 6, further comprising receiving a packet related to the QoS flow on the new DRB from the transmitting device in case that a timer has expired in the transmitting device.

9. The method of claim 6, further comprising transmitting, to the transmitting device, a message requesting for re-transmission of at least one packet transmitted on the legacy DRB.

10. The method of claim 6, further comprising:
transmitting, to the transmitting device, an acknowledgement (ack) message, to the transmitting device, corresponding to the last packet transmitted from the transmitting device to the receiving device; and
receiving a packet related to the QoS flow from the transmitting device on the new DRB.

11. A transmitting device for processing packets in a wireless communication system, the device comprising:
a transceiver; and
a controller connected to the transceiver and configured to control to:
identify whether a data radio bearer (DRB) mapped to a quality of service (QoS) flow is changed from a legacy data radio bearer (DRB) to a new DRB; and transmit information, to a receiving device via the new DRB, on a last packet being transmitted from the transmitting device to the receiving device on the legacy DRB in the QoS flow in case that the DRB is changed from the legacy DRB to the new DRB, wherein the information on the last packet transmitted from the transmitting device to the receiving device on the legacy DRB includes a sequence number of the last packet on the legacy DRB.

12. The device of claim 11, wherein the controller is configured to control to transmit information on a legacy packet being transmitted on the new DRB to the receiving device in the QoS flow.

13. The device of claim 11, wherein the controller is configured to control to start a timer and transmit a packet related to the QoS flow to the receiving device on the new DRB in case that the timer has expired.

14. A receiving device for processing packets in a wireless communication system, the device comprising:
a transceiver; and
a controller connected to the transceiver and configured to control to:
identify whether a data radio bearer (DRB) mapped to a quality of service (QoS) flow is changed from a legacy DRB to a new DRB; and
receive, from a transmitting device via the new DRB, information on a last packet being transmitted from the transmitting device to the receiving device on the legacy DRB in the QoS flow in case that the DRB is changed from the legacy DRB to the new DRB,
wherein the information on the last packet transmitted from the transmitting device to the receiving device on the legacy DRB includes a sequence number of the last packet on the legacy DRB.

15. The device of claim 14, wherein the controller is configured to control to receive information on a legacy packet being transmitted on the new DRB in the QoS flow from the transmitting device.

* * * * *